(12) United States Patent
Kuwano et al.

(10) Patent No.: US 6,501,856 B2
(45) Date of Patent: Dec. 31, 2002

(54) SCHEME FOR EXTRACTION AND RECOGNITION OF TELOP CHARACTERS FROM VIDEO DATA

(75) Inventors: Hidetaka Kuwano, Tokyo (JP); Hiroyuki Arai, Tokyo (JP); Shoji Kurakake, Tokyo (JP); Kenji Ogura, Tokyo (JP); Toshiaki Sugimura, Tokyo (JP); Minoru Mori, Tokyo (JP); Minoru Takahata, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/967,431

(22) Filed: Sep. 28, 2001

(65) Prior Publication Data

US 2002/0085116 A1 Jul. 4, 2002

Related U.S. Application Data

(62) Division of application No. 09/204,957, filed on Dec. 3, 1998, now Pat. No. 6,366,699.

(30) Foreign Application Priority Data

| Dec. 4, 1997 | (JP) | 9-334458 |
| Dec. 4, 1997 | (JP) | 9-334459 |
| Dec. 5, 1997 | (JP) | 9-335770 |
| Dec. 5, 1997 | (JP) | 9-335771 |
| Dec. 10, 1997 | (JP) | 9-340134 |
| Dec. 12, 1997 | (JP) | 9-343293 |
| Jan. 20, 1998 | (JP) | 10-8160 |
| Feb. 23, 1998 | (JP) | 10-39471 |
| Aug. 19, 1998 | (JP) | 10-232522 |

(51) Int. Cl.$^7$ .......................... G06K 9/00; G06K 9/34; G06K 9/36; G06K 9/46; H04N 1/413
(52) U.S. Cl. ................ 382/194; 382/173; 382/177; 382/181; 382/190; 382/197; 382/200; 382/245; 382/254; 358/426.13
(58) Field of Search ................ 382/112, 138, 382/151, 159, 170, 171, 173, 174, 175, 177, 179, 181, 185, 190, 192, 194, 216, 237, 245, 254, 258, 292, 294, 321, 100, 176, 197, 198, 200, 286, 317, 318; 358/426.13, 2.1; 707/500, 517; 704/503

(56) References Cited

U.S. PATENT DOCUMENTS

| 4,528,692 A | * | 7/1985 | Umeda et al. | 382/179 |
| 4,959,868 A | * | 9/1990 | Tanioka | 382/176 |
| 5,351,313 A | * | 9/1994 | Bessho et al. | 382/172 |

(List continued on next page.)

FOREIGN PATENT DOCUMENTS

| EP | 0 720 114 A2 | 3/1996 |
| EP | 0 766 461 A2 | 2/1997 |
| JP | 03160664 PN | 11/1991 |
| JP | 57008880 PN | 1/1992 |
| JP | 07192003 PN | 7/1995 |

OTHER PUBLICATIONS

Sawaki, et al "Text–line extraction and character recognition of Japanese newspaper headlines with graphical designs", IEEE, 1996, pp. 73–78.*

Chiu, et al. "A Feature–preserved thinning algorithm for handwritten Chinese characters", IEEE, 1996, pp. 235239.*

(List continued on next page.)

*Primary Examiner*—Leo Boudreau
*Assistant Examiner*—Daniel G. Mariam
(74) *Attorney, Agent, or Firm*—Olson & Hierl, Ltd.

(57) ABSTRACT

A scheme for detecting telop character displaying frames in video image which is capable of suppressing erroneous detection of frames without telop characters due to instability of image features is disclosed. In this scheme, each input frame constituting the video data is entered, and whether each input frame is a telop character displaying frame in which telop characters are displayed or not is judged, according to edge pairs detected from each input frame by detecting each two adjacent edge pixels for which intensity gradient directions are opposite on some scanning line used in judging an intensity gradient direction at each edge pixel and for which an intensity difference between said two adjacent edge pixels is within a prescribed range as one edge pair, edge pixels being pixels at which an intensity value locally changes by at least a prescribed amount with respect to a neighboring pixel among a plurality of pixels constituting each input frame.

6 Claims, 79 Drawing Sheets

U.S. PATENT DOCUMENTS 5,506,918 A * 4/1996 Ishitani ..................... 382/289
5,594,817 A * 1/1997 Fast et al. .................. 382/290
6,188,790 B1 * 2/2001 Yoshikawa et al. ......... 382/194

OTHER PUBLICATIONS

Indexing and Classification of TV News Articles Based on Telop Recognition, Y. Ariki and T. Teranishi authors, 1997 IEEE, pp. 422–427.

Automated Entry System for Printed Documents, Teruo Akiyama and Norihiro Hagita authors, Pattern Recognition, vol. 23 No. 11. pp. 1141–1154, 1990.

An Automatic Thresholding Algorithm Based on an Illumination–Independent Contract Measure, Akio Shio author, Reprinted from Proceedings of the IEEE Computer Society Conference on Computer Vision and Pattern Recognition, San Diego, CA, Jun. 4–8, 1989, pp.632–637.

The Institute of Electronics, Information and Communication Engineers, Information and System Society Meeting, pp. 214, Sep., 1997.

* cited by examiner

FRAME

DIVIDED INTO 8 SUB-IMAGES

HORIZONTAL SCANNING

VERTICAL SCANNING

HORIZONTAL SCANNING

EDGE PAIR NUMBER

0111333333313300

TOTAL 25

VERTICAL SCANNING

EDGE PAIR NUMBER  0 0 0 1 1 1 3 3 1 1 1 0 0 0   TOTAL 12

(a) ORIGINAL IMAGE (b) EDGE (INTENSITY EDGES)

(c) EDGE PAIRS IN VERTICAL DIRECTION (d) EDGE PAIRS IN HORIZONTAL DIRECTION

HIGH CONTRAST PORTIONS

FIG.40
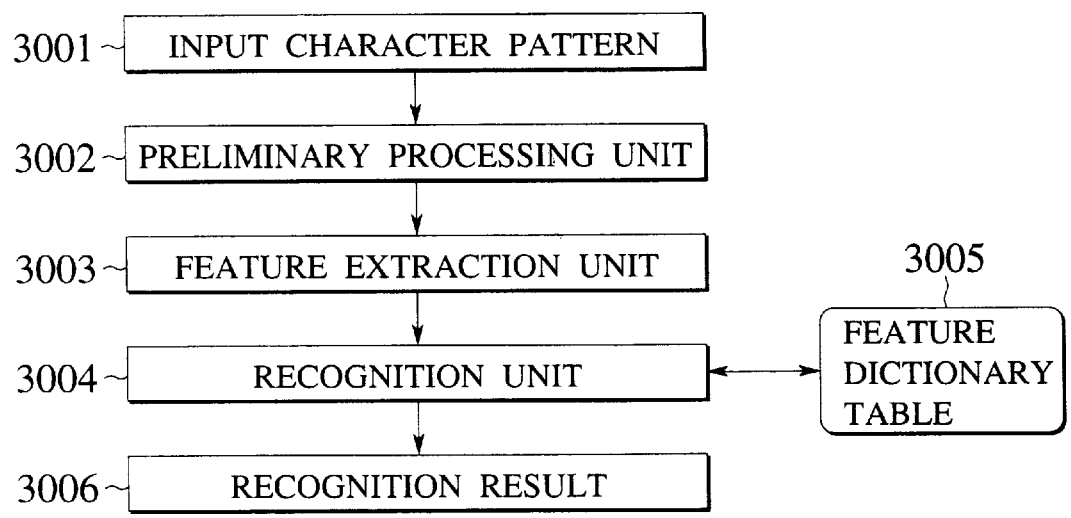
FIG.41A          FIG.41B
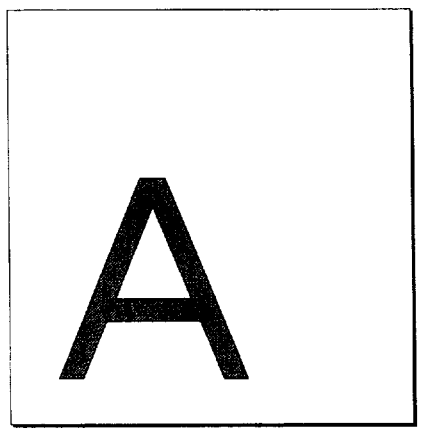    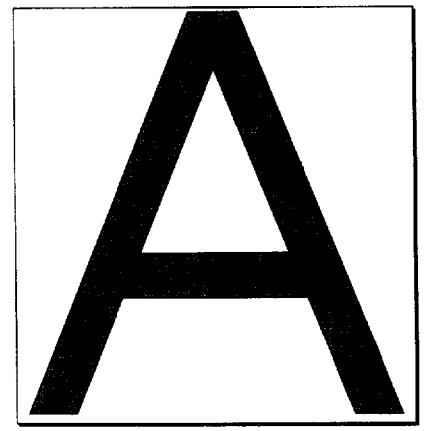

3080-k

FIG.49
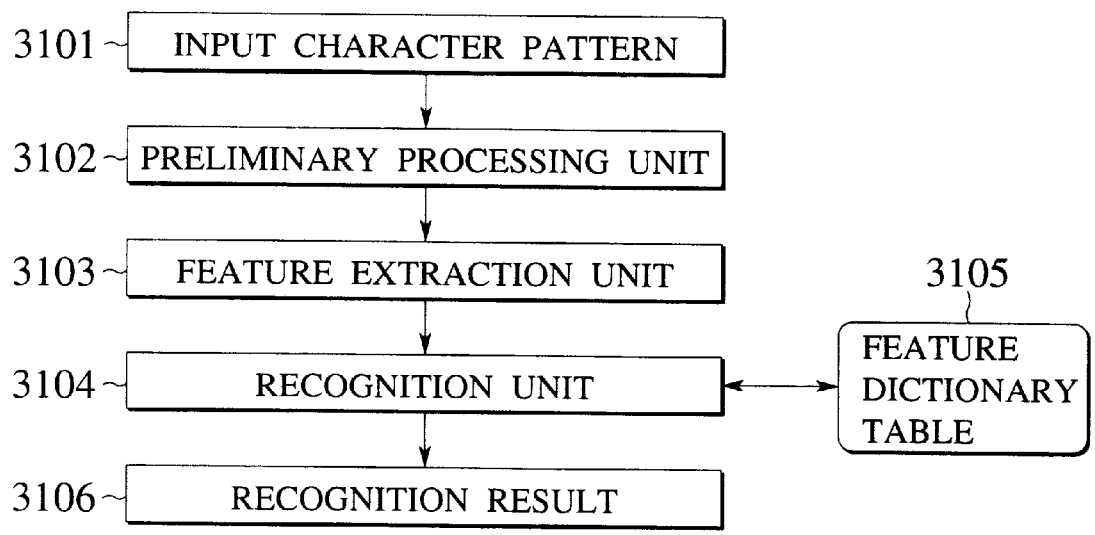
FIG.50A   FIG.50B
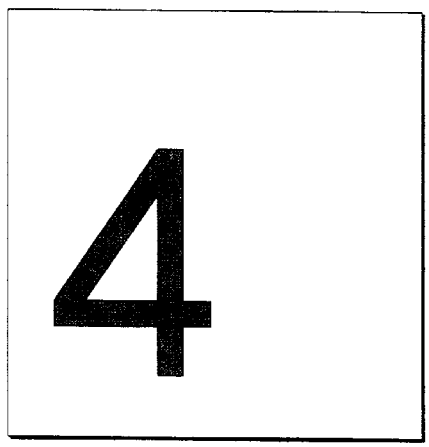 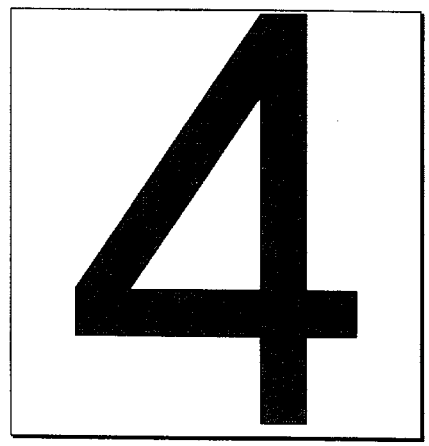

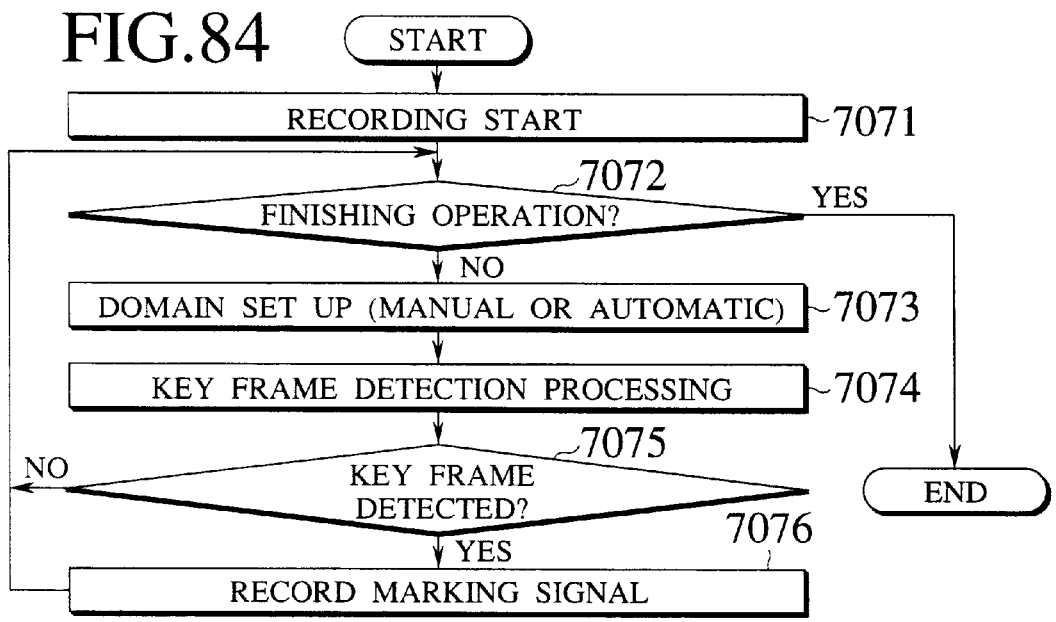
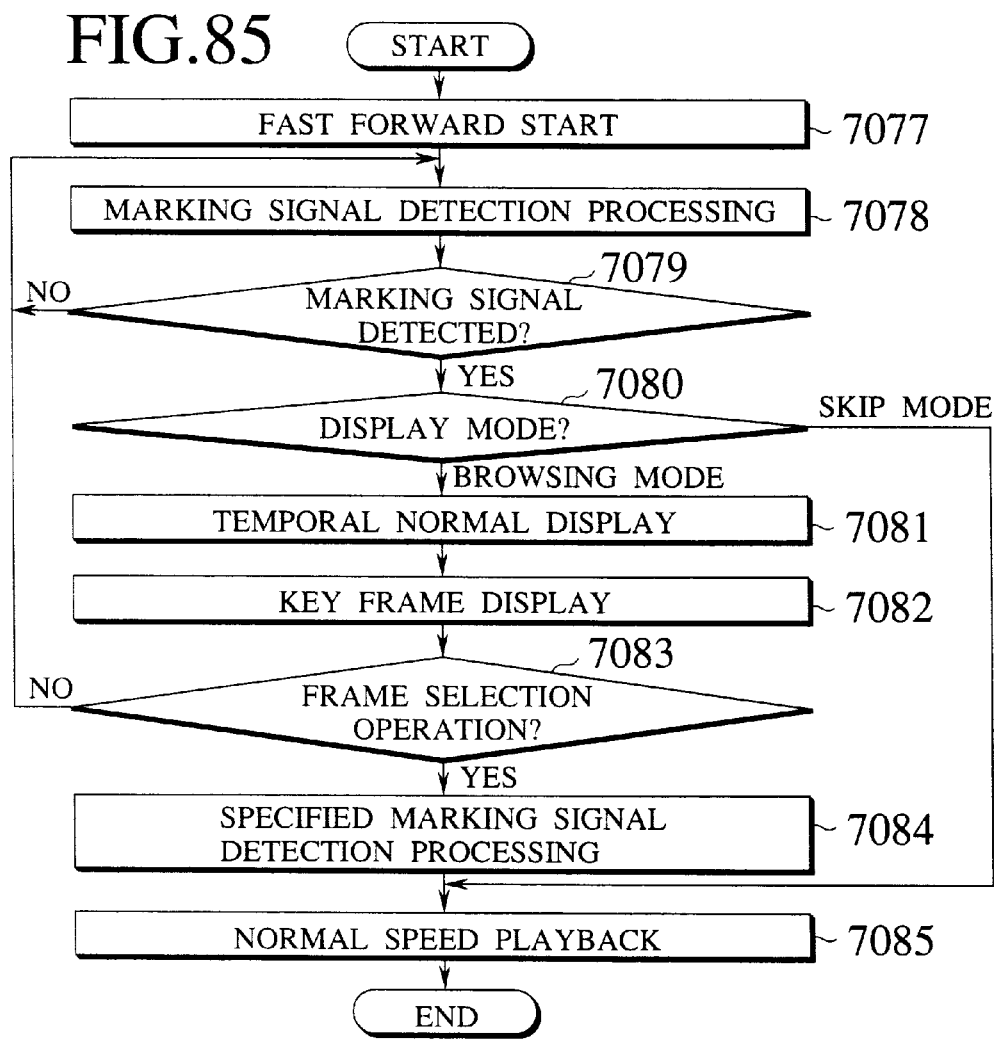

SCHEME FOR EXTRACTION AND RECOGNITION OF TELOP CHARACTERS FROM VIDEO DATA

RELATED APPLICATION

The present invention is a division of patent application Ser. No. 09/204,957, filed Dec. 3, 1998 which is now U.S. Pat. No. 6,366,699 issued on Apr. 2, 2002 and entitled SCHEME FOR EXTRACTION AND RECOGNITION OF TELOP CHARACTERS FROM VIDEO DATA.

BACKGROUND OF THE INVENTION

1. Field of the Invention

The present invention relates to image data processing techniques relevant to a video editing system for editing video data by attaching various information to video data and a video-database system or a video image providing system for managing and retrieving video data, and more particularly, to image data processing techniques for extracting, processing, editing, recording, and displaying telop (caption) information contained in video data so as to enhance the utility of video data at video input, recording, and displaying devices such as TV, VTR, DVD, etc.

2. Description of the Background Art

A technique for detecting a frame that contains characters from a plurality of frames constituting a video image has been studied actively in recent years, and there are many propositions of a method based on an intensity difference between frames. This method is suitable for the purpose of detecting a first telop character displaying frame among successive frames in which the identical characters are displayed.

However, the video image can contain telop characters that are displayed in motion (which will be referred to as rolling telop characters hereafter), as in the video image. of a talk show in which a brief introduction of a person on the show is rolled from left to right on a lower portion of a display screen. In such a case, the intensity difference between successive frames hardly changes immediately after the telop character series started to appear on the display screen, so that it has been difficult to detect a frame that contains the rolling telop characters by the. conventional method.

In addition, the conventional method is also associated with a problem of over-detection in which a plurality of frames displaying the same telop characters are redundantly detected, which is caused when an intensity of a background portion around characters abruptly changes while the successive frames in which the identical characters are displayed.

On the other hand, a method based on an edge pair feature point as disclosed in Japanese Patent Application No. 9-129075 (1997) only accounts for gradient directions of two neighboring edges and does not account for a change of intensity value between edges so that there has been a problem of erroneously detecting a frame with a large intensity change between edges even when there is no character displayed on that frame.

As for a technique for extracting information contained in Video data, a telop character detection method has been conventionally known. The telop character detection method proposed so far detects an appearance of telop characters using a spatial distribution of feature points that appear characteristically at character portions, and extracts a series of telop characters by utilizing the property that many telop characters remain static on a display screen for some period of time.

However, such a conventional telop character detection method cannot deal with rolling telop characters that are displayed in motion, because of its reliance on the property that many telop characters remain static on a display screen for some period of time.

In order to detect rolling telop characters as a series of telop characters, there is a need to estimate a moving distance of the rolling telop characters, and establish correspondences of telop characters that are commonly displayed over consecutive image frames. Moreover, in order to detect a telop character image (an image of characters themselves) from a video image accurately, there is a need to accurately superpose corresponding character image portions that are commonly displayed over consecutive image frames.

However, the rolling telop characters are often associated with slant or extension/contraction so that a sufficient accuracy cannot be obtained by merely superposing corresponding character image portions using a moving distance of the telop characters as a whole. Consequently, there is also a need to carry out corrections of local displacement or distortion in addition to calculating a moving distance of the telop characters. But there has been no established technique for carrying out the calculation of a moving distance of the telop characters and the local correction accurately in a practically feasible processing time.

As for a character region extraction technique that can extract character portions as connected pixel regions stably by a small amount of computations from frame images in which characters are displayed in a plurality of frames constituting color video image or a still color image in which characters are displayed, many studies have been made conventionally, including a character region extraction method proposed in H. Kuwano, S. Kurakake, K. Okada, "Telop Character Extraction from Video data", Proc. of IEEE International Workshop on Document Image Analysis, pp. 82–88, June 1997. See also A. Shio, "An Automatic Thresholding Algorithm Based on an Illumination-Independent Contrast Measure", Proceedings of the IEEE Computer Society Conference on Computer Vision and Pattern Recognition, pp. 632–637, San Diego, Calif., Jun. 4–8, 1989.

This method uses a process of forming connected pixel regions which are adjacent to each other in an image space and which have resembling intensity, saturation and hue, by carrying out the division in one-dimensional color spaces of intensity, saturation, and hue sequentially in this order with respect to the input color image, and then removing those regions which do not satisfy the character region criteria from the formed connected pixel regions.

In this conventional method, the division processing in the intensity space is carried out with respect to the intensity space within a local rectangular region in the image, using a threshold obtained within that rectangular region, so that there is an advantage that the good character region extraction result can be obtained even in the case of having a local intensity variation within the image.

However, in this conventional method, in the case where the input character displaying color image is a video image of the NTSC signal format that is used by the TV broadcasting, there has been a problem that the character region will be extracted without a degraded portion at which characters are degraded.

Usually, the video image of the NTSC signal format has features that the original colors are degraded as the color of each pixel is blurred along each scanning line in the image and the color of the background portion is blurred into the characters at left and right boundaries of between the characters and the background portion in the image. For the horizontal components within the character, the degradation occurs only at left and right edges and the central portion is unaffected, but for the vertical components, the entire character portion can be degraded when the character width is narrow, in which case the intensity is lowered such that the intensity contrast between the horizontal components and the vertical components within the character becomes high (see FIG. 26 and FIG. 27).

For this reason, in the above described conventional method, when the threshold is determined within the rectangular region that contains a connecting portion of the horizontal components and the vertical components of a degraded character portion in the video image of the NTSC signal format, the degraded vertical components will be regarded as background so that an incomplete character region will be extracted (see FIG. 28).

Namely, FIG. 26 shows an exemplary case of degradation that occurs within characters displayed in the video image of the NTSC signal format, where the black background color is blurred into alphabetic characters "Acoustic Echo Canceller" and the corresponding Japanese characters shown above such that the vertical components within the characters are degraded into gray.

FIG. 27 is a diagram illustrating the degradation within the character, where the black background color is blurred into an interior of the white telop character "t" on the black background such that the interior color of the character is partially degraded into gray. As for the horizontal components in the character, the degradation occurs only at left and right edges and a central portion is unaffected, as in a region A of FIG. 27. As for the vertical components, the entire portion is degraded because the character width is narrow so that the intensity is lowered, as in a region B of FIG. 27, such that the intensity contrast between the horizontal components and the vertical components within the character becomes large. In such a case, the region B can be regarded as background according to the above described conventional method.

FIG. 28 shows a result of extracting the character region from the color image of FIG. 26 using the above described conventional method, which is the incomplete character region without degraded portion.

Also, usually, the characters such as the telop characters displayed in the image have a feature of having a very high color contrast with respect to the surrounding portion. However, the above described conventional method forms the connected pixel regions by the division processing in the color space alone and does not account for the feature regarding the color distribution within the image space, so that the connected pixel region with a low color contrast with respect to the surrounding portion will be also extracted such that many regions other than the character region will be also extracted.

As for a character pattern recognition technique, one example of the conventional method is described in T. Akiyama, N. Hagita, "Automated Entry System for Printed Documents", Pattern Recognition, Vol. 23, No. 11, pp. 1141–1154, 1990. See also Tao Hong, et al., "Visual Similarity Analysis of Chinese Characters and Its Uses in Japanese OCR", Proceedings of the SPIE Symposium, Document Recognition II, SPIE Vol. 2422, pp. 245–253, 1995. In this conventional method, a character pattern that is binarized and its position and size normalized is divided into coarse mesh regions, and a character portion existing in each mesh region is observed from coordinate axes in plural directions. Then, the character pattern is recognized by obtaining the direction contributivity (see Japanese Patent Application Laid Open No. 57-8880 (1982)) of the character lines for the black pixels of the character portion that is traversed by the scanning from each coordinate axis.

This conventional method extracts information from vicinities of black pixels that form a contour portion by observing the character lines, so that there has been a problem that it cannot correctly recognize a character which is often associated with a deformation of the contour portion due to the character line displacement or the image quality degradation.

SUMMARY OF THE INVENTION

It is therefore an object of the present invention to provide a scheme for detecting telop character displaying frames in video image which is capable of suppressing erroneous detection of frames without telop characters due to instability of image features and over-detection of frames displaying the same telop characters redundantly.

It is another object of the present invention to provide a scheme for detecting telop characters in video image which is capable of detecting the rolling telop characters as a series of telop characters.

It is another object of the present invention to provide a scheme for extracting character regions in the image which is capable of extracting the degraded portion within the high intensity character and suppressing the extraction of regions with a low contrast with respect to the surrounding portion at a time of the character region extraction from the image.

It is another object of the present invention to provide a scheme for character pattern recognition which is capable of obtaining information regarding two-dimensional structure of a character and correctly recognizing a character associated with the contour portion deformation or the character line displacement by using features that are hardly affected by the contour portion deformation or the character line displacement, for a character pattern that is binarized and its position and size normalized.

According to one aspect of the present invention there is provided a method for processing video data, comprising the steps of: (a) entering each input frame constituting the video data; and (b) judging whether each input frame entered at the step (a) is a telop character displaying frame in which telop characters are displayed or not, according to edge pairs detected from each input frame by detecting each two adjacent edge pixels for which intensity gradient directions are opposite on some scanning line used in judging an intensity gradient direction at each edge pixel and for which an intensity difference between said two adjacent edge pixels is within a prescribed range as one edge pair, edge pixels being pixels at which an intensity value locally changes by at least a prescribed amount with respect to a neighboring pixel among a plurality of pixels constituting each input frame.

According to another aspect of the present invention there is provided a method for recognizing character patterns, comprising the steps of: (aaa) dividing character patterns that are binarized into black pixels and white pixels into divided regions each containing one character; (bbb) normalizing position and size of a character in each divided region; (ccc) dividing a character pattern of each normalized character into mesh regions; (ddd) counting a run-length of white pixels which are adjacent in each direction starting from a white pixel existing in each divided mesh region, for a plurality of prescribed directions; (eee) calculating a direction contributivity of each direction as a value obtained by averaging the run-length in each direction by an accumulated value of all the run-lengths for all the prescribed directions as counted by the step (ddd), for each divided mesh region; (fff) calculating a feature value of each divided mesh region by accumulating the direction contributivity of each direction for all white pixels in each divided mesh region and averaging an accumulated value of the direction contributivity of each direction by a number of white pixels within each mesh region; and (ggg) carrying out a processing for recognizing the character pattern of each normalized character using the feature values obtained for all the mesh regions at the step (fff).

According to another aspect of the present invention there is provided a method for recognizing character patterns, comprising the steps of: (aaa) dividing character patterns that are binarized into black pixels and white pixels into divided regions each containing one character; (bbb) normalizing position and size of a character in each divided region; (ccc) dividing a character pattern of each normalized character into mesh regions; (ddd) counting a run-length of black pixels which are adjacent in each direction starting from a black pixel existing in each divided mesh region, for a plurality of prescribed directions; (eee) calculating a black pixel direction contributivity of each direction as a value obtained by averaging the run-length of black pixels in each direction by an accumulated value of all the run-lengths of black pixels for all the prescribed directions as counted by the step (ddd), for each divided mesh-region; (fff) counting a run-length of white pixels which are adjacent in each direction starting from a white pixel existing in each divided mesh region, for a plurality of prescribed directions; (ggg) calculating a white pixel direction contributivity of each direction as a value obtained by averaging the run-length of white pixels in each direction by an accumulated value of all the run-lengths of white pixels for all the prescribed directions as counted by the step (fff), for each divided mesh region; (hhh) calculating a black pixel feature value of each divided mesh region by accumulating the black pixel direction contributivity of each direction for all black pixels in each divided mesh region and averaging an accumulated value of the black pixel direction contributivity of each direction by a number of black pixels within each mesh region; (iii) calculating a white pixel feature value of each divided mesh region by accumulating the white pixel direction contributivity of each direction for all white pixels in each divided mesh region and averaging an accumulated value of the white pixel direction contributivity of each direction by a number of white pixels within each mesh region; and (jjj) carrying out a processing for recognizing the character pattern of each normalized character using the black feature values obtained for all the mesh regions at the step (hhh) and the white feature values obtained for all the mesh regions at the step (iii).

According to another aspect of the present invention there is provided an apparatus for processing video data, comprising: (a) a unit for entering each input frame constituting the video data; and (b) a unit for judging whether each input frame entered at the unit (a) is a telop character displaying frame in which telop characters are displayed or not, according to edge pairs detected from each input frame by detecting each two adjacent edge pixels for which intensity gradient directions are opposite on some scanning line used in judging an intensity gradient direction at each edge pixel and for which an intensity difference between said two adjacent edge pixels is within a prescribed range as one edge pair, edge pixels being pixels at which an intensity value locally changes by at least a prescribed amount with respect to a neighboring pixel among a plurality of pixels constituting each input frame.

According to another aspect of the present invention there is provided an apparatus for recognizing character patterns, comprising: (aaa) a unit for dividing character patterns that are binarized into black pixels and white pixels into divided regions each containing one character; (bbb) a unit for normalizing position and size of a character in each divided region; (ccc) a unit for dividing a character pattern of each normalized character into mesh regions; (ddd) a unit for counting a run-length of white pixels which are adjacent in each direction starting from a white pixel existing in each divided mesh region, for a plurality of prescribed directions; (eee) a unit for calculating a direction contributivity of each direction as a value obtained by averaging the run-length in each direction by an accumulated value of all the run-lengths for all the prescribed directions as counted by the unit (ddd), for each divided mesh region; (fff) a unit for calculating a feature value of each divided mesh region by accumulating the direction contributivity of each direction for all white pixels in each divided mesh region and averaging an accumulated value of the direction contributivity of each direction by a number of white pixels within each mesh region; and (ggg) a unit for carrying out a processing for recognizing the character pattern of each normalized character using the feature values obtained for all the mesh regions at the unit (fff).

According to another aspect of the present invention there is provided an apparatus for recognizing character patterns, comprising: (aaa) a unit for dividing character patterns that are binarized into black pixels and white pixels into divided regions each containing one character; (bbb) a unit for normalizing position and size of a character in each divided region; (ccc) a unit for dividing a character pattern of each normalized character into mesh regions; (ddd) a unit for counting a run-length of black pixels which are adjacent in each direction starting from a black pixel existing in each divided mesh region, for a plurality of prescribed directions; (eee) a unit for calculating a black pixel direction contributivity of each direction as a value obtained by averaging the run-length of black pixels in each direction by an accumulated value of all the run-lengths of black pixels for all the prescribed directions as counted-by the unit (ddd), for each divided mesh region; (fff) a unit for counting a run-length of white pixels which are adjacent in each direction starting from a white pixel existing in each divided mesh region, for a plurality of prescribed directions; (ggg) a unit for calculating a white pixel direction contributivity of each direction as a value obtained by averaging the run-length of white pixels in each direction by an accumulated value of all the run-lengths of white pixels for all the prescribed directions as counted by the unit (fff), for each divided mesh region; (hhh) a unit for calculating a black pixel feature value of each divided mesh region by accumulating the black pixel direction contributivity of each direction for all black pixels in each divided mesh region and averaging an accumulated value of the black, pixel direction contributivity of each direction by a number of black pixels within each mesh region; (iii) a unit for calculating a white pixel feature value of each divided mesh region by accumulating the white pixel direction contributivity of each direction for all white pixels in each divided mesh region and averaging an accumulated value of the white pixel direction contributivity of each direction by a number of white pixels within each mesh region; and (jjj) a unit for carrying out a processing for recognizing the character pattern of each normalized character using the black feature values obtained for all the mesh regions at the unit (hhh) and the white feature values obtained for all the mesh regions at the unit (iii).

According to another aspect of the present invention there is provided a computer readable recording medium recording a program for causing a computer to execute processing including: (a) a process for entering each input frame constituting the video data; and (b) a process for judging whether each input frame entered at the process, (a) is a telop character displaying frame in which telop characters are displayed or not, according to edge pairs detected from each input frame by detecting each two adjacent edge pixels for which intensity gradient directions are opposite on some scanning line used in judging an intensity gradient direction at each edge pixel and for which an intensity difference between said two adjacent edge pixels is within a prescribed range as one edge pair, edge pixels being pixels at which an intensity value locally changes by at least a prescribed amount with respect to a neighboring pixel among a plurality of pixels constituting each input frame.

According to another aspect of the present invention there is provided a computer readable recording medium recording a program for causing a computer to execute processing including: (aaa) a process for dividing character patterns that are binarized into black pixels and white pixels into divided regions each containing one character; (bbb) a process for normalizing position and size of a character in each divided region; (ccc) a process for dividing a character pattern of each normalized character into mesh regions; (ddd) a process for counting a run-length of white pixels which are adjacent in each direction starting from a white pixel existing in each divided mesh region, for a plurality of prescribed directions; (eee) a process for calculating a direction contributivity of each direction as a value obtained by averaging the run-length in each direction by an accumulated value of all the run-lengths for all the prescribed directions as counted by the process (ddd), for each divided mesh region; (fff) a process for calculating a feature value of each divided mesh region by accumulating the direction contributivity of each direction for all white pixels in each divided mesh region and averaging an accumulated value of the direction contributivity of each direction by a number of white pixels within each mesh region; and (ggg) a process for carrying out a processing for recognizing the character pattern of each normalized character using the feature values obtained for all the mesh regions at the process (fff).

According to another aspect of the present invention there is provided a computer readable recording medium recording a program for causing a computer to execute processing including: (aaa) a process for dividing character patterns that are binarized into black pixels and white pixels into divided regions each containing one character; (bbb) a process for normalizing position and size of a character in each divided region; (ccc) a process for dividing a character pattern of each normalized character into mesh regions; (ddd) a process for counting a run-length of black pixels which are adjacent in each direction starting from a black pixel existing in each divided mesh region, for a plurality of prescribed, directions; (eee) a process for calculating a black pixel direction contributivity of each direction as a value obtained by averaging the run-length of black pixels in each direction by an accumulated value of all the run-lengths of black pixels for all the prescribed directions as counted by the process (ddd), for each divided mesh region; (fff) a process for counting a run-length of white pixels which are adjacent in each direction starting from a white pixel existing in each divided mesh region, for a plurality of prescribed directions; (ggg) a process for calculating a white pixel direction contributivity of each direction as a value obtained by averaging the run-length of white pixels in each direction by an accumulated value of all the run-lengths of white pixels for all the prescribed directions as counted by the process (fff), for each divided mesh region; (hhh) a process for calculating a black pixel feature value of each divided mesh region by accumulating the black pixel direction contributivity of each direction for all black pixels in each divided mesh region and averaging an accumulated value of the black pixel direction contributivity of each direction by a number of black pixels within each mesh region; (iii) a process for calculating a white pixel feature value of each divided mesh region by accumulating the white pixel direction contributivity of each direction for all white pixels in each divided mesh region and averaging an accumulated value of the white pixel direction contributivity of each direction by a number of white pixels within each mesh region; and (jjj) a process for carrying out a processing for recognizing the character pattern of each normalized character using the black feature values obtained for all the mesh regions at the process (hhh) and the white feature values obtained for all the mesh regions at the process (iii).

Other features and advantages of the present invention will become apparent from the following description taken in conjunction with the accompanying drawings.

BRIEF DESCRIPTION OF THE DRAWINGS

FIGS. 11A and 10B are diagrams showing exemplary cases of counting the number of edge pairs within sub-image in the apparatus of FIG. 1.

FIG. 40 is a block diagram showing an exemplary configuration of a character recognition apparatus according to the fourth embodiment of the present invention.

FIGS. 41A and 41B are diagrams showing an exemplary case of normalization by a preliminary processing unit in the apparatus of FIG. 40.

FIG. 49 is a block diagram showing an exemplary configuration of a character recognition apparatus according to the fifth embodiment of the present invention.

FIGS. 50A and 50B are diagrams showing an exemplary case of normalization by a preliminary processing unit in the apparatus of FIG. 49.

FIG. 84 is a flow chart for the processing procedure at a time of recording by the device of FIG. 77 in the fourth case.

FIG. 85 is a flow chart for the processing procedure at a time of playback by the device of FIG. 77 in the fourth case.

DETAILED DESCRIPTION OF THE PREFERRED EMBODIMENTS

Now, the preferred embodiments of the scheme for extraction and recognition of telop characters from video data according to the present invention will be described with references to the drawings.

Note that the following embodiments are applicable to any video data including TV broadcast data, video recorder output data, compressed video data such as MPEG (Motion Picture Experts Group) data, etc. Also, the following embodiments presuppose that the video data are converted into frame images, so that there may be a need to generate frame images depending on a signal format of the video data. However, such frame image generation can be readily realized by the already widespread and commercially available means, so that the appropriate use of such known means for this purpose will be assumed.

Referring now to FIG. 1 to FIG. 13, the first embodiment of the present invention concerning a detection of a telop character displaying frame will be described in detail.

Figure 1:
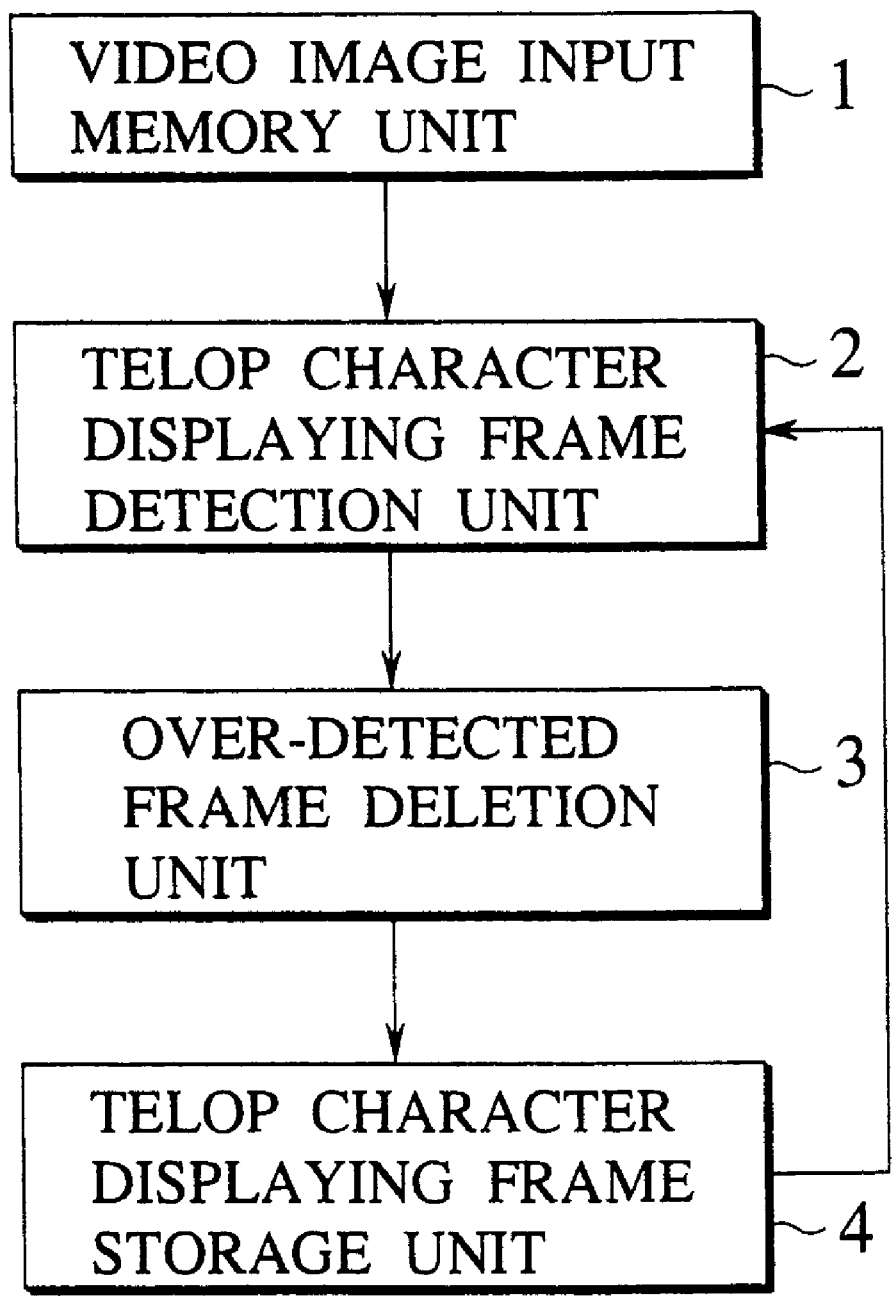
FIG. 1 is a block diagram showing a schematic configuration of a telop character displaying frame detection apparatus according to the first embodiment of the present invention.

FIG. 1 shows a schematic configuration of a telop character displaying frame detection apparatus in this first embodiment, which comprises a video image input memory unit 1 for detecting video image in frame units, a telop character displaying frame detection unit 2 for detecting a frame in which telop characters are displayed, an over-detected frame deletion unit 3 for leaving just one frame and deleting the other frames from a plurality of frames, in which the same telop characters are displayed, and a telop character displaying frame storage unit 4 for storing a remaining one, telop character displaying frame.

Figure 2:
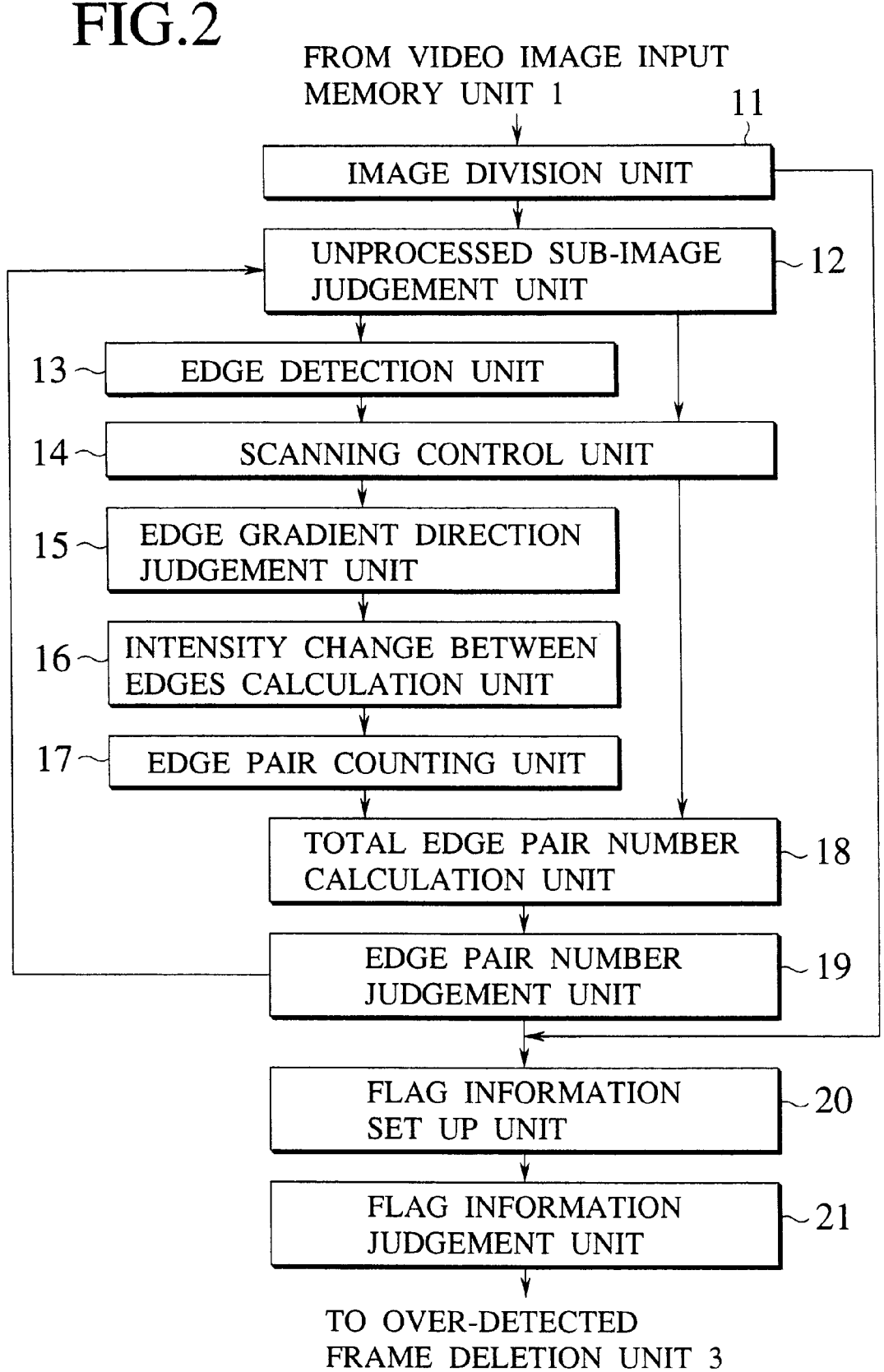
FIG. 2 is a block diagram showing a detailed configuration of a telop character displaying frame detection unit in the apparatus of FIG. 1.

FIG. 2 shows a detailed configuration of the telop character displaying frame detection unit 2, which comprises an image division unit 11, an unprocessed sub-image judgement unit 12, an edge detection unit 13, a scanning control unit 14, an edge gradient direction Judgement unit 15, an intensity change between edges calculation unit 16, an edge pair counting unit 17, a total edge pair number calculation unit 18, an edge pair number judgement unit 19, a flag information set up unit 20, and a flag information judgement unit 21.

Figure 6:
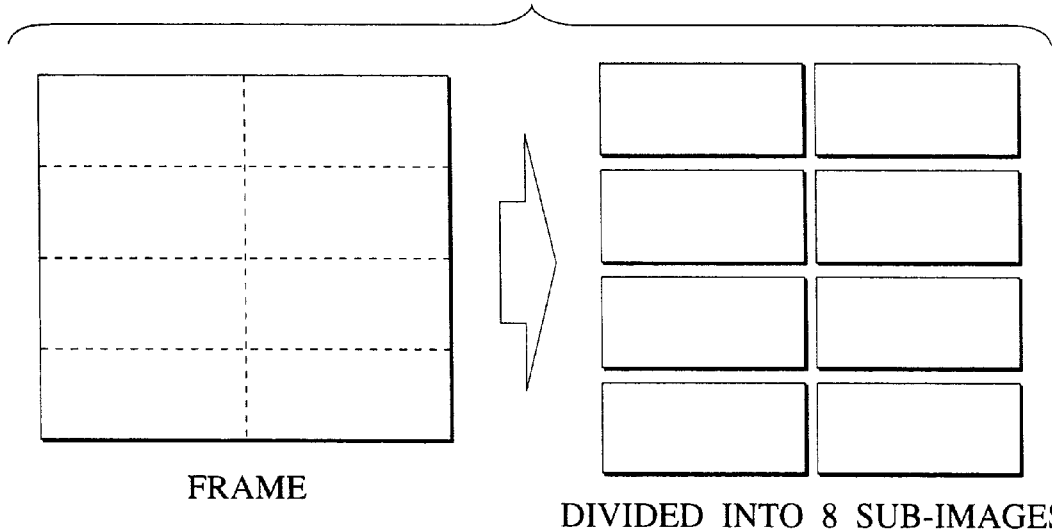
FIG. 6 is a diagram showing an exemplary sub-image division used in the apparatus of FIG. 1.

The image division unit 11 divides an input frame into sub-images. FIG. 6 shows an exemplary case of dividing an input frame into eight sub-images.

The unprocessed sub-image Judgement unit 12 judges whether a flag information set up processing has been done for each sub-image of interest among the divided sub-images.

The edge detection unit 13 carries out an edge detection processing for detecting edge pixels and their direction information, where an edge pixel is defined as a pixel at a portion where the intensity value locally changed by at least a prescribed amount with respect to a neighboring pixel among 4 plurality of pixels constituting each sub-image.

Figure 7A:
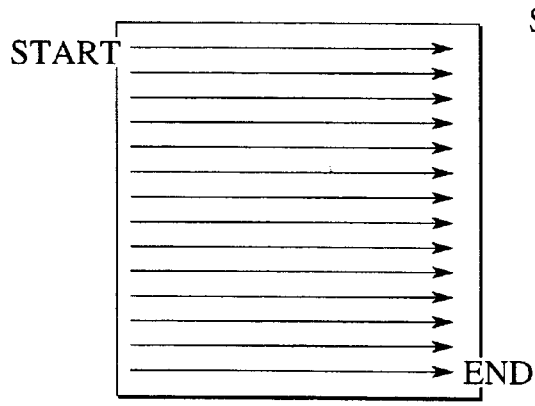
FIGS. 7A and 7B are diagrams showing exemplary scanning directions used in the apparatus of FIG. 1.
Figure 7B:
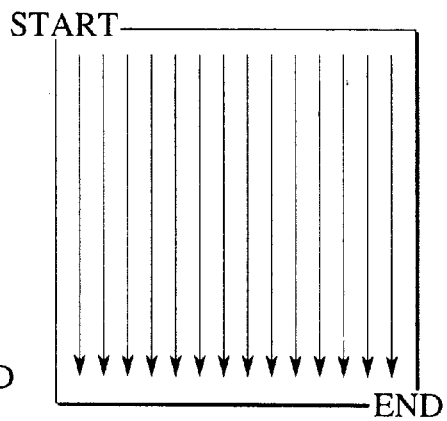

The scanning control unit 14 specifies scanning lines for calculating edge pairs (see FIGS.17A and 7B).

Figure 8:
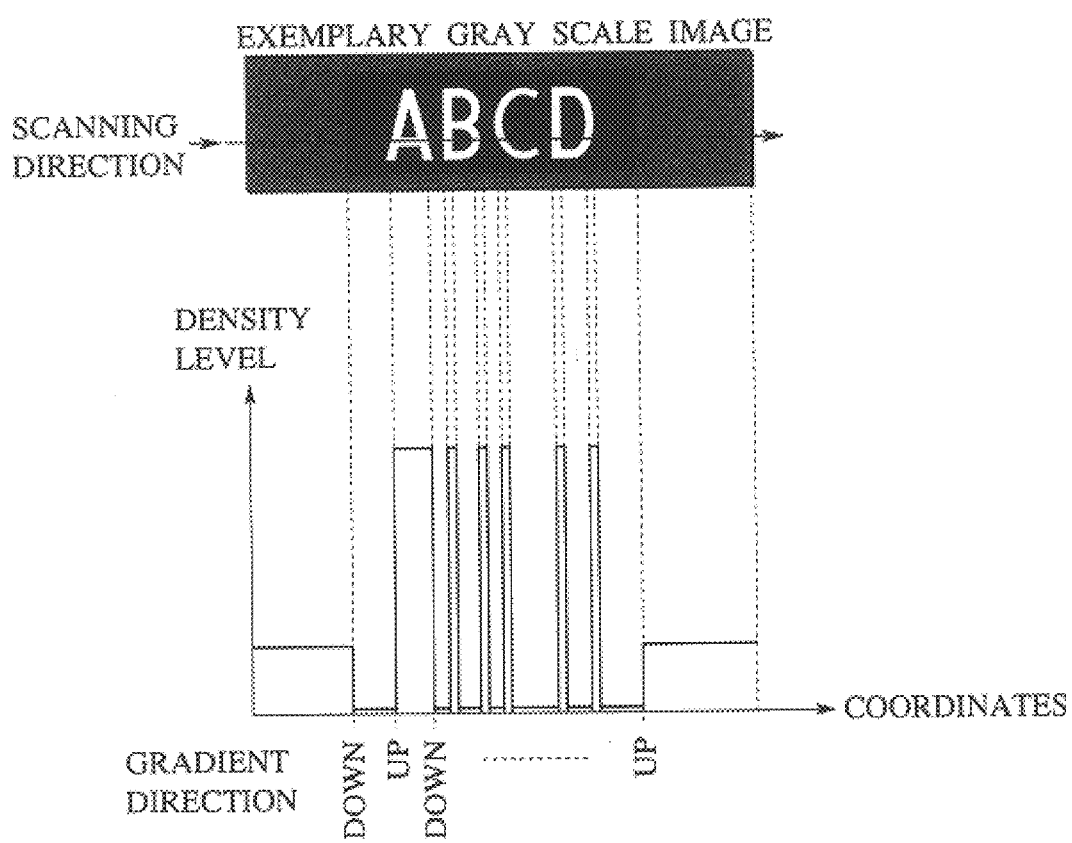
FIG. 8 is a diagram showing an exemplary edge gradient direction judgement used in the apparatus of FIG. 1.

The edge gradient direction Judgement unit 15 Judges a gradient direction (up or down) of each detected edge pixel along the scanning line direction (see FIG. 8).

Figure 9:
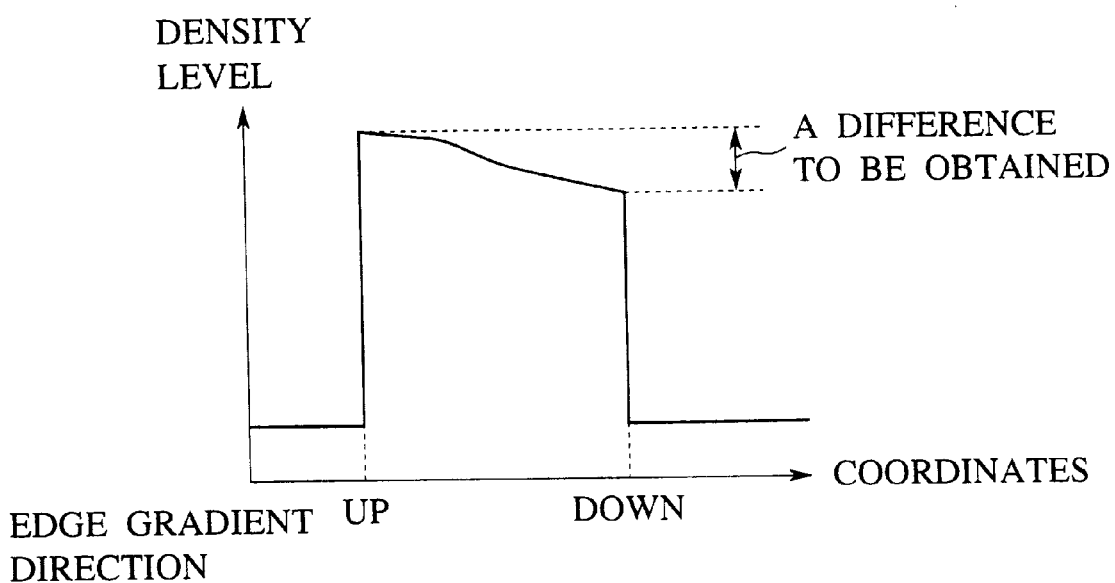
FIG. 9 is a diagram showing an exemplary case of calculating intensity change between edges in the apparatus of FIG. 1.
Figure 10A:
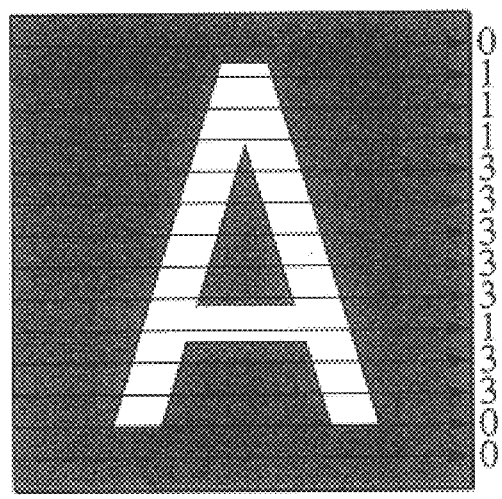
Figure 10B:
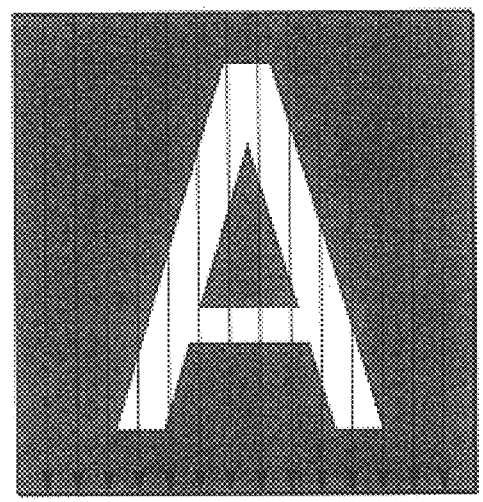
Figure 11:
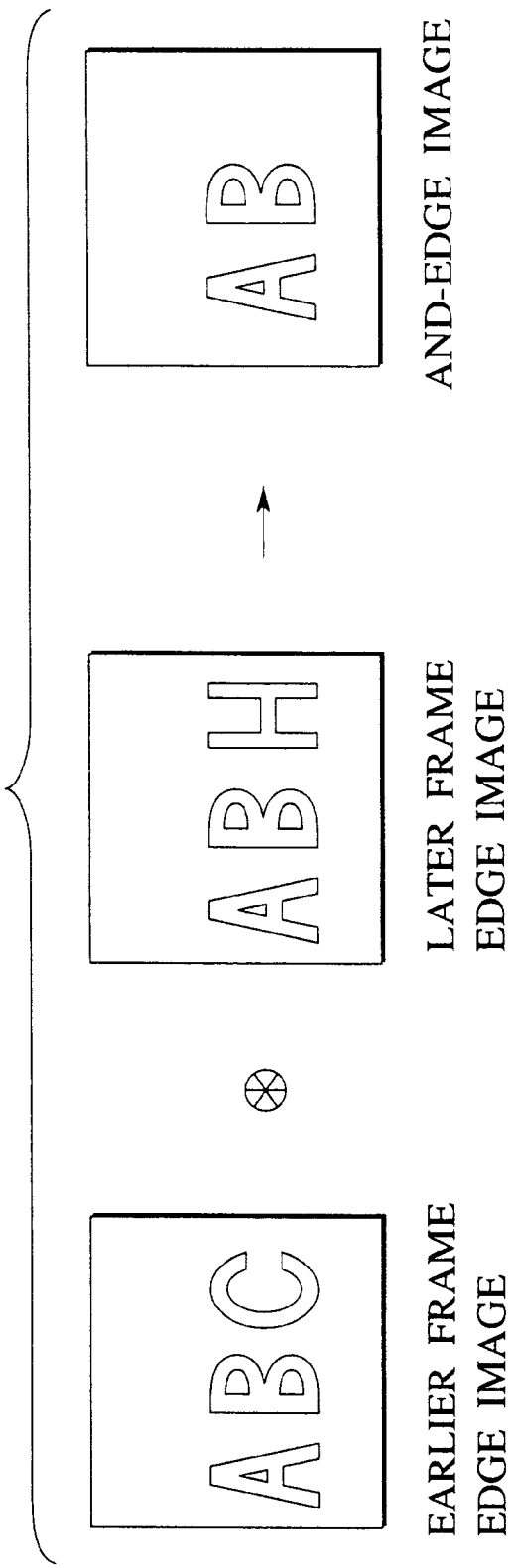
FIG. 11 is a diagram showing an exemaplry case of comparing an earlier frame edge image and an AND-edge image in the apparatus of FIG. 1.

The intensity change between edges calculation unit 16 calculates a change of the intensity value between neighboring edge pixels as indicated in FIG. 9.

The edge pair counting unit 17 counts the number of edge pairs, where an edge pair is defined as each neighboring edges in which the gradient directions of the edges are opposite (up and down, or down and up) and the intensity change between the edges is small. In an exemplary case shown in FIG. 8, the number of edge pairs is 13. Also, in exemplary cases of the horizontal scanning and the vertical scanning shown in FIGS. 10A and 10B, the numbers of edge pairs are respectively 25 and 12.

The total edge pair number calculation unit 18 calculates the total number of edge pairs that are separately calculated for different scanning directions.

The edge pair number Judgement unit 19 compares the total number of edge pairs with a prescribed value.

The flag information set up unit 20 sets up a flag information to each sub-image according to a result of comparison of the total edge pair number with the prescribed value.

The flag information judgement unit 21 Judges whether an input frame is a telop character displaying frame or not according to the flag information of all the sub-images, and outputs the telop character displaying frame.

Figure 3:
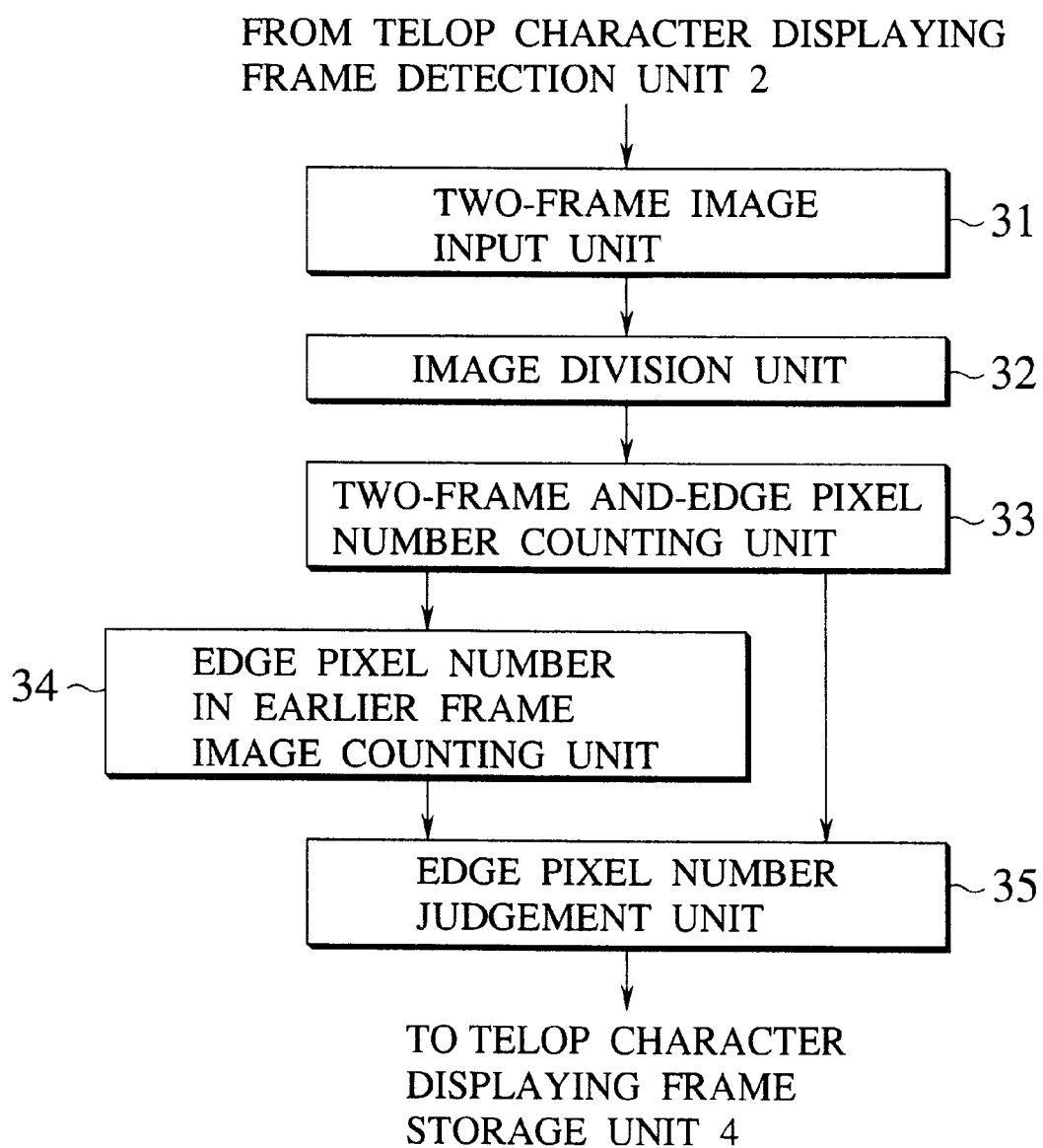
FIG. 3 is a block diagram showing a detailed configuration of an over-detected frame deletion unit in the apparatus of FIG. 1.

FIG. 3 shows a detailed configuration of the over-detected frame deletion unit 3, which comprises a two-frame image input unit 31, an image division unit 32, a two-frame AND-edge pixel number counting unit 33, an edge pixel number in earlier frame image counting unit 34, and an edge pixel number judgement unit 35.

The two-frame image input unit 31 inputs two frames that are detected consecutively in time as telop character displaying frames by the telop character displaying frame detection unit 3.

The image division unit 32 divides each one of two input frames that are consecutive in time into sub-images (see FIG. 6).

The two-frame AND-edge pixel number counting unit 33 counts the number of AND-edge pixels, where an AND-edge pixel is defined as a pixel which are edge pixels at the corresponding position in both of the two input frames that are consecutive in time.

The edge pixel number in earlier frame image counting unit 34 counts the total number of edge pixels in a frame image that is earlier in time among the two input frames.

The edge pixel number Judgement unit 35 calculates a ratio of the total number of AND-edge pixels with respect to the total number of edge pixels in the earlier frame. In an exemplary case shown in FIG. 11, a ratio of the total number of edge pixels in an AND-edge image "AB" with respect to the total number of edge pixels in the earlier frame edge image "ABC" will be calculated. Then, the edge pixel number Judgement unit 35 outputs the earlier frame among the two input frames as the telop character displaying frame when the number of sub-images in which the calculated ratio exceeds a prescribed range is less than a prescribed number that is specified for each scanning direction, for example. When this condition is not satisfied, the edge pixel number judgement unit 35 deletes the earlier frame among the two input frames.

Figure 4:
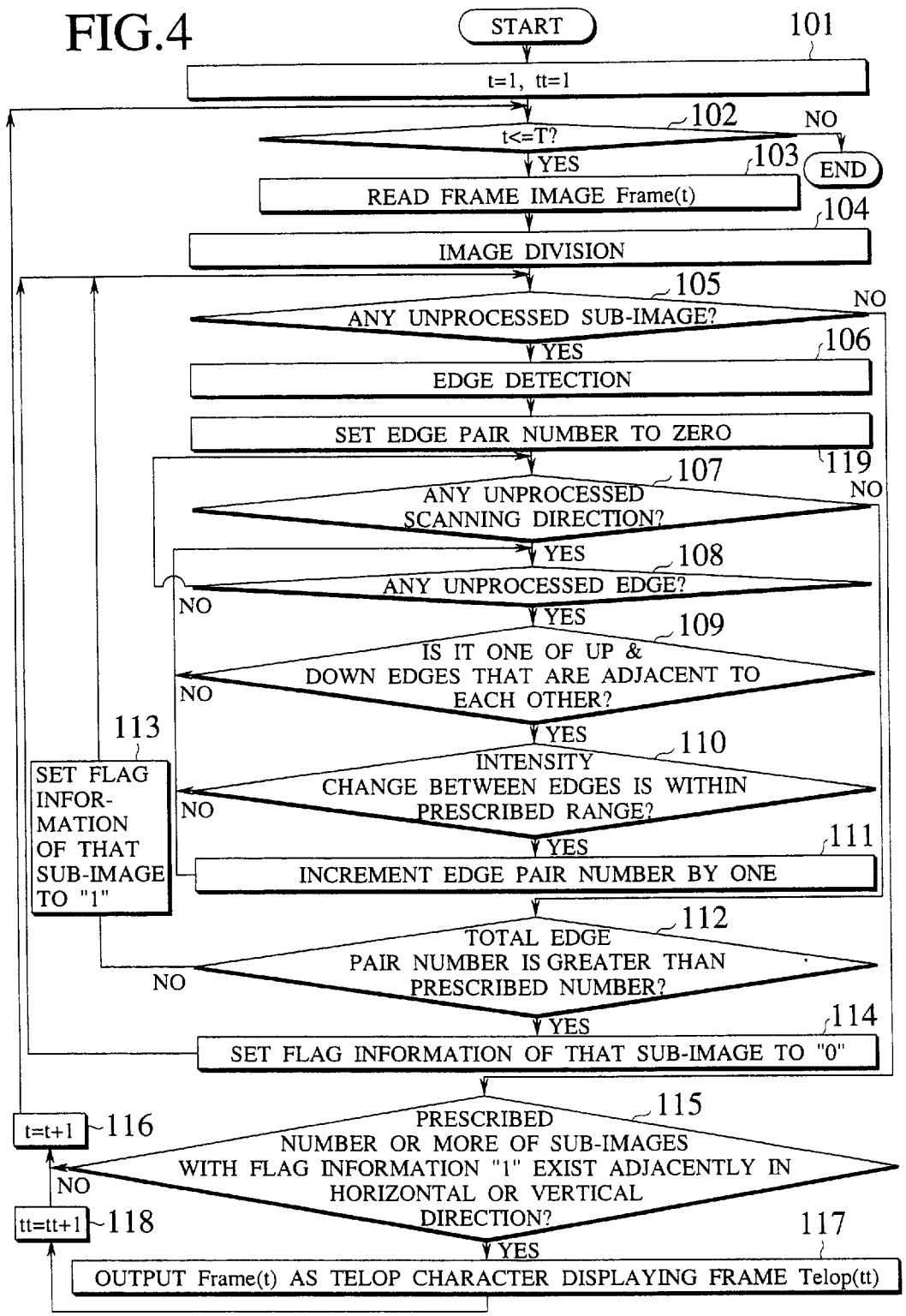
FIG. 4 is a flow chart for the processing procedure of the telop character displaying frame detection unit of FIG. 2.

FIG. 4 shows a processing procedure of the telop character displaying frame detection 2, which proceeds as follows.

First, a variable "t" for labelling the frame Image Frame(t) and a variable "tt" for labelling the telop character displaying frame Telop(tt) are initialized to "1" (step 101).

Then, whether the variable "t" is less than or equal to the total number T of the frame image Frame(t) or not is judged (step 102). When the variable "t" is greater than T, the processing is terminated. When the variable "t" is less than or equal to T, the frame image Frame(t) is read (step 103), and divided into sub-images (step 104).

Then, whether there is any unprocessed sub-image or not is judged (step 105). If there is an unprocessed sub-image, the edge pixels are detected from that sub-image (step 106), and the edge pair number is set to zero (step 119).

Then, whether there is any unprocessed scanning direction or not is judged (step 107). If there is an unprocessed scanning direction, whether there is any unprocessed edge pixel in that scanning direction or not is judged (step 108). If there is no unprocessed scanning direction, the processing returns to the step 107. If there is an unprocessed edge pixel, whether that edge pixel is one of up and down edges that are adjacent to each other or not is judged (step 109). If not, the processing returns to the step 108, whereas otherwise whether the intensity change between edges is within a prescribed range or not is judged (step 110). If not, the processing returns to the step 108, whereas otherwise the edge pair number is incremented by one (step 111) and the processing returns to the step 108.

When there is no unprocessed scanning direction at the step 107, the whether the total edge pair number for all the scanning directions is greater than a prescribed number or not is judged (step 112). If not, the flag information of that sub-image is set to "1" (step 113) and the processing returns to the step 105. Otherwise, the flag information of that sub-image is set to "0" (step 114) and the processing returns to the step 105.

When there is no unprocessed sub-image at the step 105, whether or not a prescribed number or more of sub-images with the flag information "1" exist adjacently in the horizontal direction or the vertical direction is. judged (step 115). If not, the variable "t" is incremented by one (step 116) and the processing returns to the step 102. Otherwise, the frame image Frame(t) is outputted as the telop character displaying frame Telop(tt) (step 117). Then the variable "tt" is incremented by one (step 118) and the variable "t" is incremented by one (step 116) and the processing returns to the step 102.

Note that the step 102 may be placed after the step 116, and the step 105 may be placed after the steps 113 and 114.

Also, the steps 108 and 107 may be placed after the steps 109 NO, 110 NO, and 111.

Figure 5:
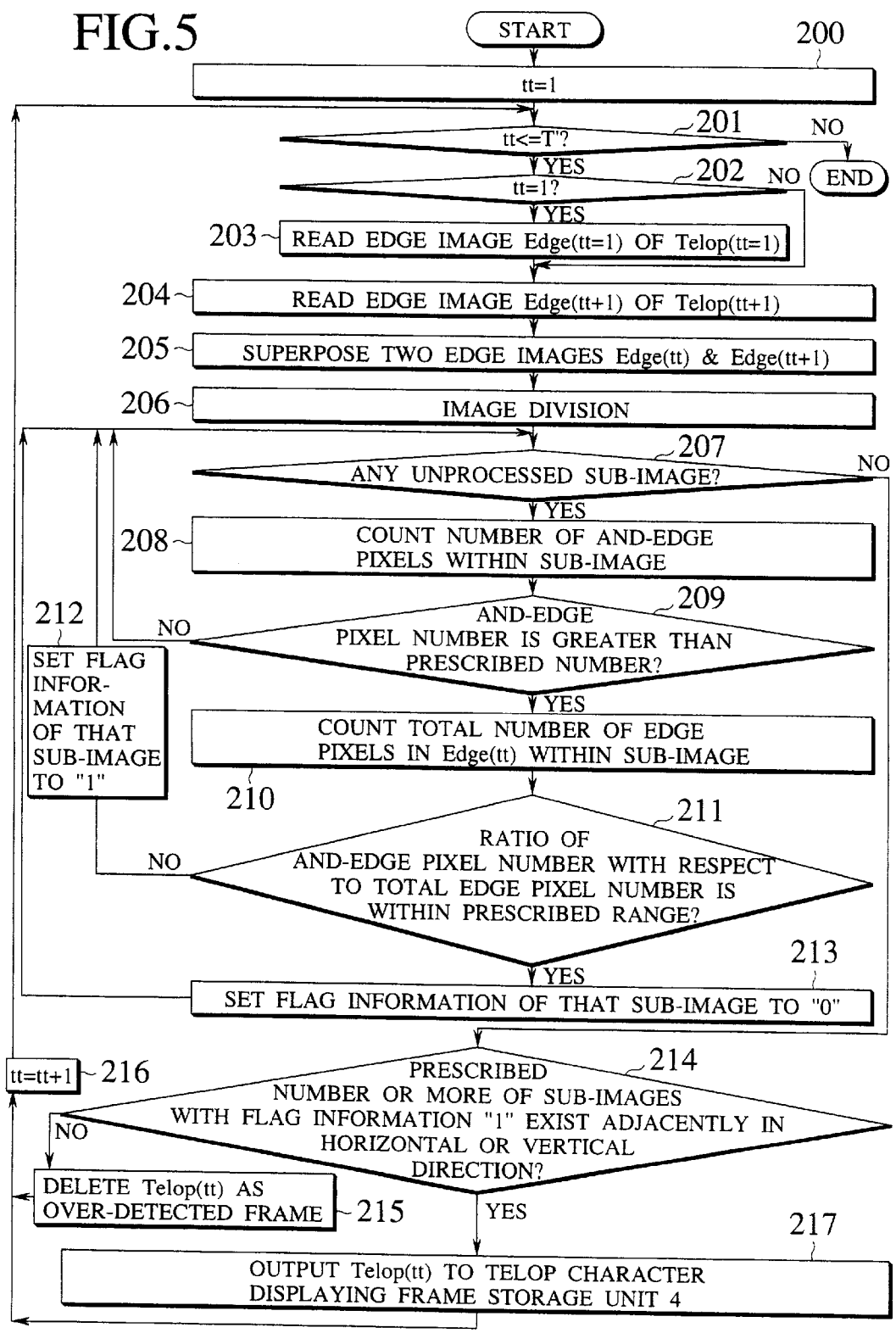
FIG. 5 is a flow chart for the processing procedure of the over-detected frame deletion unit of FIG. 3.

FIG. 5 shows a processing procedure of the over-detected frame deletion unit 3, which proceeds as follows.

First, the variable "tt"for labeling the telop character displaying frame Telop(tt) is initialized to "1" (step 201).

Then, whether the variable "tt" is less than or equal to the total number T of the telop character displaying frames or not is judged (step 201). When the variable "tt" is greater than T, the processing is terminated. When the variable "tt" is less than or equal to T', whether the variable "tt" is equal to "1" or not is judged (step 202), and if so the edge image Edge (tt=1) of the telop character displaying frame Telop (tt=1) is read (step 203). Otherwise or after the step 203, the edge image Edge(tt+1) of the telop character displaying frame Telop(tt+1) is read (step 204), and the two edge images Edge(tt) and Edge(tt+1) are superposed by aligning positions (step 205), while the edge images Edge(tt) and Edge(tt+1) are divided into sub-images (step 206).

Then, whether there is any unprocessed sub-image or not is judged (step 207). If there is an unprocessed sub-image, the number of AND-edge pixels which are edge pixels at the corresponding position in both frames Telop(tt) and Telop (tt+1) within that sub-image is counted (step 208), and whether the AND-edge pixel number counted at the step 208 is greater than a prescribed number or not is judged (step 209). If not, the processing returns to the step 207. Otherwise, the total number of edge pixels in the edge image Edge(tt) within that sub-image is counted (step 210), and whether a ratio of the AND-edge pixel number counted at the step 208 with respect to the total edge pixel number counted at the step 210 is within a prescribed range or not is judged (step 211). If not, the flag information of that sub-image is set to "1" (step 212) and the processing returns to the step 207. Otherwise, the flag information of that sub-image is set to "0" (step 213) and the processing returns to the step 207.

When there is no unprocessed sub-image at the step 207, whether or not a prescribed number or more of sub-images with the flag information "1" exist adjacently in the horizontal direction or the vertical direction is judged (step 214). If not, the telop character displaying frame Telop(tt) is deleted as the over-detected frame (step 215), and then the variable "tt" is incremented by one (step 216) and the processing returns to the step 201. Otherwise, the telop character displaying frame Telop(tt), is outputted to the telop character displaying frame storage unit 4 (step 217), and then the variable "tt" is incremented by one (step 216) and the processing returns to the step 201.

Note that the step 201 may be placed after the step 216, and the step 207 may be placed after the steps 209 NO, 212, and 213.

Note that the case of using the horizontal direction and the vertical direction as the scanning directions has been described above, but it is also possible to use oblique directions.

Figure 12:
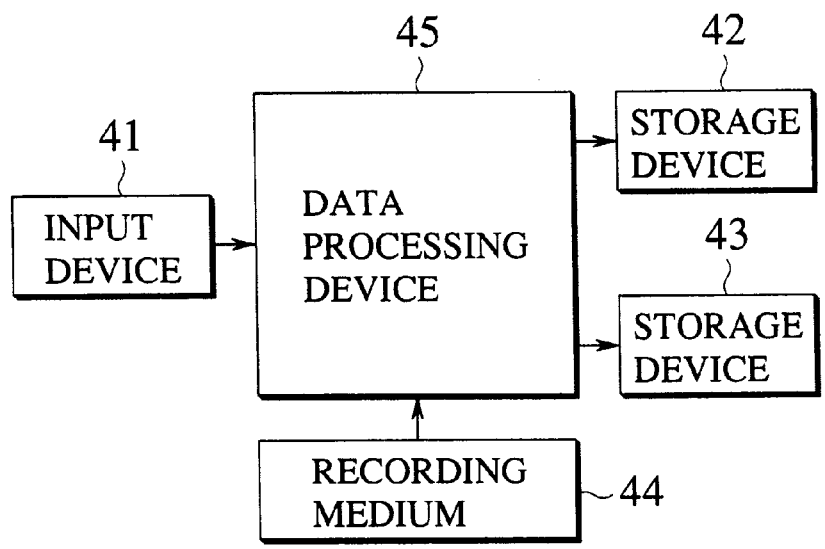
FIG. 12 is a block diagram showing an alternative configuration of a telop character displaying frame detection apparatus according to the first embodiment of the present invention.

It is also possible to realize the telop character displaying frame detection apparatus of this first embodiment in a configuration shown in FIG. 12, which comprises an input device 41 for inputting the video image, a storage device 42 for storing the video image, a storage device 43 for storing the telop character displaying frames, a recording medium 44 such as floppy disk, CD-ROM, semiconductor memory, etc., that is recording the telop character displaying frame detection program, and a data processing device 45 for reading and executing the telop character displaying frame detection program recorded in the recording medium 44.

Figure 13:
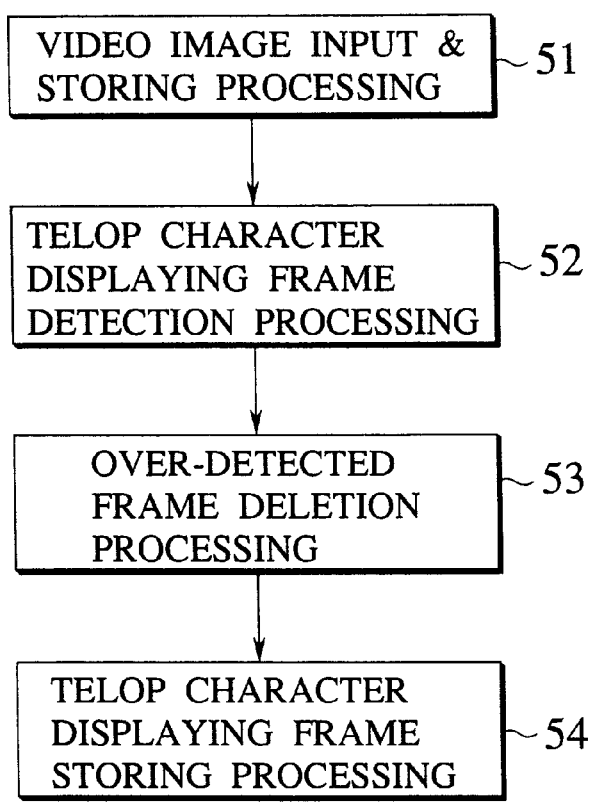
FIG. 13 is a block diagram showing a configuration of a telop character displaying frame detection program used in the apparatus of FIG. 12.

As shown in FIG. 13, the telop character displaying frame detection program includes a video image input and storing processing 51 for inputting the video image in frame units and storing it into the storage device 42, a telop character displaying frame detection processing 52 for detecting the telop character displaying frames from the input frames according to the processing of FIG. 4, an over-detected frame deletion processing 53 for deleting over-detected frames from the telop character displaying frames according to the processing of FIG. 5, and a telop character displaying frame storing processing 54 for storing the remaining telop character displaying frames into the storage device 43.

In the telop character displaying frame detection processing of FIG. 4, after the gradient direction of the neighboring edge pixels within each sub-image of the video image is judged, the cases in which the intensity change between edge pixels is small are counted as the edge pairs. Since the internal color of the telop characters is usually monotone, it becomes possible to reduce the erroneous detection of frames with the large intensity change between edges in this way.

Also, unlike the conventional method which inputs the video image in units of plural frames that are consecutive in time and uses the intensity difference between frames as a feature, the telop character displaying frame detection processing of FIG. 4 inputs each frame separately, and judges whether the telop characters are displayed in that one frame or not using only information of that one frame. In this way, it becomes possible to detect a frame in which the telop characters are displayed in motion.

In addition, the over-detected frame deletion processing of FIG. 5 is provided, where two-frames that are consecutive in time are input from the telop character displaying frame detection processing, the number of edge pixels in the earlier one of the two input frames and the number of edge pixels that commonly appear in both of the two input frames are compared, and when the former number largely differs from the latter number, the two input frames are judged similar and the only the earlier one of the two input frames is outputted as the telop character displaying frame. In this way, when a plurality of frames displaying the same telop characters are detected, it is possible to leave only one of them and delete the others as the over-detected ones.

As described, according to this first embodiment, it is possible to provide a scheme for detecting telop character displaying frames in video image which is capable of suppressing erroneous detection of frames without telop characters and over-detection of frames displaying the same telop characters redundantly, so that it becomes possible to detect the telop character displaying frames from the video image accurately.

Referring now to FIG. 14 to FIG. 25, the second embodiment of the present invention concerning a detection of rolling telop characters will be described in detail.

Figure 14:
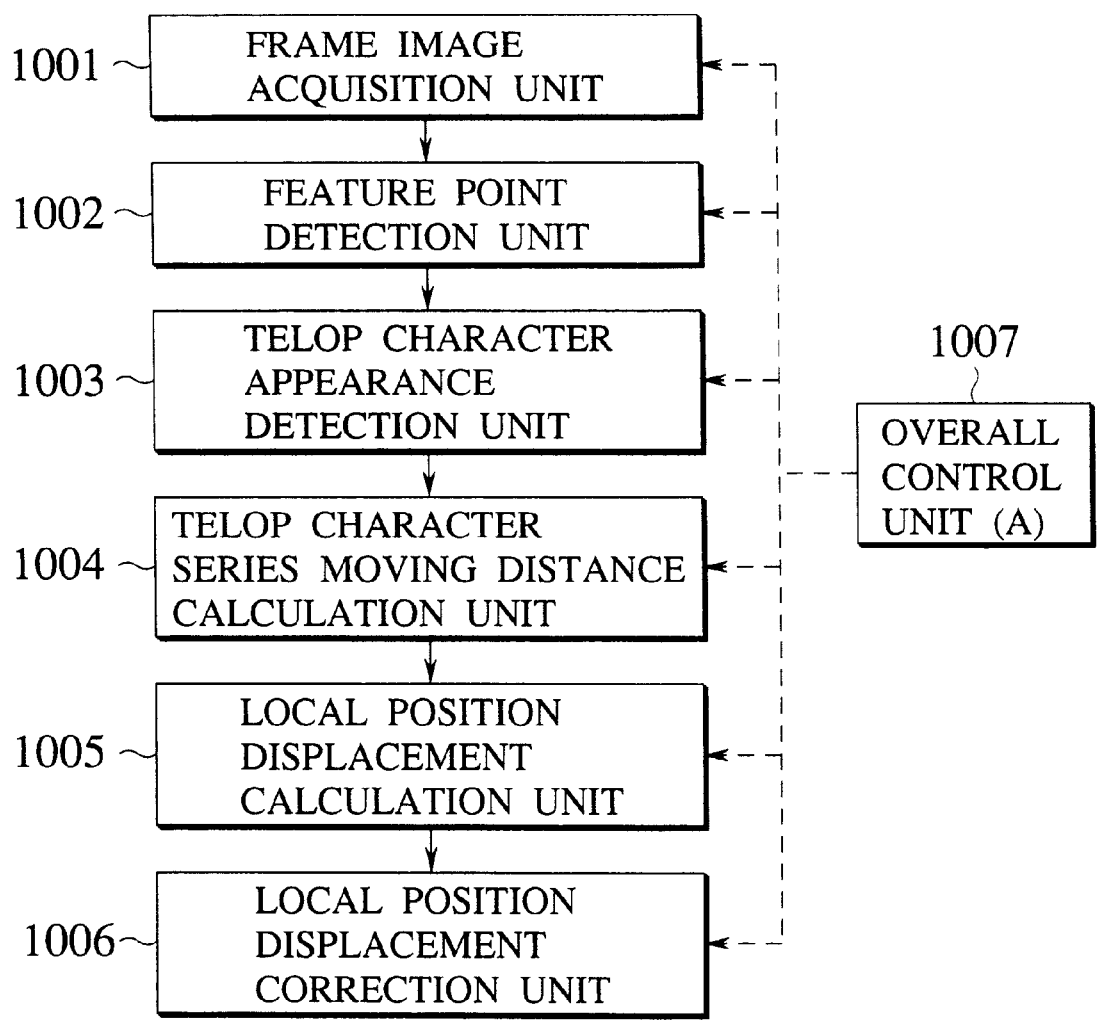
FIG. 14 is a block diagram showing a basic configuration of a telop character detection apparatus according to the second embodiment of the present invention.

FIG. 14 shows a basic configuration of a telop character detection apparatus of this second embodiment, which comprises: a frame image acquisition unit 1001 for acquiring frame images from video data; a feature point detection unit 1002 for detecting feature points that characteristically appear at character portions from the frame images; a telop character appearance detection unit 1003 for detecting an appearance of telop characters from a spatial distribution of the feature points; a telop character series moving distance calculation unit 1004 for calculating a moving distance of the telop characters as a whole by matching the feature points between two consecutive frame images; a local position displacement calculation unit 1005 for calculating a local displacement of each character portion constituting the telop by locally matching the feature points detected by using the moving distance of the telop characters as a whole that is calculated from the two consecutive frame images; a local position displacement correction unit 1006 for correcting a local position displacement by applying appropriate geometric transformation to a part of one frame image among the two frame images; and an overall control unit (A) 1007 for controlling these elements 1001 to 1006.

Figure 15:
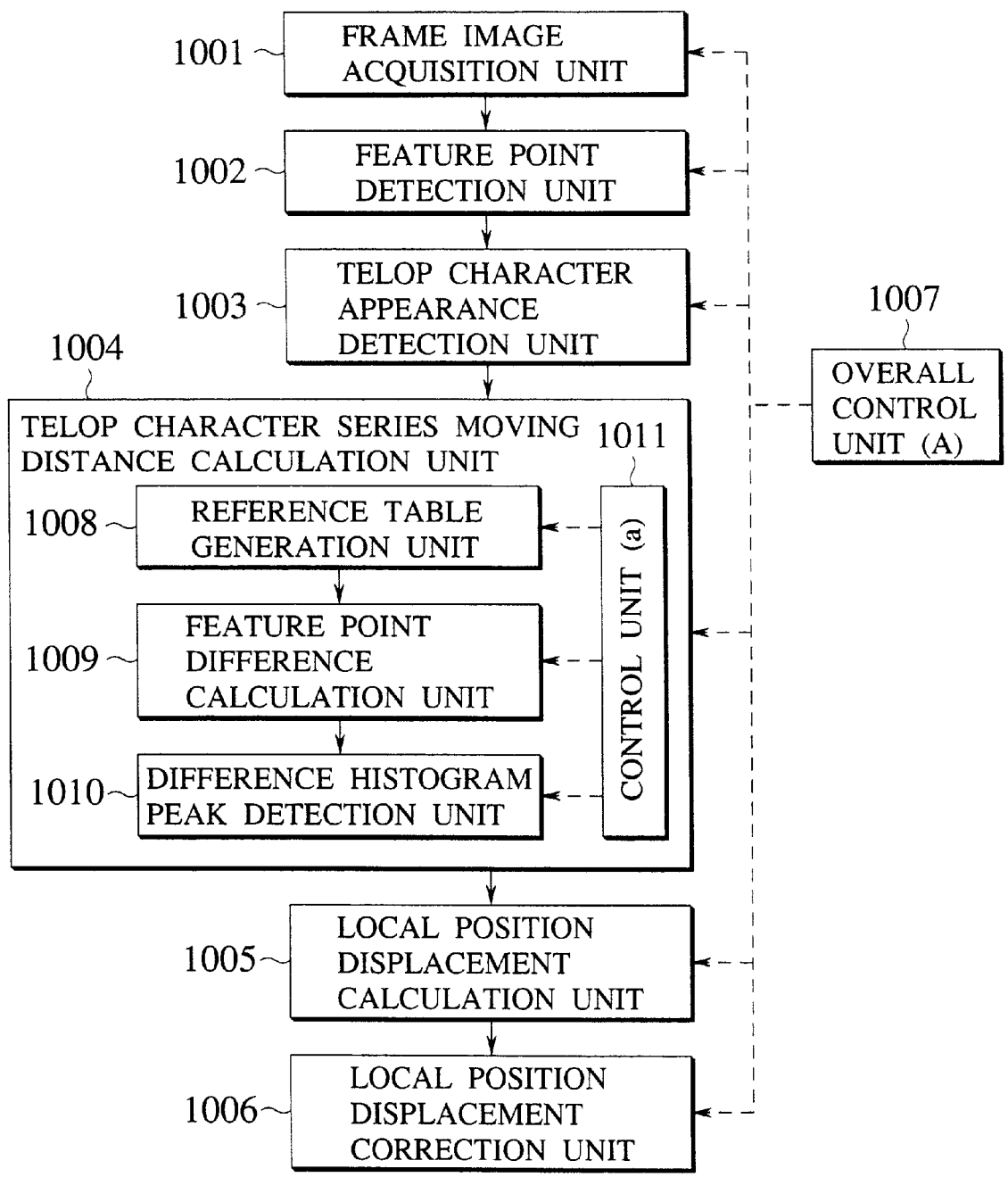
FIG. 15 is a block diagram of the apparatus of FIG. 14 showing a detailed configuration of a telop character series moving distance calculation unit.

FIG. 15 shows a detailed configuration of the telop character series moving distance calculation unit 1004 in the telop character detection apparatus of FIG. 14, which comprises: a reference table generation unit 1008 for generating reference tables which record positions of the feature points on each horizontal or vertical line on the image; a feature point difference calculation unit 1009 for calculating differences of a position of each feature point on the horizontal or vertical line in some image with respect to a position of every feature point registered in the reference tables for each line; a difference histogram peak detection unit 1010 for calculating a histogram of all the differences calculated for all the lines in the horizontal or vertical direction and detecting the most frequent difference; and a control unit (a) 1011 for controlling 1008 to 1010 with respect to the entire image.

Figure 16:
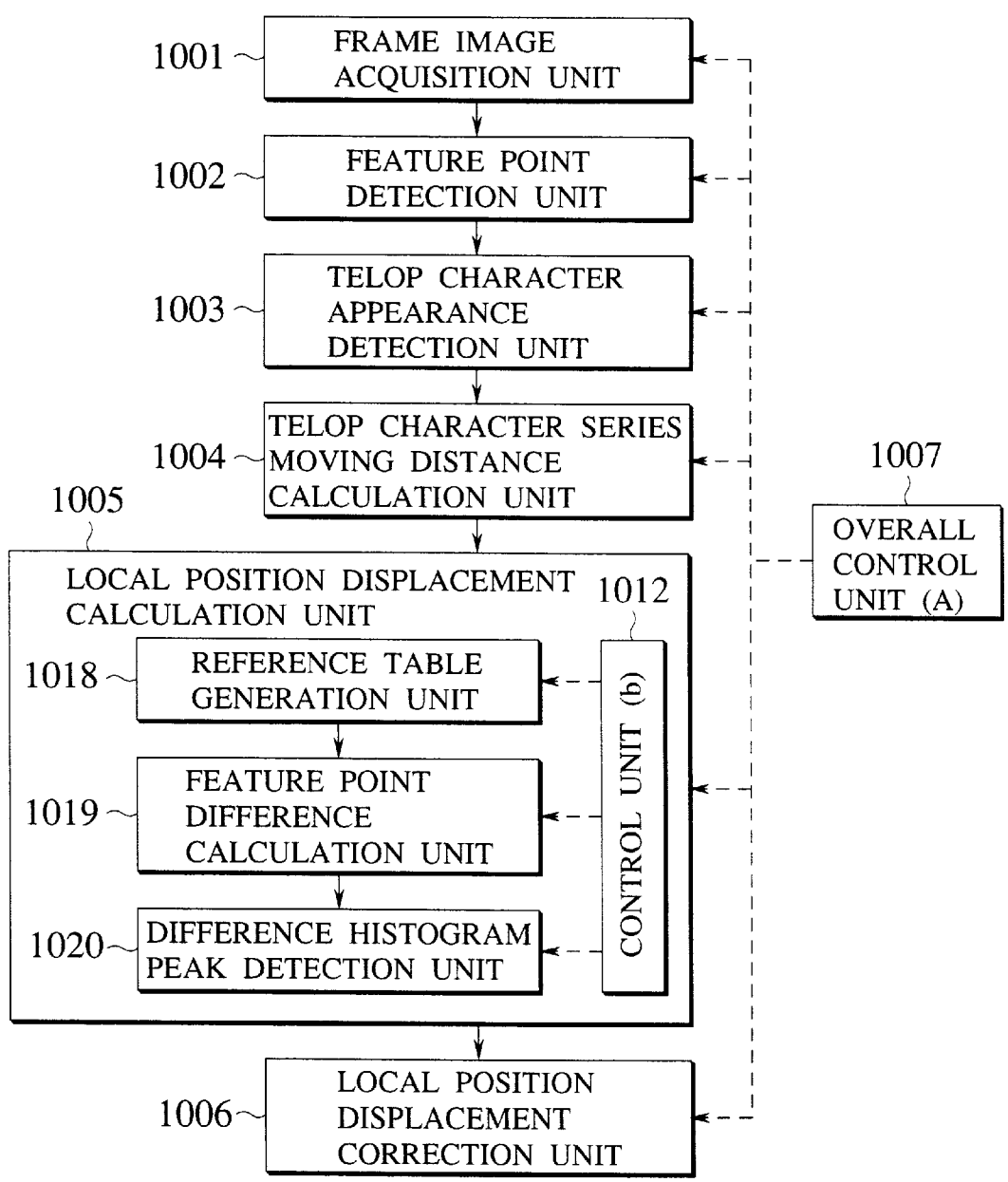
FIG. 16 is a block diagram of the apparatus of FIG. 14 showing a detailed configuration of a local position displacement calculation unit.

FIG. 16 hows a detailed configuration of the local position displacement calculation unit 1005 in the telop character detection apparatus of FIG. 14, which comprises: a reference table generation unit 1018 for generating reference tables which record positions of the feature points on each horizontal or vertical line on the image; a feature point difference calculation unit 1019 for calculating differences of a position of each feature point with respect to a position of every feature point registered in the reference tables within each small local region in the image, after the displacement by the telop character series moving distance obtained by the telop character series moving distance calculation unit 1004; a difference histogram peak detection unit 1020 for calculating a histogram of all the differences calculated for each local region and detecting a peak indicating the most frequent difference so as to obtain a local minute moving distance; and a control unit (b) 1012 for controlling 1018 to 1020 with respect to the entire image.

Figure 17:
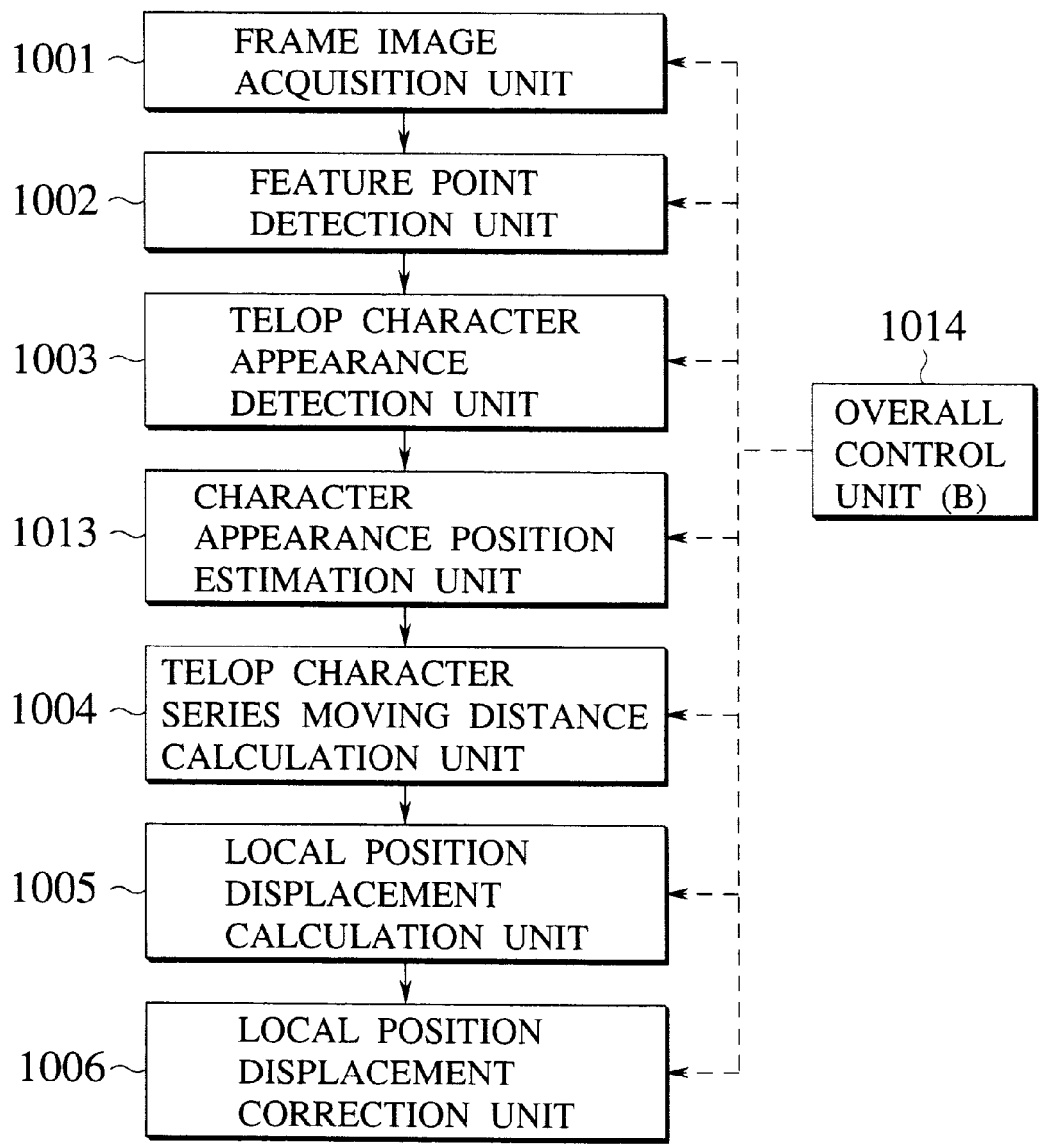
FIG. 17 is a block diagram showing a modified configuration of a telop character detection apparatus according to the second embodiment of the present invention.
Figure 18:
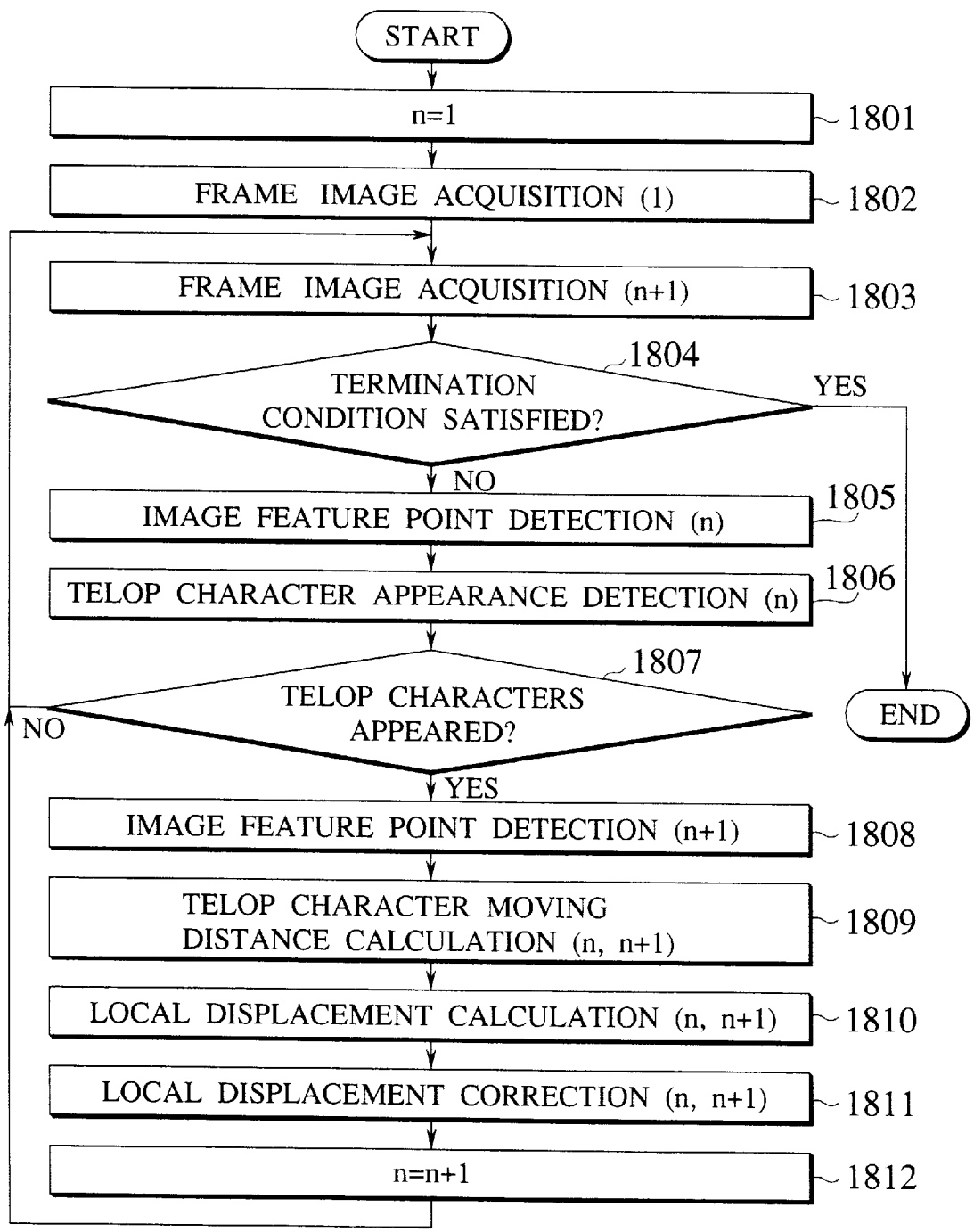
FIG. 18 is a flow chart for the processing procedure of the apparatus of FIG. 14.

FIG. 17 shows a modified configuration of the telop character detection apparatus of this second embodiment, which comprises the elements 1001 to 1006 similar to those of FIG. 14 and a character appearance position estimation unit 1013 provided between the telop character appearance detection unit 1003 and the telop character series moving distance calculation 1004, which detects image portions which have a high probability of having the telop characters appearing therein, and an overall control unit (B) 1014, which is provided instead of the overall control unit (A) 1007 of FIG. 14, for controlling these elements 1001 to 1006 and 1013 such that the operations of the telop character series moving distance calculation unit 1004 and the local position displacement calculation unit 1005 are applied only with respect to the image portions which have a high probability of having the telop characters appearing therein.

Next, with references to FIG. 18 to FIG. 21, the processing according to the telop character detection scheme of this second embodiment as well as the operations of the elements described above will be described. In FIG. 18 to FIG. 21, "n" indicates a serial number of frames, and "(n)" indicates a processing target frame number. Note also that the following processing is to be sequentially repeated with respect to the sequentially generated frame images.

First, the serial number n is initialized to 1 (step 1801) and the first frame image (n=1) is acquired (step 1802). Then, the n+1-th frame image is acquired (step 1803) and whether a prescribed termination condition is satisfied or not is judged (step 1804). Here, the termination condition can be whether a prescribed processing time has elapsed or whether a finishing operation (command) is received from a user, for example.

When the termination condition is not satisfied, the image feature points are detected by the feature point detection unit 1002 from the n-th frame image that was acquired by the frame image acquisition unit 1001 (step 1805). Here, the feature point should preferably be that which appears characteristically at the telop character portion and which has a position that can be determined exactly. Examples of the feature point that satisfies this condition includes an intensity edge point, etc. In addition, it is more preferable to use the feature point which appears more dominantly at the telop character portion in order to obtain the high accuracy in the subsequent processing. An example of the feature point that appears dominantly at the telop character portion is the edge pair point as described in the first embodiment. The edge pair point is defined in view of the fact that the intensity distribution for the telop characters and the background image often takes a convex or concave shape, and can be obtained by extracting only those pairs of edges (edge pairs) which have the convex or concave shaped intensity change when viewed from the horizontal or vertical direction.

Figure 22:
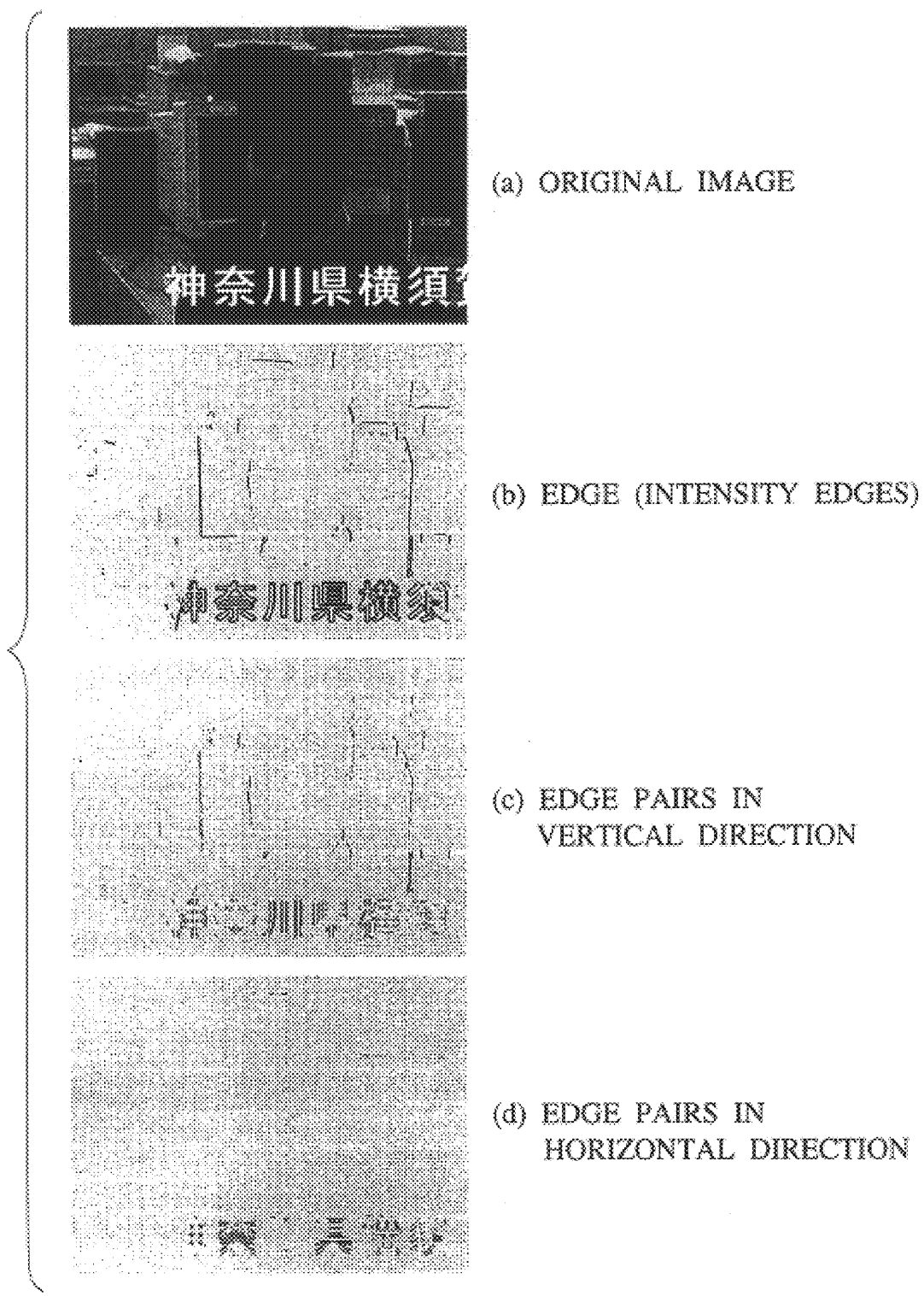
FIG. 22 is a sequential diagram showing an exemplary case of obtaining edge pair images in the apparatus of FIG. 14 to FIG. 17.

FIG. 22 shows exemplary edge pair images obtained by mapping edge pair points on the image, using edges (intensity edges) shown in a part (b) of FIG. 22 which are extracted from an original image shown in a part (a) of FIG. 22. A part (c) of FIG. 22 shows exemplary edge pair points that are generated when contour lines are parallel in the vertical direction as in a numerical figure "1" (which will be referred to as edge pair points in vertical direction hereafter), while a part (d) of FIG. 22 shows exemplary edge pair points that are generated when contour lines are parallel in the horizontal direction as in a minus sign "-" (which will be referred to as edge pair points in horizontal direction hereafter).

Next, the appearance of telop characters in the n-th frame image is detected by the telop character appearance detection unit 1003 (step 1806). Here, whether the telop characters are displayed or not can be judged as in the first embodiment described above. When the telop character appearance is not detected (step 1807 NO), the processing returns to the step 1803.

When the telop character appearance is detected (step 1807 YES), the image feature points such as edge pair points are detected by the feature point detection unit 1002 from the n+1-th frame image that was acquired consecutively after the n-th frame image (step 1808), similarly as in the step 1805.

Then, the moving distance of the telop characters as a whole is calculated by the telop character series moving distance calculation unit 1004 from the n-th frame image and the n+1-th frame image, using the processing A and the processing B described below (step 1809). Note that the consecutive frame images may not necessarily be given at the video rate (30 frames per second), and the telop character series moving distance can be calculated as long as about a half or more of the rolling telop characters are commonly displayed in both frame images. In the case of the rolling telop displayed at a usual speed, this calculation can be done for a rate of about 2 to 3 frames per second. Note also that the following description is directed to the case of dealing with the telop that is rolling in the horizontal direction, but the same principle can also deal with the telop that is rolling in the vertical direction, by merely interchanging the horizontal direction and the vertical direction.

Figure 19:
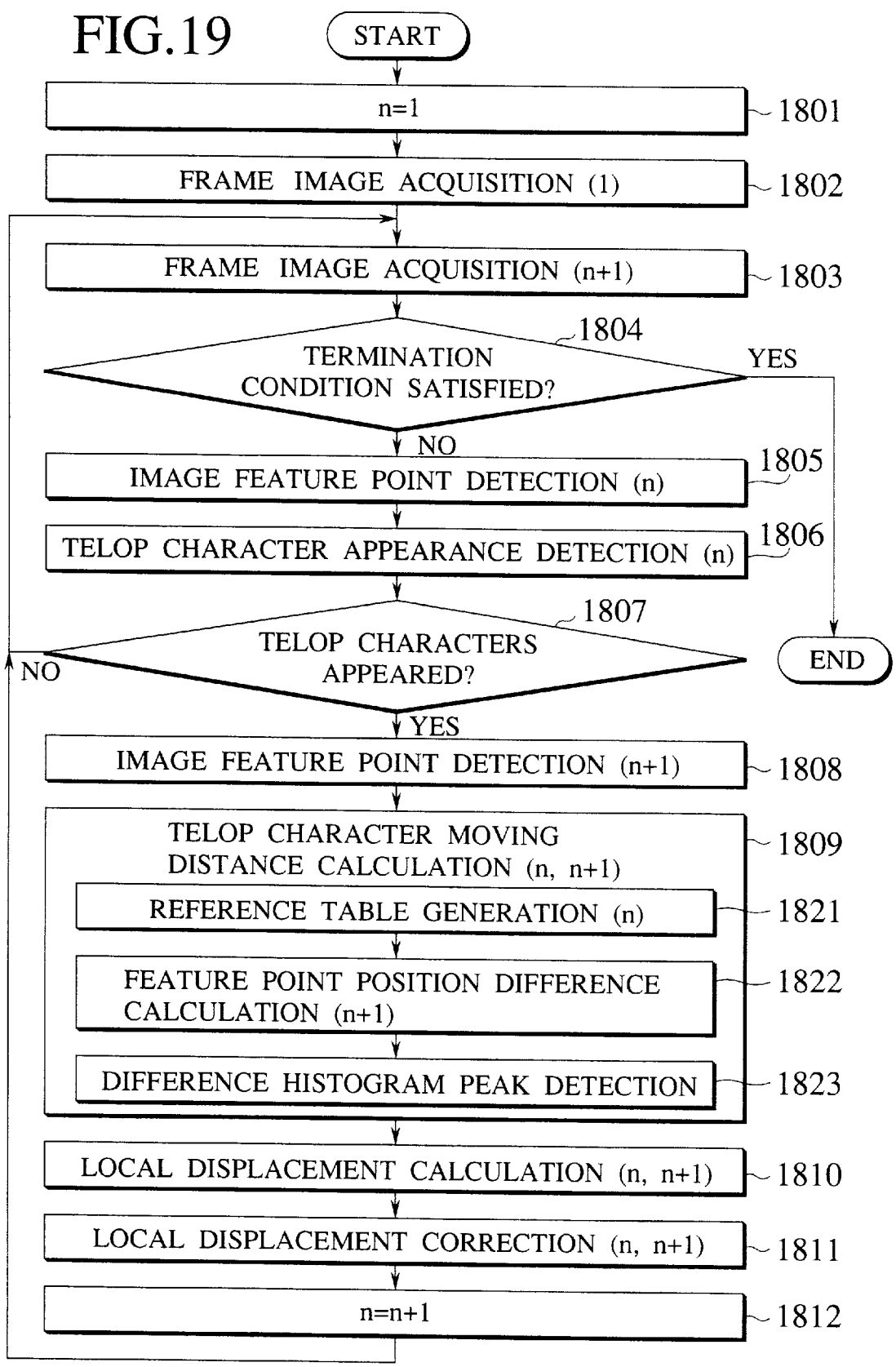
FIG. 19 is a flow chart for the processing procedure of the apparatus of FIG. 14 showing the processing procedure of the telop character series moving distance calculation unit of FIG. 15.
Figure 20:
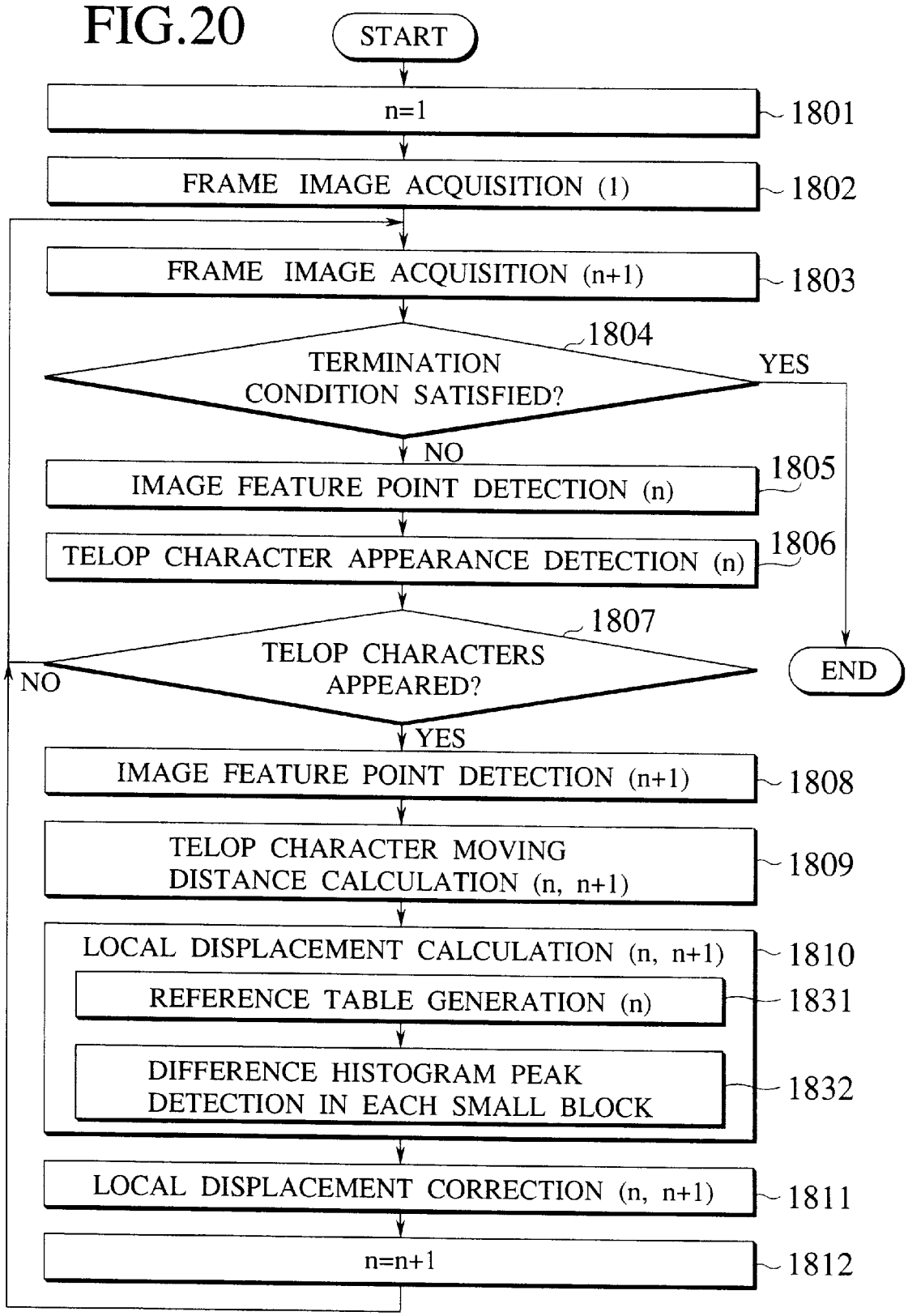
FIG. 20 is a flow chart for the processing procedure of the apparatus of FIG. 14 showing the processing procedure of the local position displacement calculation unit of FIG. 16.

Here, the telop character series moving distance calculation unit 1004 calculates the telop character series moving distance from two frame images of the n-th frame and the n+1-th frame that was acquired at a prescribed period of time (not necessarily exactly and can be within a condition of about 2 to 3 frames per second mentioned above) after the n-th frame, by the steps 1821 to 1823 shown in FIG. 19 using the configuration shown in FIG. 15, as follows.

<Processing A>

Figure 23:
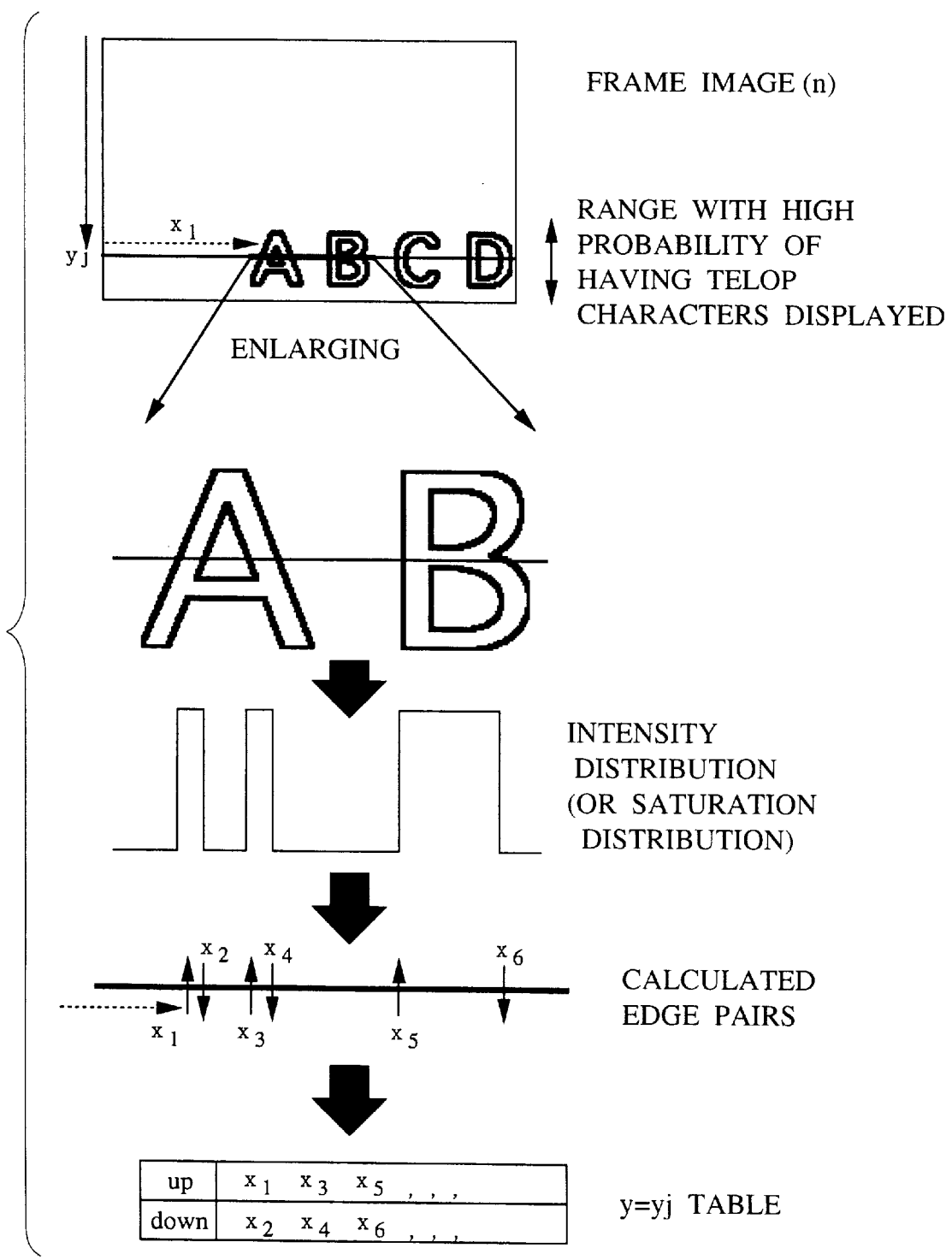
FIG. 23 is a sequential diagram showing an exemplary case of reference table production in the apparatus of FIG. 14 to FIG. 17.

First, the reference table generation unit 1008 generates reference tables registering coordinates of edge pair points viewed from a reference point (left end) of the image, for the edge pair points in vertical direction among the edge pair points calculated from the n-th frame, as shown in FIG. 23 (step 1821). These reference tables are generated separately for each line along the horizontal direction in the image. Also, at this point, the reference tables are generated separately for those edge points at which the intensity rises spatially (edge points in up direction) and those edge points at which the intensity falls spatially (edge points in down direction). Consequently, when the number of pixels in the vertical direction of the image is Ny, altogether (Ny×2) sets of the reference tables will be generated.

Note that, among the calculated&edge pair points, the edge pair points that exist at the same positions in the two frames can be regarded as originating from static objects and the edge pair points that exist only in one of the two frames can be regarded as originating from moving objects. Consequently, by removing the edge pair points that exist at the same positions in the two frames from the calculated edge pair points, it is possible to retain only those edge pair points which are originating from moving objects. In this way, it is possible to reduce an influence of edge pair points obtained from the static objects in the background that are unrelated to the rolling telop characters, so that it becomes possible to detect the rolling telop in better precision.

Figure 21:
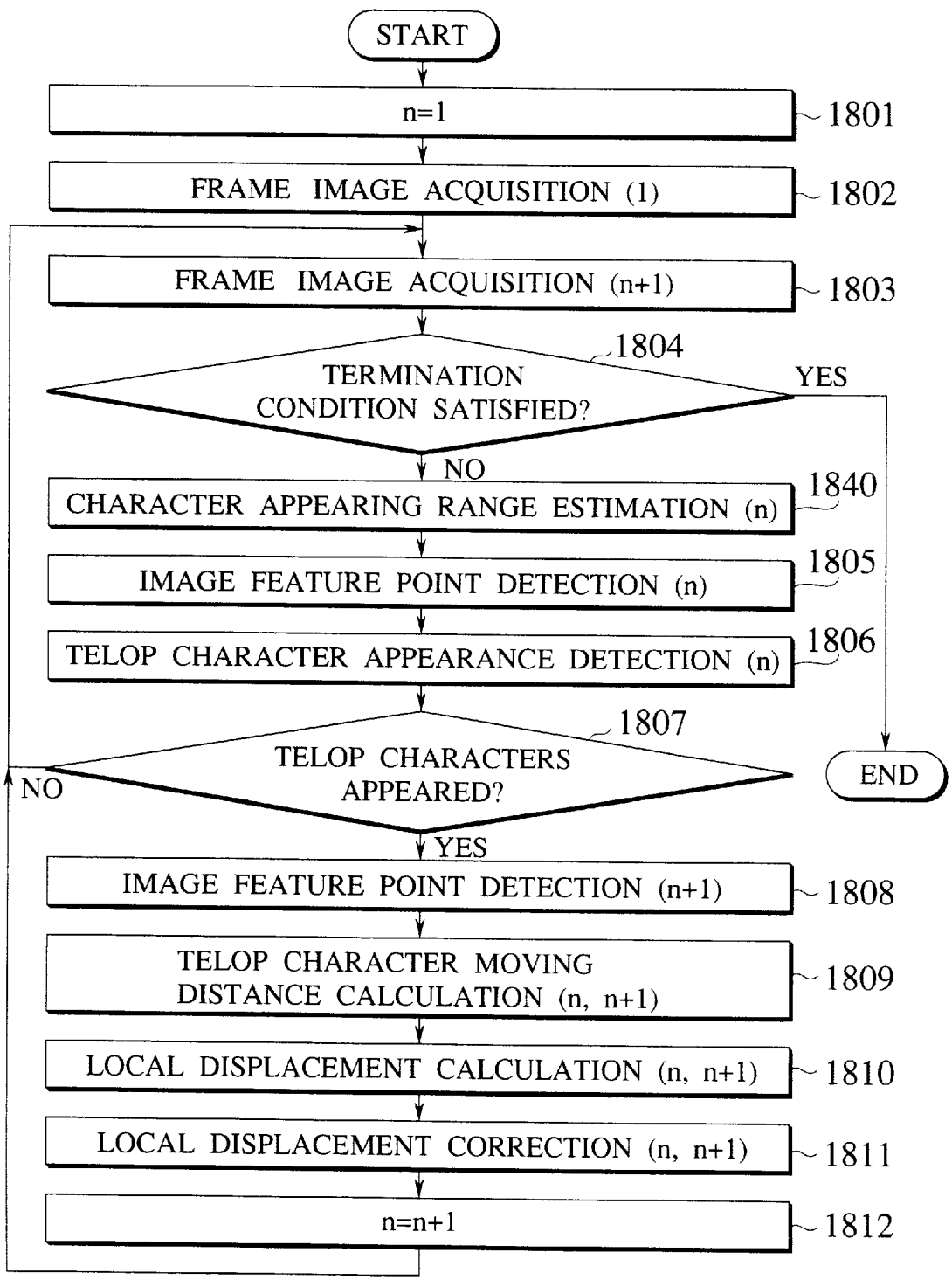
FIG. 21 is a flow chart for the processing procedure of the apparatus of FIG. 17.

Note here that, it is also possible find a range with a high probability of having telop characters displayed, by using the density of the edge pair points mentioned above as described in Japanese Patent Application No. 9-129075 (1997), so that it is also possible to estimate the range with a high probability of having telop characters displayed by the character appearance position estimation unit 1013 shown in FIG. 17 at the step 1840 shown in FIG. 21, and generate the reference tables only with respect to the estimated range at this step 1821, as indicated in FIG. 23, so as to reduce an influence of the edge pairs detected from portions other than the telop character portion (background noise).

<Processing B>

Figure 24:
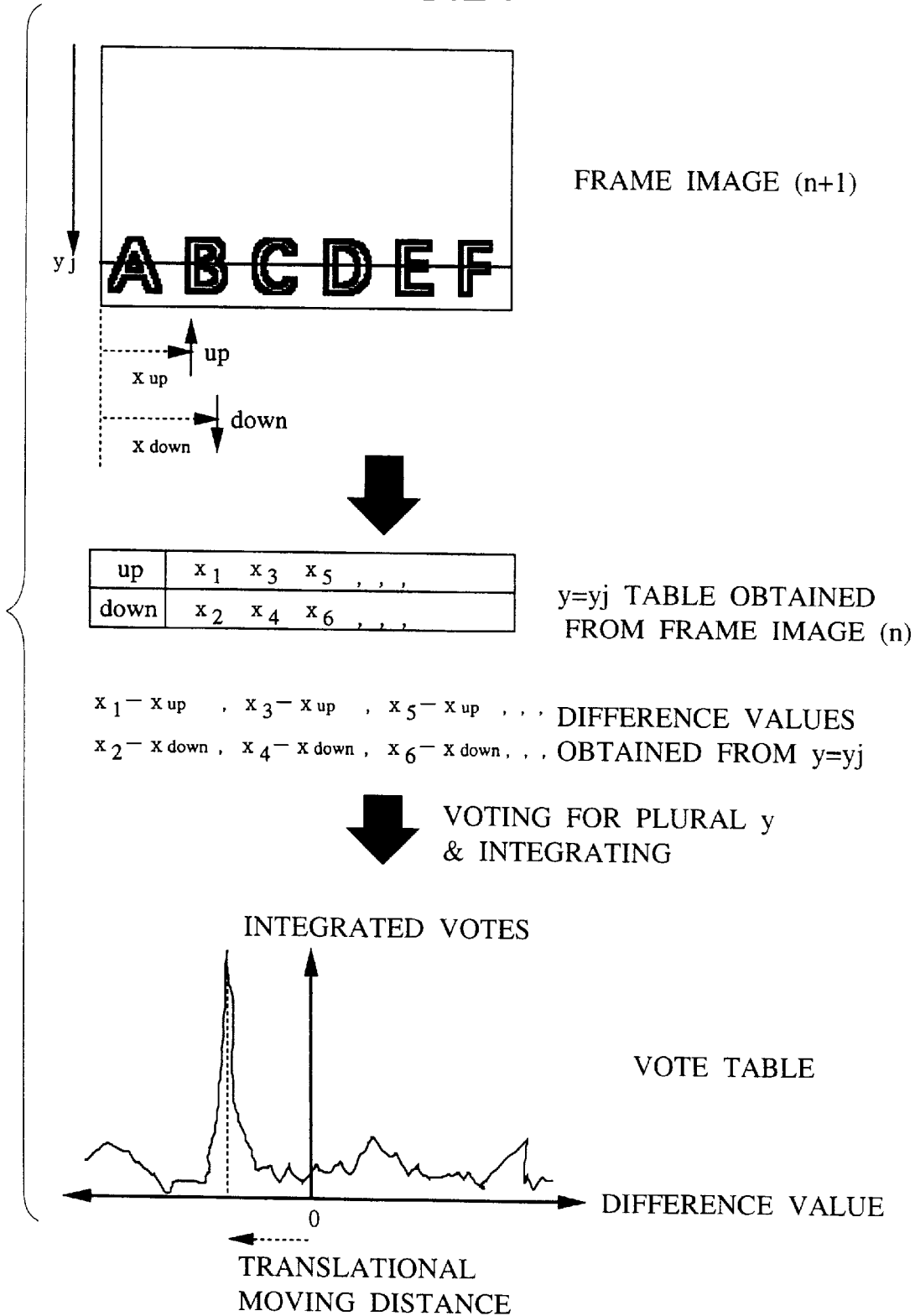
FIG. 24 is a sequential diagram showing an exemplary case of a telop character moving distance calculation in the apparatus of FIG. 14 to FIG. 17.

Then, the feature point difference calculation unit 1009 calculates differences of each edge pair point in vertical direction that is calculated in the n+1-th frame image for each horizontal line with respect to every coordinates registered in the reference tables for a corresponding line (a line having the same coordinate in the vertical direction), and votes the calculated differences into a difference vote table at the difference histogram peak detection unit 1010, as shown in FIG. 24 (step 1822). This vote table accumulates the number of votes for each difference value, by summing (adding) all the votes made for different lines. As a result of this voting, a sharp peak will be produced when the telop characters commonly exist in both frame images. A difference value that produces this peak corresponds to the translational moving distance of the telop characters displayed in the two frame images, which is detected by the difference histogram peak detection unit 1010 (step 1823). This voting processing is based on the generally known principle of the generalized Hough transformation.

Here, the two frames are superposed using the calculated moving distance, and a level (rate) of overlapping among the feature points that are located within the overlapping region is evaluated and compared with a prescribed rate value (threshold). Then, when the rate of overlapping is low, it is judged that the rolling telop does not exist, whereas when the rate of overlapping is high, it is judged that the rolling telop exists.

By the processing A and the processing B described above, it is possible to calculate the translational moving distance of the telop characters. However, the rolling telop is often associated with distortion. There are various patterns for the distortion, but most of them can be classified into the following two patterns.

(1) A case where the telop moves slightly slant (upwards toward right or downwards toward right).

(2) A case where the characters are extended or contracted in the moving direction when the image near the edge and the image around the center are compared.

There are also cases where these two patterns occur simultaneously.

In order to deal with such distortion, the local position displacement calculation unit 1005 calculates the local displacement from the n-th frame image and the n+1-th frame image (step 1810) and the local position displacement correction unit 1006 corrects the calculated local displacement (step 1811), using the processing C and the processing D described below.

<Processing C>

Figure 25:
FIG. 25 is a diagram showing two consecutive frame images and an overlapping region between them used in the apparatus of FIG. 14 to FIG. 17.

Here, the correction for the above pattern (1) is made as follows. When the two frame images are superposed according to the moving distance calculated by the above processing B, the distortion of the pattern (1) causes a displacement in vertical direction between the corresponding telop characters. For this reason, the following processing is applied to a range in which the same characters are commonly displayed (which will be referred to as an overlapping region hereafter) as indicated in FIG. 25, which can be estimated from the moving distance in the horizontal direction calculated by the processing B.

The above noted position displacement is corrected by calculating the local position displacement at the local position displacement calculation unit 1005 and applying appropriate geometrical transformation to a portion where the local displacement is detected at the local position displacement correction unit 1006. Here, the local position displacement calculation unit 1005 calculates the moving distance in vertical direction by using the configuration shown in FIG. 16, as follows. Namely, the moving distance in vertical direction can be calculated accurately by the voting processing similar to that of the processing B described above, which is carried out by the reference table generation unit 1018, the feature point difference calculation unit 1019 and the difference histogram peak detection unit 1020 of FIG. 16 by using the edge pair points in horizontal direction instead of the edge pair points in vertical direction used in the processing B and interchanging the vertical and horizontal directions in the voting processing described above for the processing B.

<Processing D>

Here, the correction for the above pattern (2) is made as follows. Note that the following processing is applied to the overlapping region as in the,processing C. Note also that the extension or contraction in the horizontal direction can be approximated by the translational motion per small region (small block) in the horizontal direction.

First, the overlapping region is divided into strip shaped small blocks at constant intervals in the horizontal direction as indicated in FIG. 25. Then, the local position displacement calculation unit 1005 calculates a minute translational horizontal moving distance for each small block by the steps 1831 and 1832 shown in FIG. 20 using the configuration shown in FIG. 16, where the voting processing similar to that of the processing B is carried out for each small block separately by the reference table generation unit 1018, the feature point difference calculation unit 1019 and the difference histogram peak detection unit 1020 of FIG. 16. Note here that there can be small blocks which contain no or hardly any telop characters, and the translational moving distance cannot be calculated correctly for such small blocks. Consequently, the translational moving distance is not calculated for those small blocks which have a small number of edge pair points within a block, and the translational moving distances calculated for the surrounding (left and right) small blocks are extrapolated for these small blocks.

Then, the local position displacement correction unit 1006 superposes the two frame images by using the minute translational moving distance calculated for each small block. At this point, the corresponding telop characters that are commonly displayed in these two frames can be superposed highly accurately by applying a processing such as thinning one line of pixels in the vertical direction or inserting one line of pixels in the vertical direction which are the same as those of the neighboring line.

After the local displacement correction at the step 1811 as described above, the serial number n is incremented by one (step 1812) and the processing returns to the step 1803 for the next frame.

After this processing is completed, the telop character images (images of the telop characters themselves) can be extracted by using the image region division method such as color segmentation. At this point, it is possible to extract high quality telop character images with little noise or blurring by superposing the corresponding telop characters that are displayed in a plurality of frame images.

Note that the above description is directed to the case of handling rolling telop characters but this second embodiment is equally applicable to the static telop characters as well because the static telop characters are just a special case of the rolling telop characters with the moving distance equal to zero.

Note also that the telop character detection apparatus of this second embodiment can be implemented in a form of a storage device such as a hard disk device or the like which is capable of storing video data or video frames obtained from the video data and freely reading them, a buffer or the like which is necessary in storing data at a time of carrying out the processing for the feature point detection, the telop character detection, the telop character series moving distance calculation, the location position displacement calculation, the location position displacement correction, etc., an output device such as a display device for displaying or outputting the desired video or information, an input device such as a keyboard or a mouse, and a computer or the like for controlling these devices in a prescribed procedure by executing the processing procedures or algorithms of this second embodiment shown in FIG. 18 to FIG. 21. Also, programs for causing the computer to execute these procedures or algorithms can be recorded and distributed on a computer readable medium such as floppy disk, memory card, MO, CD-ROM, etc.

As described, according to this second embodiment, the feature points of the character portion are detected from each frame image obtained from the video image, the appearance of the telop characters is detected from a spatial distribution of these feature points, the moving distance of the telop characters as a whole is calculated by matching the corresponding feature points in the frame image in which the appearance is detected and another frame image subsequent to that, the local displacement of each character portion in the telop is calculated by locally matching the feature points on each image after converting the coordinates of one frame image by using the calculated moving distance such that the telop characters that are commonly displayed on these frame images can spatially overlap, and the calculated local displacement is corrected such that the corresponding telop characters that are commonly displayed in these frame images can be accurately set in correspondences.

Consequently, it becomes possible to carry out the moving distance calculation for the rolling telop characters accurately at high speed, so that it becomes possible to detect the telop characters that are displayed in motion as a series of telop characters.

Also, according this second embodiment, the corresponding telop characters displayed in a plurality of frames can be superposed accurately even in the case of rolling telop characters, so that it becomes possible to extract the high quality telop character image with little noise or blurring.

As a result, it becomes possible to utilize the telop character information contained in the video image effectively and thereby enhance the utility of the video data at a video editing system for editing video data by attaching various information to video data, a video database system or a video image providing system for managing and retrieving video data, and a video input, recording, and displaying devices such as TV, VTR, DVD, etc.

Referring now to FIG. 29 to FIG. 39, the third embodiment of the present invention concerning a telop character region extraction will be described in detail.

Figure 29:
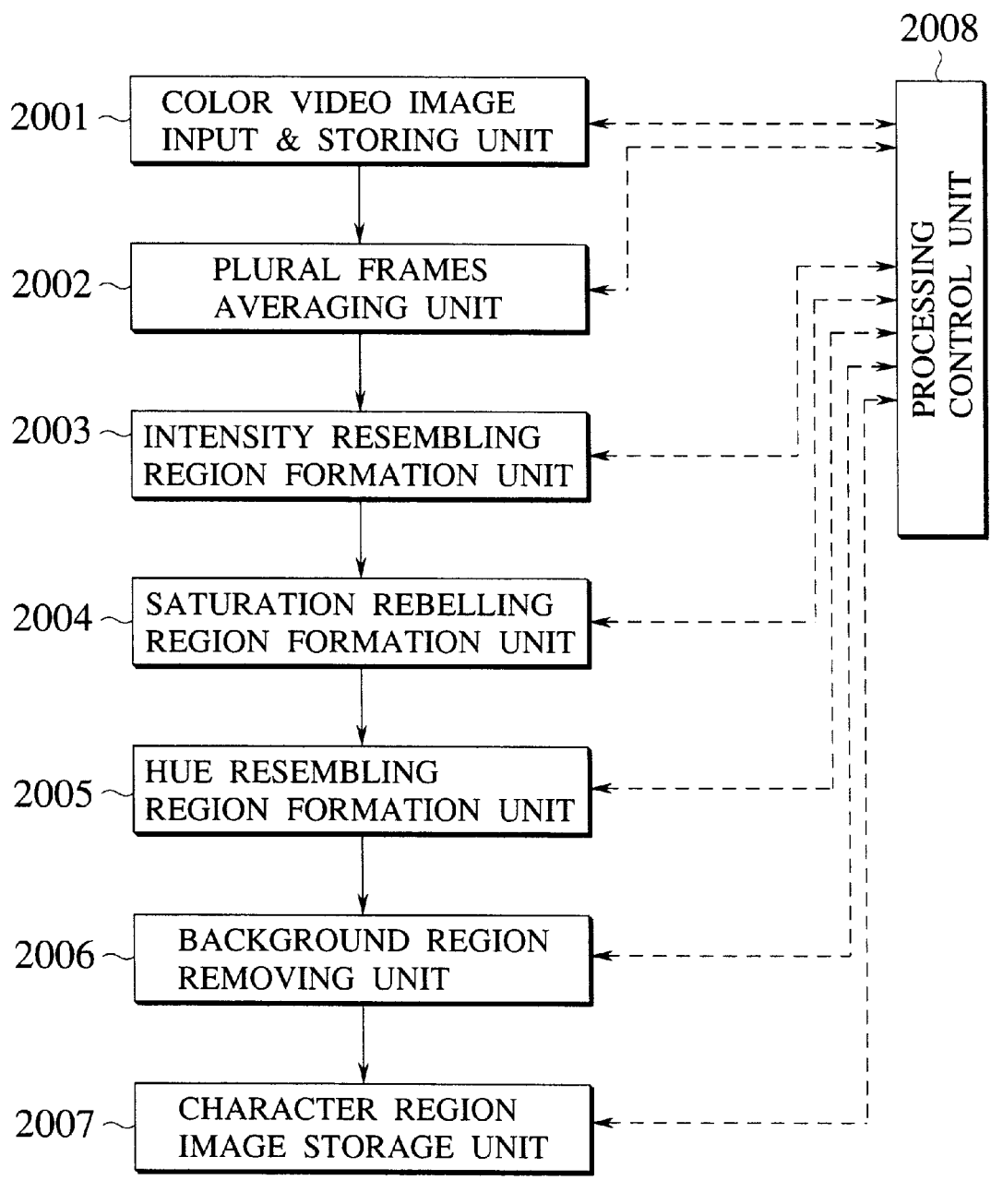
FIG. 29 is a block diagram showing an exemplary configuration of a character region extraction apparatus according to the third embodiment of the present invention.

FIG. 29 shows an exemplary configuration of the character region extraction apparatus in this third embodiment, which comprises a color video image input and storing unit 2001, a plural frames averaging unit 2002, an intensity resembling region formation unit 2003, a saturation resembling region formation unit 2004, a hue resembling region formation unit 2005, a background region removing unit 2006, a character region image storage unit 2007, and a processing control unit 2008.

The color video image input and storing unit 2001 enters a specified number of frames of the color image data on which processing target characters are displayed. and stored them in a memory.

The plural frames averaging unit 2602 generates an average value color image in which each pixel has an average value of pixels at corresponding positions in a plurality of frame images entered by the color video image input and storing unit 2001, for each one of RGB components.

The intensity resembling region formation unit 2003 forms connected regions each comprising a plurality of pixels which are neighboring with each other in the image space and which have similar intensity values in the average value color image obtained by the plural frames averaging unit 2002.

The saturation resembling region formation unit 2004 forms connected regions each comprising a plurality of pixels which are neighboring with each other in the image space and which have the similar saturation value in each region of the intensity resembling connected region image obtained by the intensity resembling region formation unit 2003.

The hue resembling region formation unit 2005 forms connected regions each comprising a plurality of pixels which are neighboring with each other in the image space and which have the similar hue value in each region of the intensity and saturation resembling connected region image obtained by the saturation resembling region formation unit 2004.

The background region removing unit 2006 removes those connected regions which do not satisfy the character region criteria from the connection regions in the intensity, saturation and hue resembling connected region image obtained by the hue resembling region formation unit 2005.

The character region image storage unit 2007 stores the character region extraction result image obtained by the background region removing unit 2006.

The processing control unit 2008 controls the processing of these elements 2001 to 2007.

Figure 30:
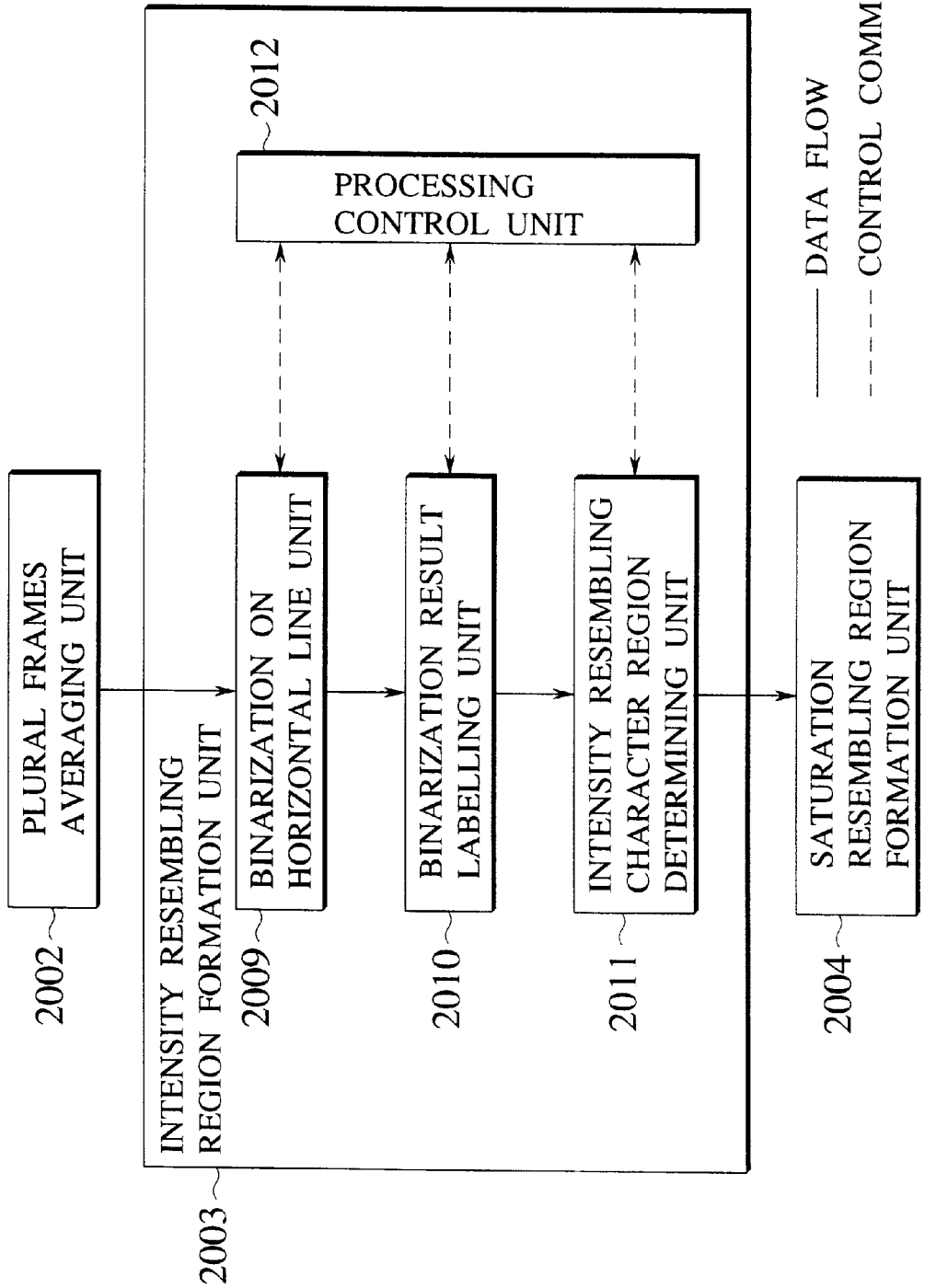
FIG. 30 is a block diagram showing an exemplary internal configuration of an intensity resembling region formation unit in the apparatus of FIG. 29.

FIG. 30 shows an exemplary internal configuration of the intensity resembling region formation unit 2003 of FIG. 29, which comprises a binarization on horizontal line unit 2009, a binarization result labelling unit 2010, an intensity resembling character region determining unit 2011, and a processing control unit 2012.

The binarization on horizontal line unit 2009 carries out the binarization of the intensity on each horizontal line in the image, and extracts a provisional character region by synthesizing the binarization results on all the horizontal lines.

The binarization result labelling unit 2010 carrying out the labelling processing for attaching a serial number as a label to each region in the provisional character region image obtained by the binarization on horizontal line unit 2009.

The intensity resembling character region determining unit 2011 determines the character region pixels in the provisional character region by binarizing the intensity distribution in the vertical direction within the identically labelled provisional character regions in the label image obtained by the binarization result labelling unit 2010. The processing control unit 2012 controls the processing of these elements 2009 to 2011.

Figure 31:
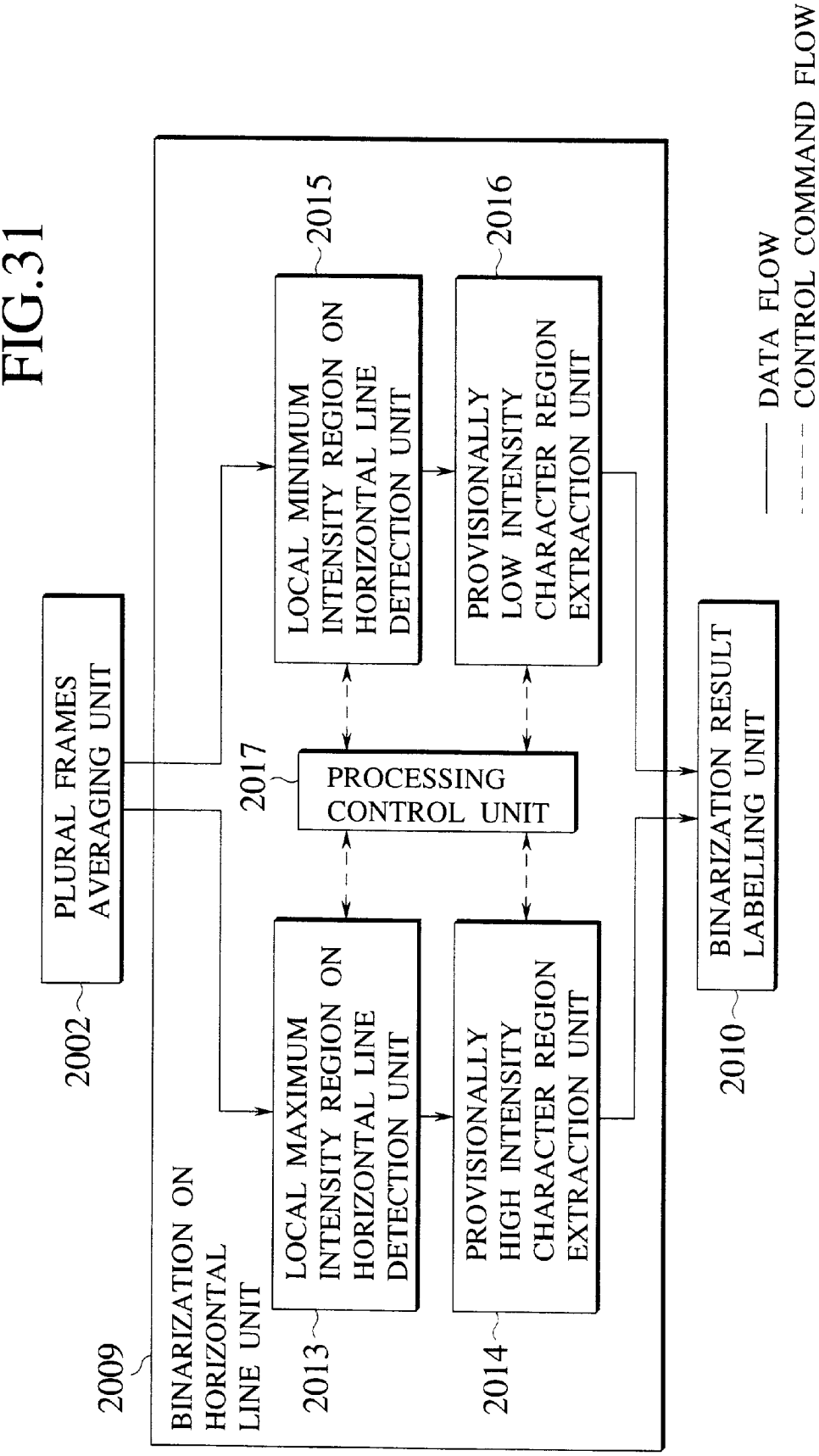
FIG. 31 is a block diagram showing an exemplary internal configuration of a binarization on horizontal line unit in the intensity resembling region formation unit of FIG. 30.

FIG. 31 shows an exemplary internal configuration of the binarization on horizontal line unit 2009 of FIG. 30, which comprises a local maximums intensity region on horizontal line detection unit 2013, a provisionally high intensity character region extraction unit 2014, a local minimum intensity region on horizontal line detection unit, 2015, a provisionally low intensity character region extraction unit 2016, and a processing control unit 2017.

The local maximum intensity region on horizontal line detection unit 2013 checks the intensity distribution on each horizontal line in the image and extracts a connected pixel region in which the intensity value is locally higher than the rest by at least a prescribed value on that horizontal line.

The provisionally high intensity character region extraction unit 2014 obtains the provisionally high intensity character region as a connected pixel region obtained by the local maximum intensity region on horizontal line detection unit 2013 on some horizontal line in the image, when the absolute values of the intensity gradients in the horizontal direction at the left and right ends of that connected pixel region are both higher than a prescribed value.

The local minimum intensity region on horizontal line detection unit 2015 checks the intensity distribution on some horizontal line in the image and extracts a connected pixel region in which the intensity value is locally lower than the rest by at least a prescribed value on that horizontal line.

The provisionally low intensity character region extraction unit 2016 obtains the provisionally low intensity character region as a connected pixel region obtained by the local minimum intensity region on horizontal line detection unit 2015 on some horizontal line in the image, when the absolute values of the intensity gradients in the horizontal direction at the left and right ends of that connected pixel region are both higher than a prescribed value.

The processing control unit 2017 controls the processing of these elements 2013 to 2017.

Figure 32:
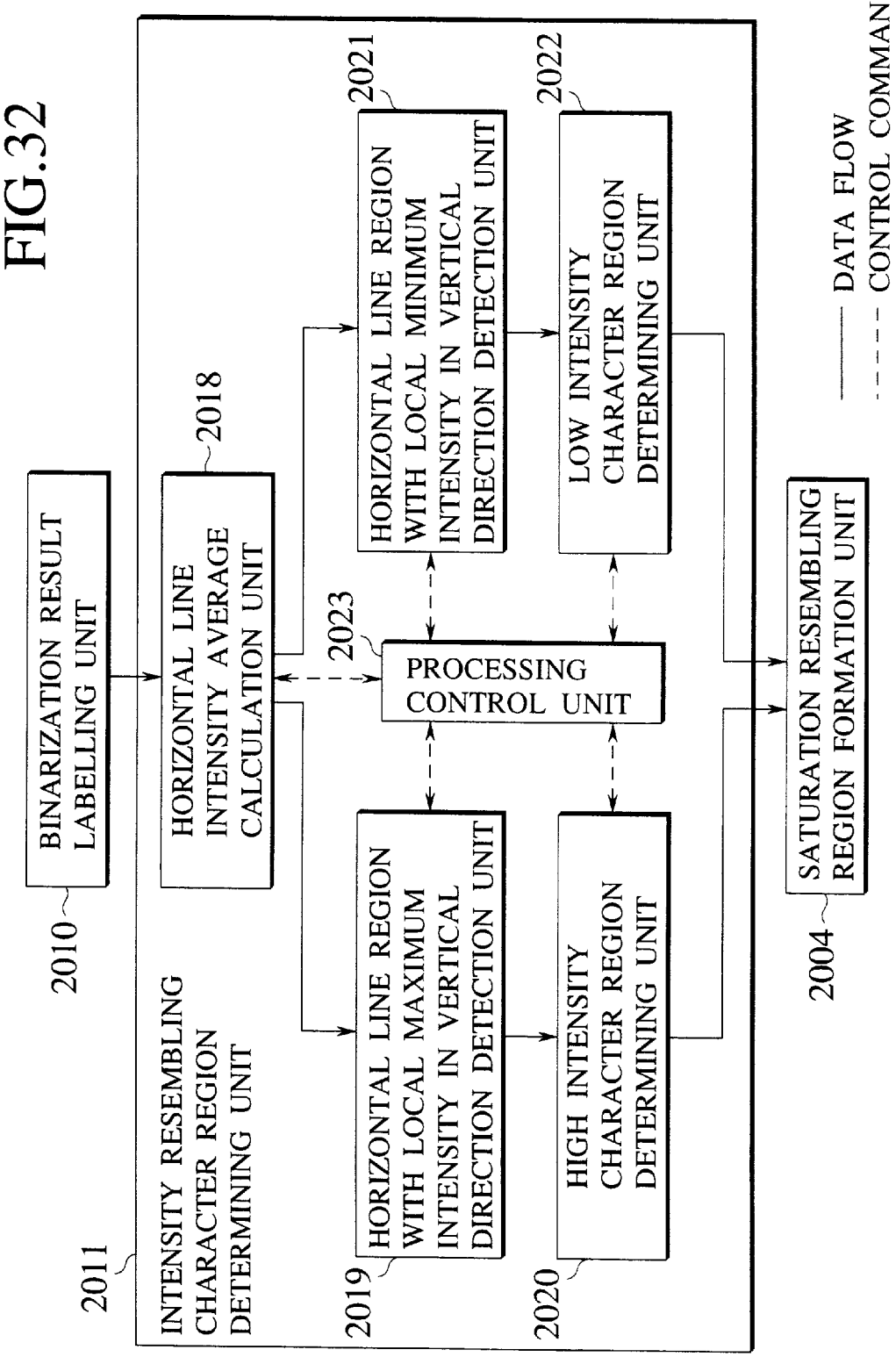
FIG. 32 is a block diagram showing an exemplary internal configuration of an intensity resembling character region determining unit in the intensity resembling region formation unit of FIG. 30.

FIG. 32 shows an exemplary internal configuration of the intensity resembling character region determining unit 2011 of FIG. 30, which comprises a horizontal line intensity average calculation unit 2018, a horizontal line region with local maximum intensity in vertical direction detection unit 2019, a high intensity character region determining unit 2020, a horizontal line region with local minimum intensity in vertical direction detection unit 2021, a low intensity character region determining unit 2022, and a processing control unit 2023.

The horizontal line intensity average calculation unit 2018 calculates the average value of the intensity values for each horizontal line in the identically labelled region in the image, within a range in which pixels in a prescribed pixel width from the left and right ends of the identically labelled region are excluded.

The horizontal line region with local maximum intensity in vertical direction detection unit 2019 checks the distribution of the intensity average values in the vertical direction on each horizontal line obtained by the horizontal line intensity average calculation unit 2018, and extracts a plurality of regions on the horizontal line in which the intensity value is locally higher than the rest by at least a prescribed value within these regions.

The high intensity character region determining unit 2020 determines the high intensity character region as the connected horizontal line regions within the identically labelled region obtained by the horizontal line region with local maximum intensity in vertical direction detection unit 2019 when the gradients in the vertical direction of the average intensity values on each horizontal line obtained by the horizontal line intensity average calculation unit 2018 at the upper and lower ends of these connected horizontal line regions are both higher than a prescribed value.

The horizontal line region with local minimum intensity in vertical direction detection unit 2021 checks the distribution of the intensity average values in the vertical direction on each horizontal line obtained by the horizontal line intensity average calculation unit 2018, and extracts a plurality of regions on the horizontal line in which the intensity value is locally lower than the rest by at least a prescribed value within these regions.

The low intensity character region determining unit 2022 determines the low intensity character region as the connected horizontal line regions within the identically labelled region obtained by the horizontal line region with local minimum intensity in vertical direction detection unit 2021 when the gradients in the vertical direction of the average intensity values on each horizontal line obtained by the horizontal line intensity average calculation unit 2018 at the upper and lower ends of these connected horizontal line regions are both higher than a prescribed value.

The processing control unit 2023 controls the processing of these elements 2018 to 2022.

Figure 33:
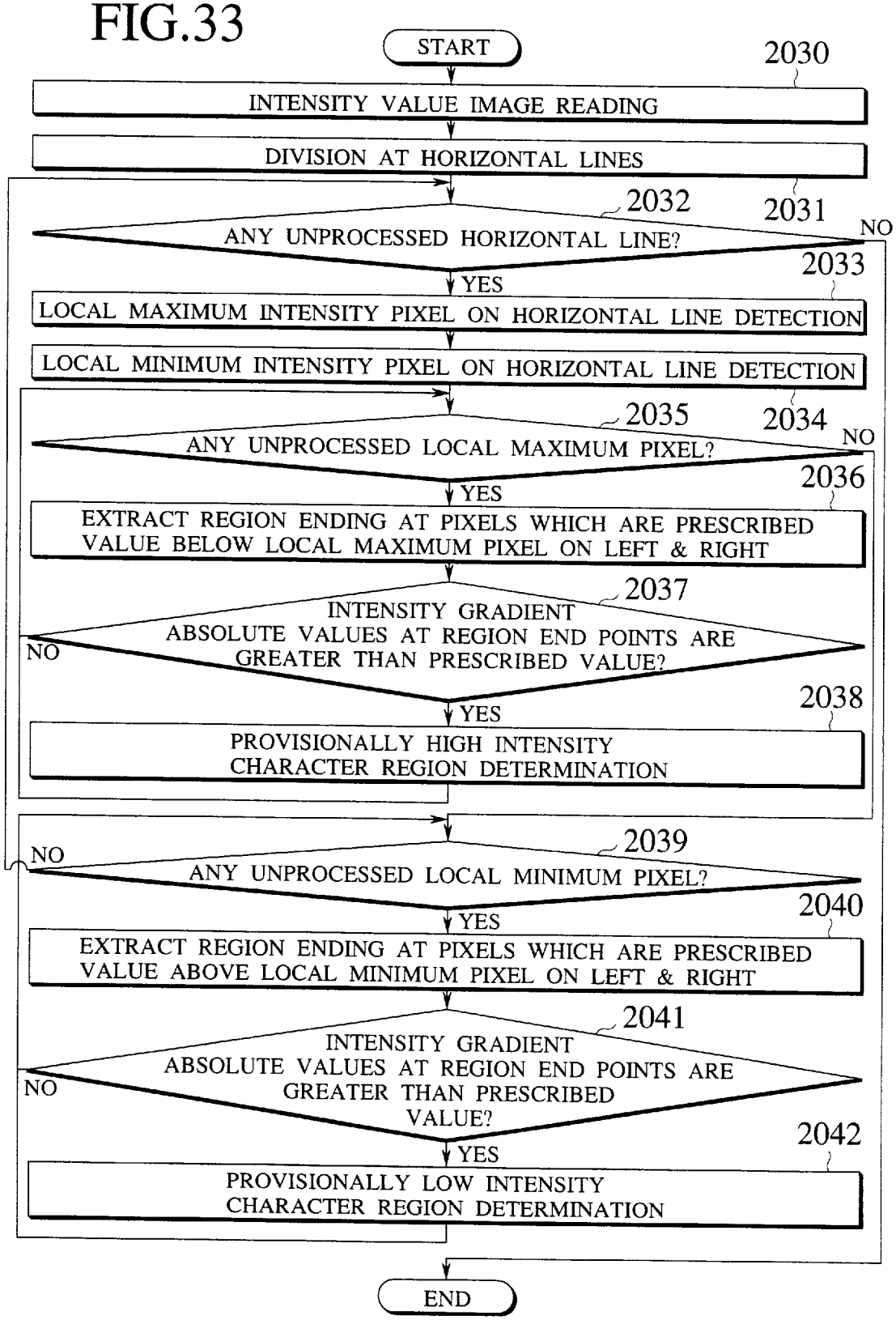
FIG. 33 is a flow chart for the processing procedure of the binarization on horizontal line unit of FIG. 31.

FIG. 33 shows the processing procedure of the binarization on horizontal line unit 2009 of FIG. 31, which proceeds as follows.

At the step 2030, the intensity value image is read into a memory.

At the step 2031, the intensity value image read into a memory at the step 2030 is divided at horizontal lines At the step 2032, whether there is any unprocessed horizontal line for the intensity resembling character region determining processing or not is judged, and if there is, the processing proceeds to the step 2033 whereas otherwise the processing is terminated.

At the step 2033, the intensity distribution on each horizontal line in the image obtained at the step 2031 is checked and all pixels which have the local maximum intensity values are obtained.

At the step 2034, the intensity distribution on each horizontal line in the image obtained at the step 2031 is checked and all pixels which have the local minimum intensity values are obtained.

At the step 2035, whether there is any unprocessed local maximum intensity pixel for the provisionally high intensity character region extraction processing among the local maximum intensity pixels obtained at the step 2033 or not is judged, and if there is, the processing proceeds to the step 2036, whereas otherwise the processing proceeds to the step 2039.

At the step 2036, the horizontal line is scanned pixel by pixel in the left direction and the right direction, starting from each local maximum intensity pixel obtained at the step 2033, and the first pixel in which the the intensity value is lower than the local maximum value by a prescribed threshold on each of the left side and the right side of the local maximum intensity pixel is detected. Then, the two detected pixels and pixels existing between these two pixels on the horizontal line are extracted as the connected pixel region.

At the step 2037, whether the absolute values of the intensity gradients in the horizontal direction at the left and right ends of the connected pixel region on the horizontal line obtained at the step 2036 are both greater than a prescribed threshold or not is judged, and if they are, the processing proceeds to the step 2038, whereas otherwise the processing returns to the step 2035.

At the step 2038, the connected pixel region on the horizontal line obtained at the step 2036 is extracted as the provisionally high intensity character region, after which the processing returns to the step 2035.

Figure 34:
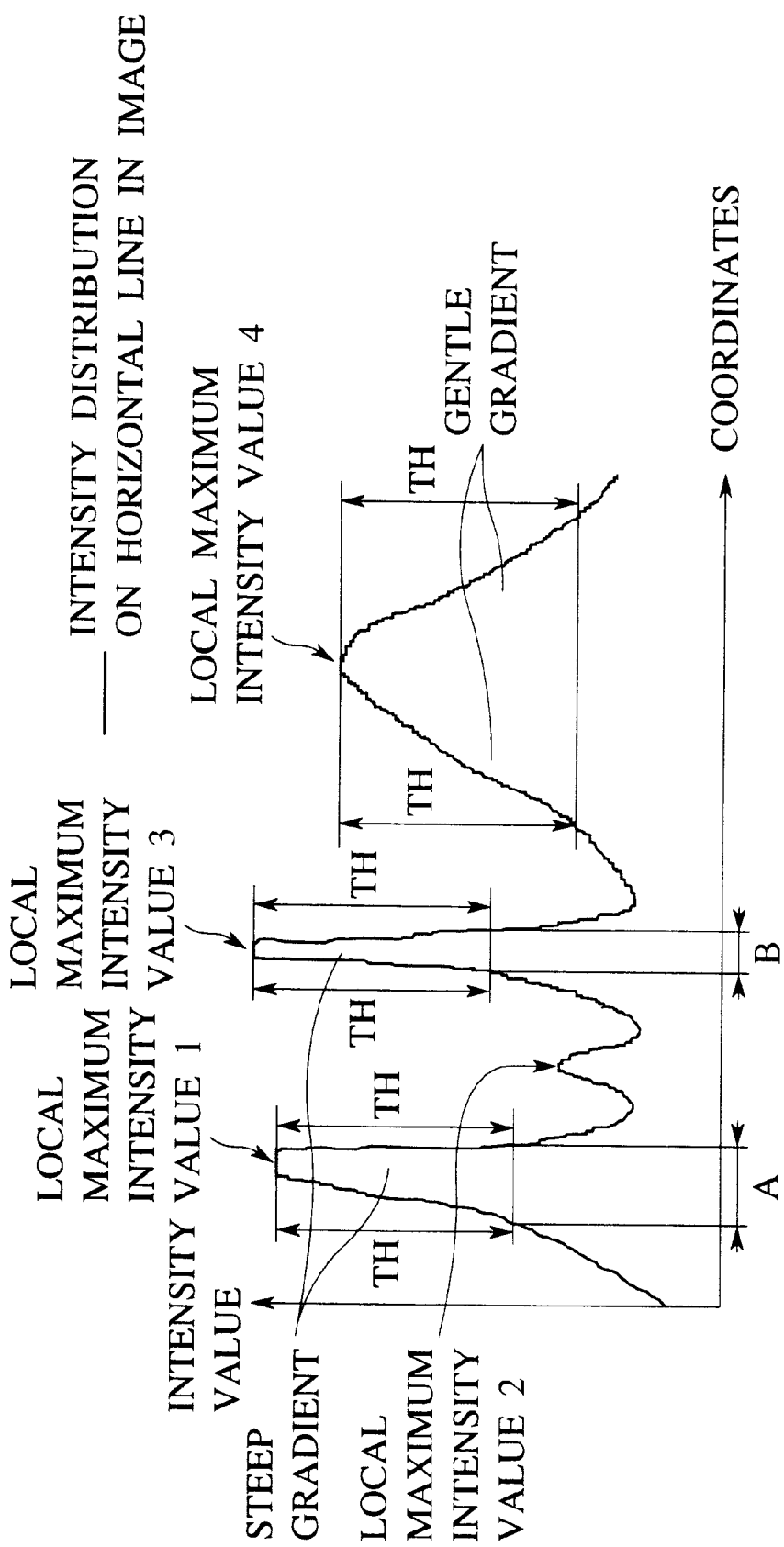
FIG. 34 is a diagram showing an exemplary case of the processing in the processing procedure of FIG. 33.

FIG. 34 illustrates an exemplary case of the processing at the steps 2036, 2037 and 2038, which shows whether the provisionally high intensity character region is extracted from the local maximum intensity pixels No. 1 to No. 4 on some horizontal line. In this case, the local maximum intensity pixels No. 1 and No. 3 satisfy both conditions on the intensity difference with respect to left and right pixels and the intensity gradients, so that regions A and B will be extracted as the provisionally high intensity character regions, but the local maximum intensity pixel No. 2 does not satisfy both conditions and the local maximum intensity pixel No. 4 does not satisfy the condition on the intensity gradients so that no provisionally high intensity character region will be extracted from them.

At the step 2039, whether there is any unprocessed local minimum intensity pixel for the provisionally low intensity character region extraction processing among the local minimum intensity pixels obtained at the step 2034 or not is judged, and if there is, the processing proceeds to the step 2040, whereas otherwise the processing returns to the step 2032.

At the step 2040, the horizontal line is scanned pixel by pixel in the left direction and the right direction, starting from each local minimum intensity pixel obtained at the step 2034, and the first pixel in which the the intensity value is higher than the local minimum value by a prescribed threshold on each of the left side and the right side of the local minimum intensity pixel is detected. Then, the two detected pixels and pixels existing between these two pixels on the horizontal line are extracted as the connected pixel region.

At the step 2041, whether the absolute values of the intensity gradients in the horizontal direction at the left and right ends of the connected pixel region on the horizontal line obtained at the step 2040 are both greater than a prescribed threshold or not is judged, and if they are, the processing proceeds to the step 2042, whereas otherwise the processing returns to the step 2039.

At the step 2042, the connected pixel region on the horizontal line obtained at the step 2040 is extracted as the provisionally low intensity character region, after which the processing returns to the step 2039.

Figure 35:
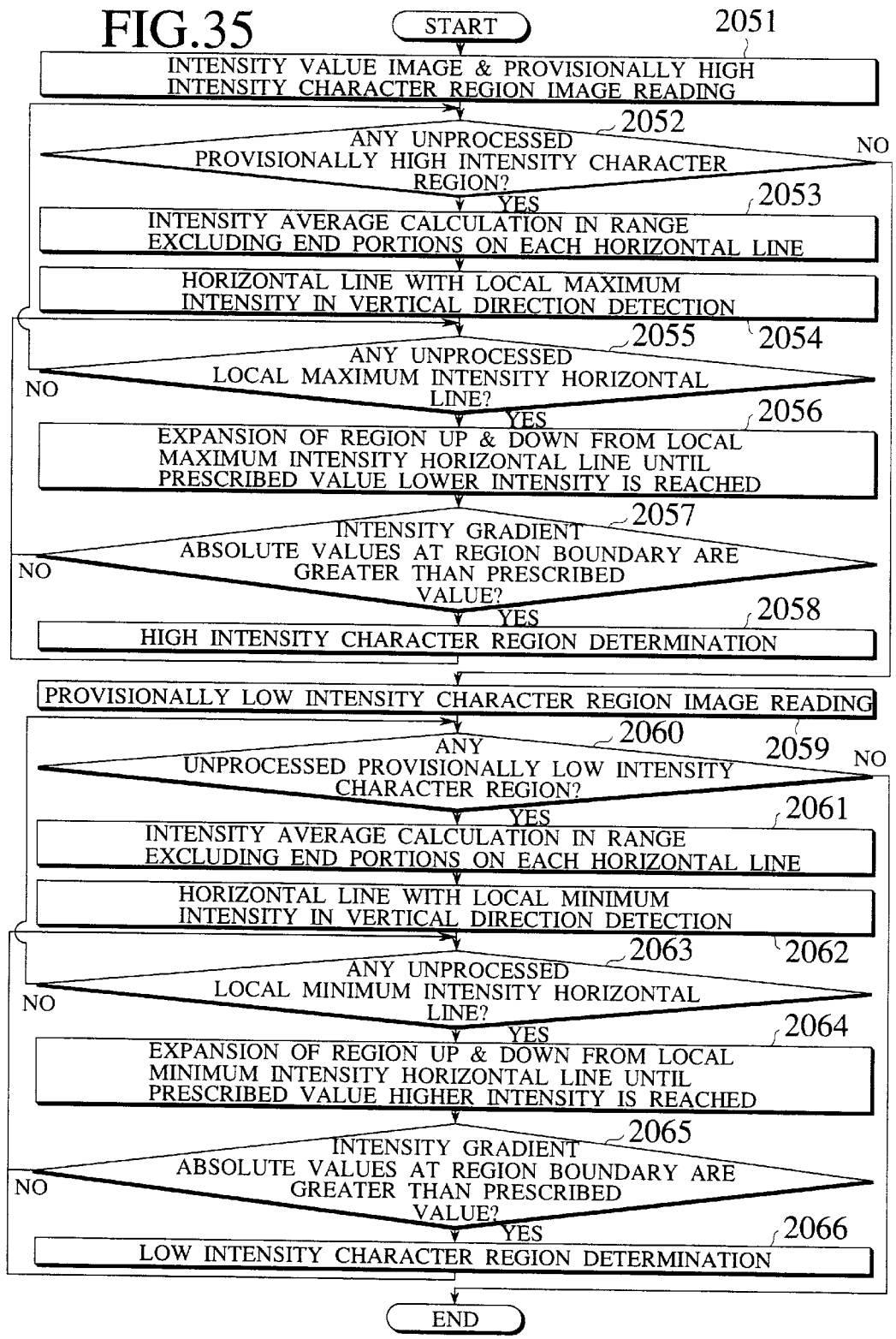
FIG. 35 is a flow chart for the processing procedure of the intensity resembling character region determining unit of FIG. 32.

FIG. 35 shows the processing procedure of the intensity resembling character region determining unit 2011 of FIG. 32, which proceeds as follows.

At the step 2051, the intensity value image and the provisionally high intensity character region image are read into a memory.

At the step 2052, whether there is any unprocessed provisionally high intensity character region for the high intensity character region determining processing or not is judged, and if there is, the processing proceeds to the step 2053 whereas otherwise the processing proceeds to the step 2059.

At the step 2053, the average value of the intensity values for each horizontal line within the identically labelled region in the provisionally high intensity character region image is calculated, within a range in which pixels in a prescribed pixel width from the left and right ends of the identically labelled region are excluded.

At the step 2054, the intensity average values for all the horizontal lines obtained at the step 2053 within the identically labelled region in the image are checked in the vertical direction, and all the horizontal lines which have the local maximum intensity average values are detected.

At the step 2055, whether there is any unprocessed local maximum intensity horizontal line for the high intensity character region determining processing or not is judged, and if there is, the processing proceeds to the step 2056, whereas otherwise the processing returns to the step 2052.

At the step 2056, the identically labelled region is scanned horizontal line by horizontal line in the up direction and the down direction, starting from each local maximum intensity horizontal line obtained at the step 2054, and the first horizontal line in which the intensity average value is lower than the local maximum intensity average value by a prescribed threshold on each of the up side and the down side of the local maximum intensity average horizontal line is detected. Then, the pixels on the two detected horizontal lines and the pixels on the horizontal lines that are existing between these two horizontal lines in the identically labelled region are synthesized and extracted as the connected pixel region. Here, if the upper end or lower end horizontal line in the identically labelled region is reached before the two horizontal lines are detected, that upper end or lower end horizontal line is detected as the upper end or lower end Of the connected pixel region.

At the step 2057, whether the absolute values of the intensity gradients in the vertical direction at the upper and lower ends of the connected pixel region extracted at the step 2056 are both greater than a prescribed threshold or not is judged, and if they are, the processing proceeds to the step 2058, whereas otherwise the processing returns to the step 2055.

At the step 2058, the connected pixel region extracted at the step 2056 is determined as the high intensity character region when the absolute values of the intensity gradients in the vertical direction at the upper and lower ends obtained at the step 2057 are both greater than a prescribed threshold.

Figure 36:
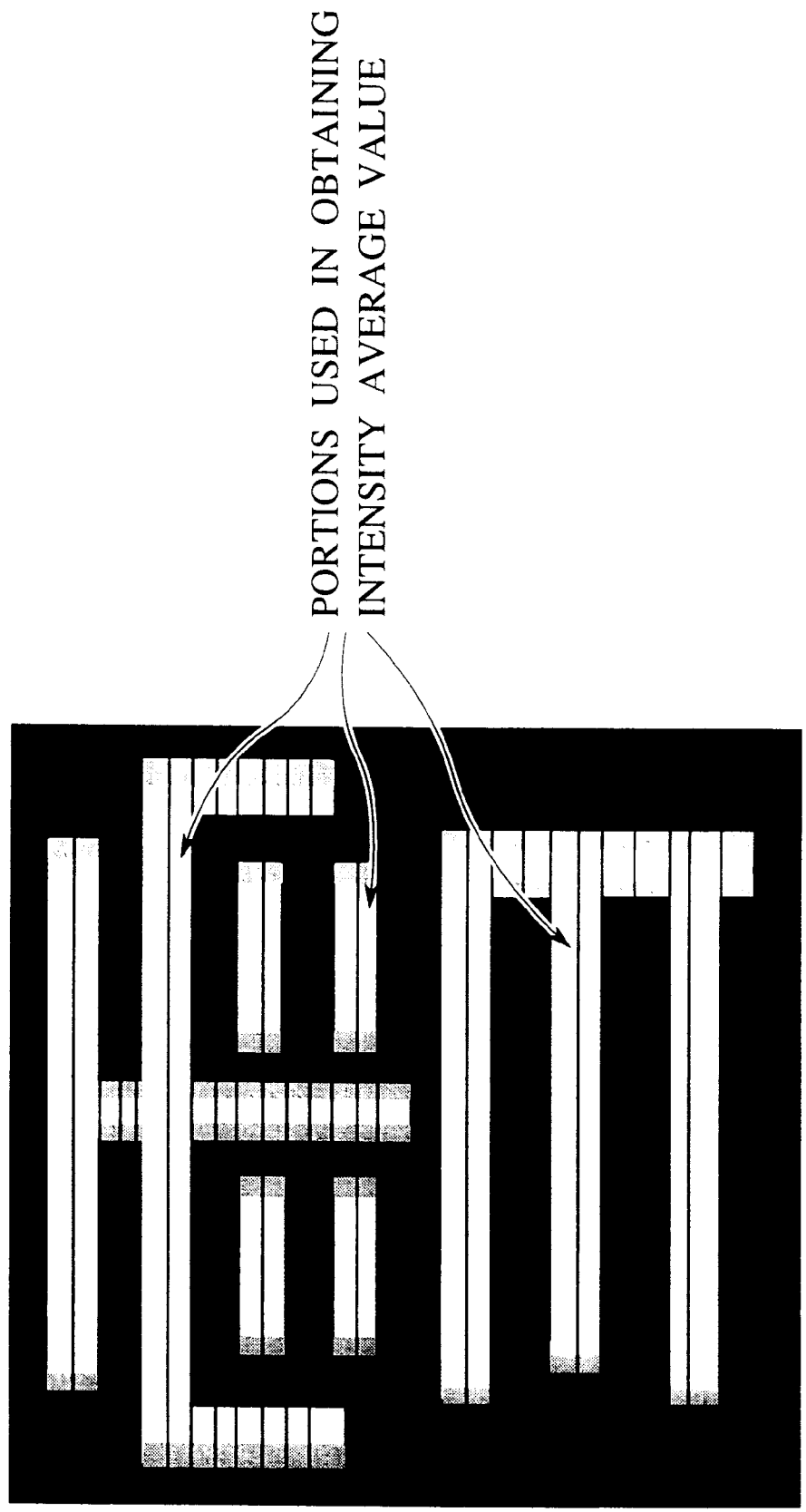
FIG. 36 is a diagram showing one exemplary case of the processing in the processing procedure of FIG. 35.
Figure 37:
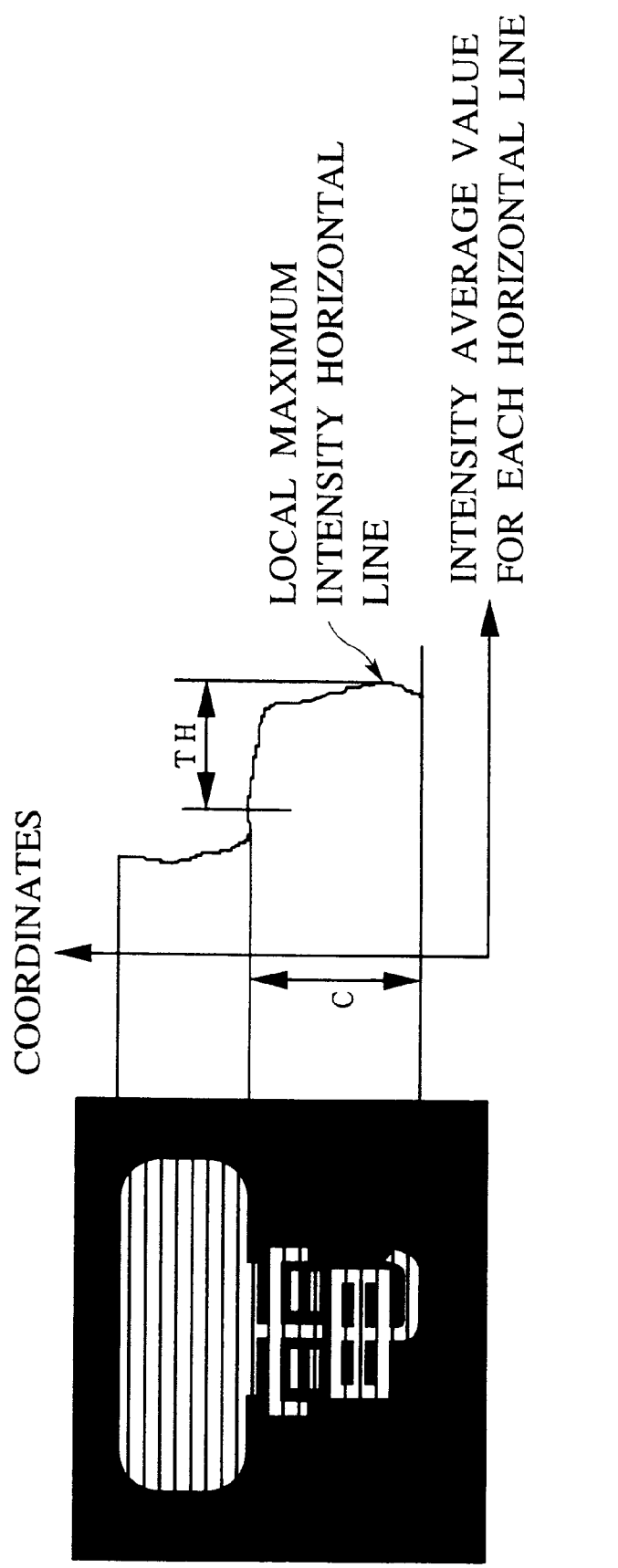
FIG. 37 is a diagram showing another exemplary case of the processing in the processing procedure of FIG. 35.

FIG. 36 and FIG. 37 illustrate an exemplary case of the processing of the steps 2053, 2056, 2057 and 2058. FIG. 36 shows a case in which a white Japanese kanji character. is displayed on the black background where the degradation is occurring at the left and right end portions of this character. When the intensity average value is obtained for each horizontal line within a range in which the pixels of the both end portions are excluded, it is possible to obtain the intensity average value excluding the values of the degraded portion. FIG. 37 shows a case in which another Japanese kanji character is synthesized with a noise region located above it. When the local maximum value is detected from the distribution of the intensity average values in the vertical direction for each horizontal line and the horizontal lines in which the intensity, value is lower than the local maximum value by a prescribed value are detected in the up direction and the down direction, it becomes possible to separate a range C corresponding to this character from the noise region. At the step 2059, the provisionally low intensity character region image is read into a memory.

At the step 2060, whether there is any unprocessed provisionally low intensity character region for the low intensity character region determining processing or not is judged, and if there is, the processing proceeds to the step 2061 whereas otherwise the processing of the intensity resembling character region determining unit is terminated.

At the step 2061, the average value of the intensity values for each horizontal line within the identically labelled region in the provisionally low intensity character region image is calculated, within a range in which pixels in a prescribed pixel width from the left and right ends of the identically labelled region are excluded.

At the step 2062, the intensity average values for all the horizontal lines obtained at the step 2061 within the identically labelled region in the image are checked in the vertical direction, and all the horizontal lines which have the local minimum intensity average values are detected.

At the step 2063, whether there is any unprocessed local minimum intensity horizontal line for the low intensity character region determining processing or not is judged, and if there is, the processing proceeds to the step 2064, whereas otherwise the processing returns to the step 2060.

At the step 2064, the identically labelled region is scanned horizontal line by horizontal line in the up direction and the down direction, starting from each local minimum intensity horizontal line obtained at the step 2062, and the first horizontal line in which the intensity average value is higher than the local minimum intensity average value by a prescribed threshold on each of the up side and the down side of the local minimum intensity average horizontal line is detected. Then, the pixels on the two detected horizontal lines and the pixels on the horizontal lines that are existing between these two horizontal lines in the identically labelled region are synthesized and extracted as the connected pixel region. Here, if the upper end or lower end horizontal line in the identically labelled region is reached before the two horizontal lines are detected, that upper end or lower end horizontal line is detected as the upper end or lower end of the connected pixel region.

At the step 2065, whether the absolute values of the intensity gradients in the vertical direction at the upper and lower ends of the connected pixel region extracted at the step 2064 are both greater than a prescribed threshold or not is judged, and if they are, the processing proceeds to the step 2066, whereas otherwise the processing returns to the step 2063.

At the step 2066, the connected pixel region extracted at the step 2064 is determined as the low intensity character region when the absolute values of the intensity gradients in the vertical direction at the upper and lower ends obtained at the step 2065 are both greater than a prescribed threshold.

Note that the character region extraction apparatus of this third embodiment can be implemented in a form of a reading device for reading the recording medium, a memory device which is capable of storing the processing target color images, programs read from the recording medium, the extracted character region images, etc., and freely reading them, a buffer or the like which is necessary in storing data at a time of carrying out the various processing, an output device such as a display device for displaying necessary information in the course of the processing or monitoring the color image and the processing result, an input device such as a keyboard or a mouse for entering necessary commands, and a computer or the like for controlling these devices in a prescribed procedure by executing the processing procedures. or algorithms of this third embodiment described with references to FIG. 29 to FIG. 37. Also, programs for causing the computer to execute these procedures or algorithms can be recorded and distributed on a computer readable medium such as floppy disk, memory card, MO, CD-ROM, etc.

Figure 38:
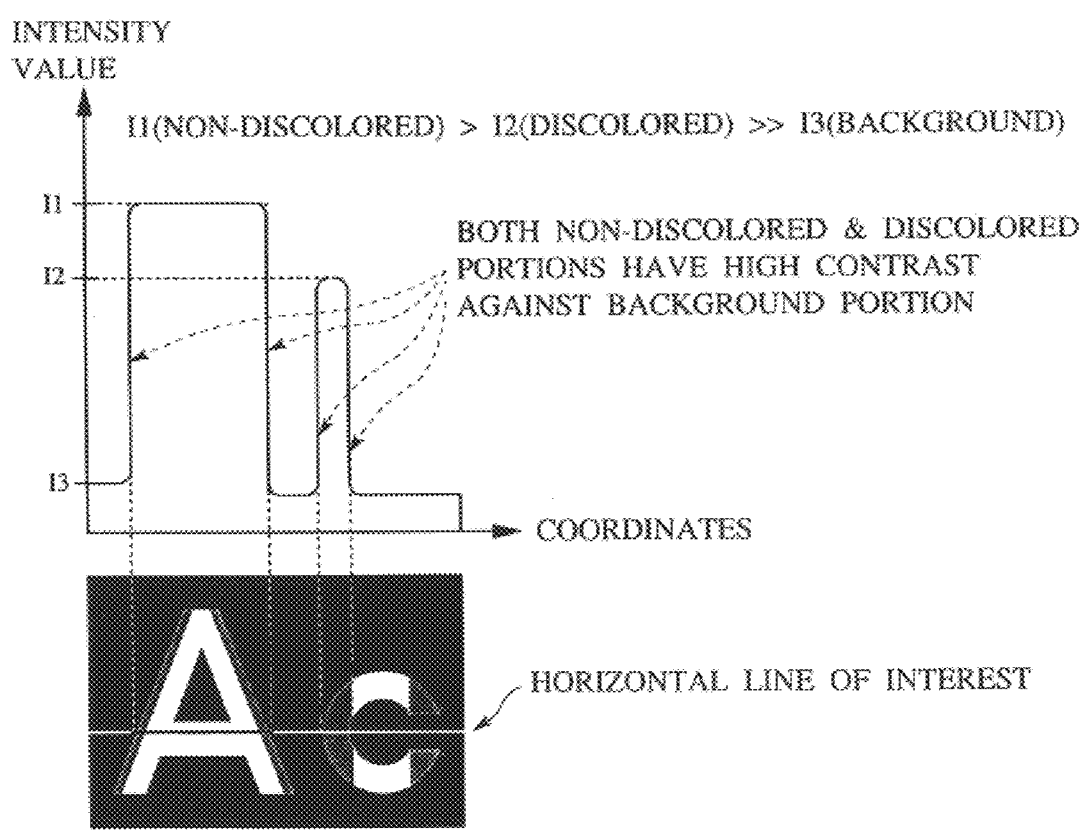
FIG. 38 is a diagram showing an exemplary intensity distribution on a scanning line for degraded characters for explaining the operation of the apparatus of FIG. 29.

As described above, the color image in the video of the NTSC format is associated with the color blurring in the horizontal line direction so that the degradation occurs for the character portion such as that of the telop. However, even in the case of degradation, when the intensity distribution on one horizontal line is checked, there are features that the intensity change within the. character is small and the contrast between the character and the background is often high. FIG. 38 shows an exemplary intensity distribution on some scanning line for the degraded characters, which indicates that, even when the degradation occurs in the character, there are features that the intensity distribution on some horizontal line does not contain the high contrast portion within the character and a sufficient intensity difference exists between the degraded portion and. the surrounding background portion.

Figure 26:
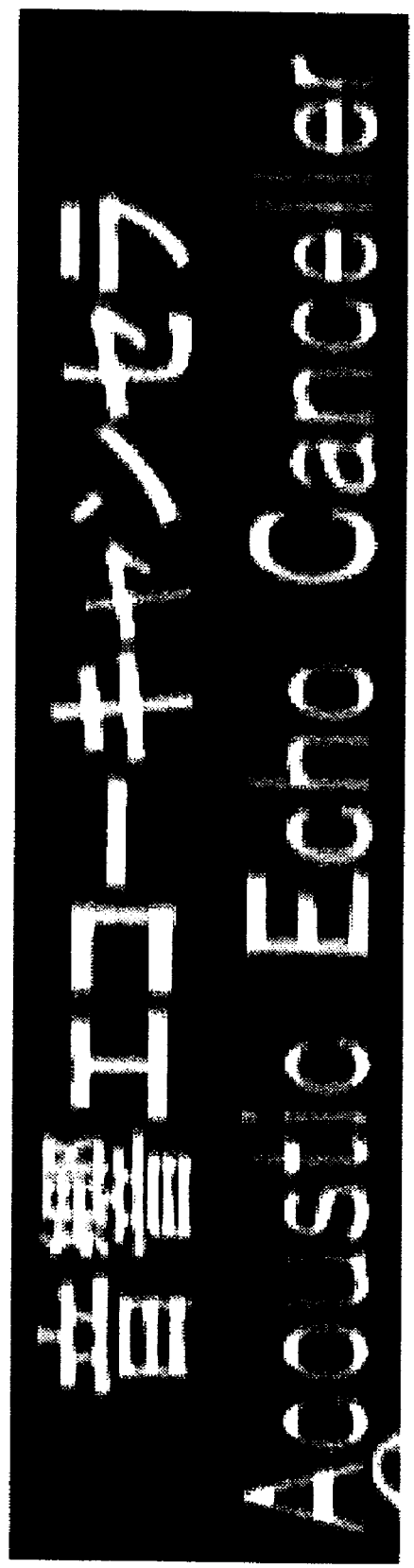
FIG. 26 is an illustration showing an exemplary image. in NTSC format with degraded characters.
Figure 27:
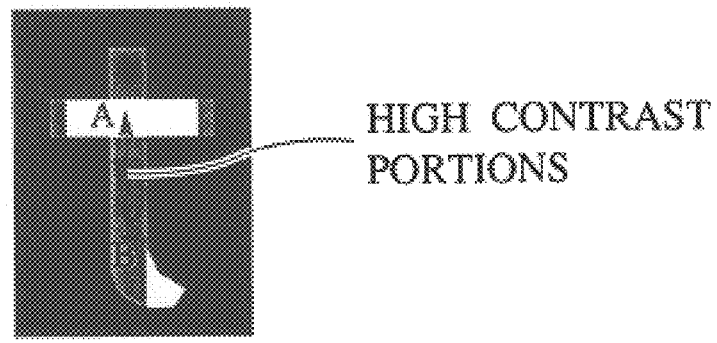
FIG. 27 is a diagram showing an exemplary case of degradation in one character.
Figure 28:
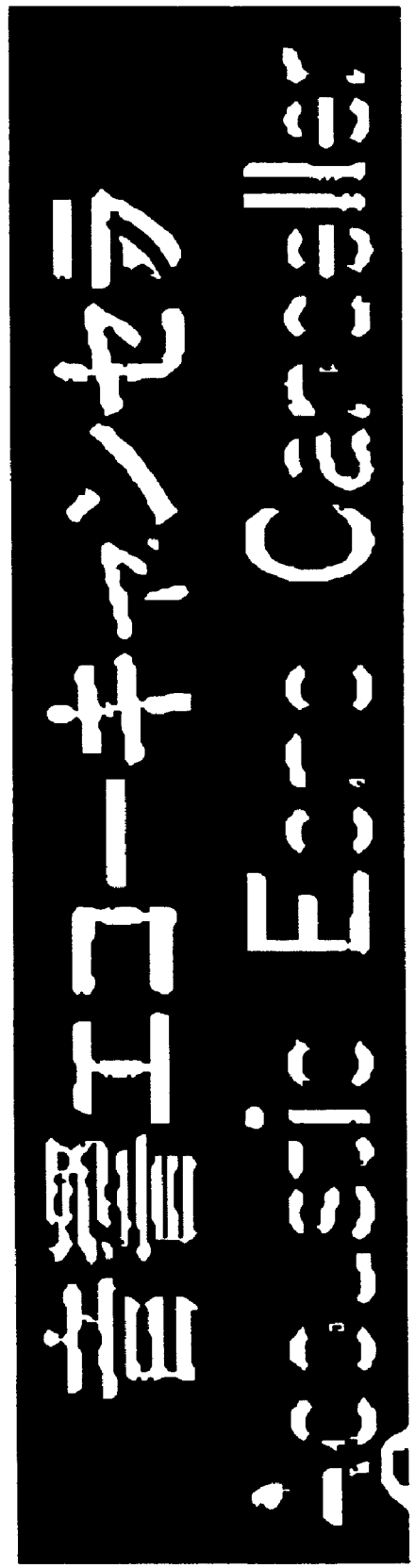
FIG. 28 is an illustration showing an exemplary image of a character region extracted from the image of FIG. 26 by the conventional method.
Figure 39:
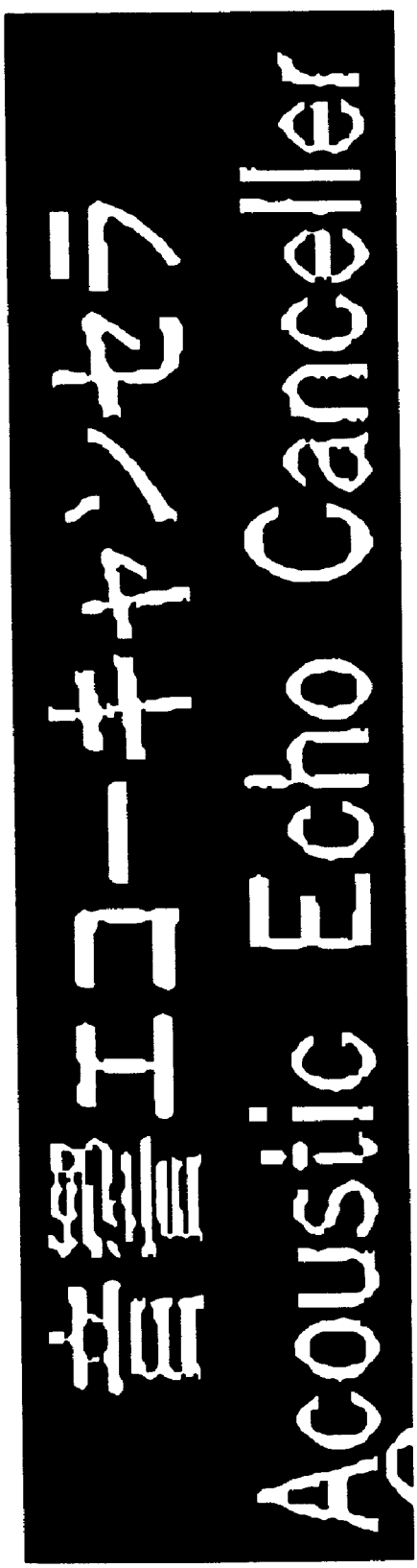
FIG. 39 is an illustration showing an exemplary image of a character region extracted from the image of FIG. 26 by the apparatus of FIG. 29.

For this reason, this third embodiment extracts the character region as a connected pixel region in which the intensity value is locally high or low on each horizontal line in the image, so that it becomes possible to extract the degraded portion within the high intensity character which was difficult conventionally. In addition, the connected pixel region is determined as the character region only when the absolute values of the intensity gradients at the region boundary portions are large, so that it becomes possible to suppress the extraction of regions which have a low contrast with respect to the surrounding portion which was the conventionally encountered problem. FIG. 39 shows a result of the character region extraction from the image of FIG. 26 according to this third embodiment, which is clearly superior to the extraction result of the conventional method shown in FIG. 28.

Thus, according to this third embodiment, it becomes possible to extract the degraded character region by extracting the character region as a connected pixel region in which the intensity value is locally high or low on each horizontal line in the image. Also, at this point, the character region is extracted as a region in which the absolute values of the intensity gradients at the region boundary portions are high, so that it also becomes possible to suppress the over-extraction of regions which have a low contrast with respect to the surrounding portion.

Referring now to FIG. 40 to FIG. 48, the fourth embodiment of the present invention concerning a telop character pattern recognition will be described in detail. This fourth embodiment is directed to the processing using only white pixels.

FIG. 40 shows an exemplary configuration of a character recognition apparatus in this fourth embodiment, which comprises a preliminary processing unit 3002 receiving an input character pattern 3001, a feature extraction unit 3003, and a recognition unit 3004 using a feature dictionary table 3005 and outputting a recognition result 3006.

The preliminary processing unit 3002 calculates a center of the input character pattern 3001 by calculating a horizontal width and a vertical width of the input character pattern 3001, using the conventionally known position normalization processing, for example, and carries out the translational shift processing for the input character pattern 3001 as a whole such that the center is located at a central position of a character frame. The preliminary processing unit 3002 also carries out the expansion/contraction processing of the input character pattern 3001 such that the horizontal width and the vertical width of the character become equal to the horizontal width and the vertical width of the character frame, using the conventionally known size normalization processing, for example.

FIG. 41A and FIG. 41B show an exemplary case of the normalization by the normalization processing of the preliminary processing unit 3002, with respect to a character "A". FIG. 41A shows an exemplary input character pattern 3001 before the normalization processing, and FIG. 41B shows a character pattern after the position and size normalization processing are applied to the input character pattern 3001 of FIG. 41A at the preliminary processing unit 3002.

The feature extraction unit 3003 is the central element of this apparatus, which carries out the processing of entering the character pattern after the normalization processing at the preliminary processing unit 3002, dividing the entered character pattern into coarse mesh regions, extending scanning lines into a plurality of prescribed directions, such as eight directions of 0°, 45°, 90°, 135°, 180°, 225°, 270° and 315° for example, from each white pixel in each mesh region, measuring the run-length of white pixels that are connected in each direction, and obtaining the direction contributivity indicating a distribution of respective direction components of the white pixels.

Figure 42:
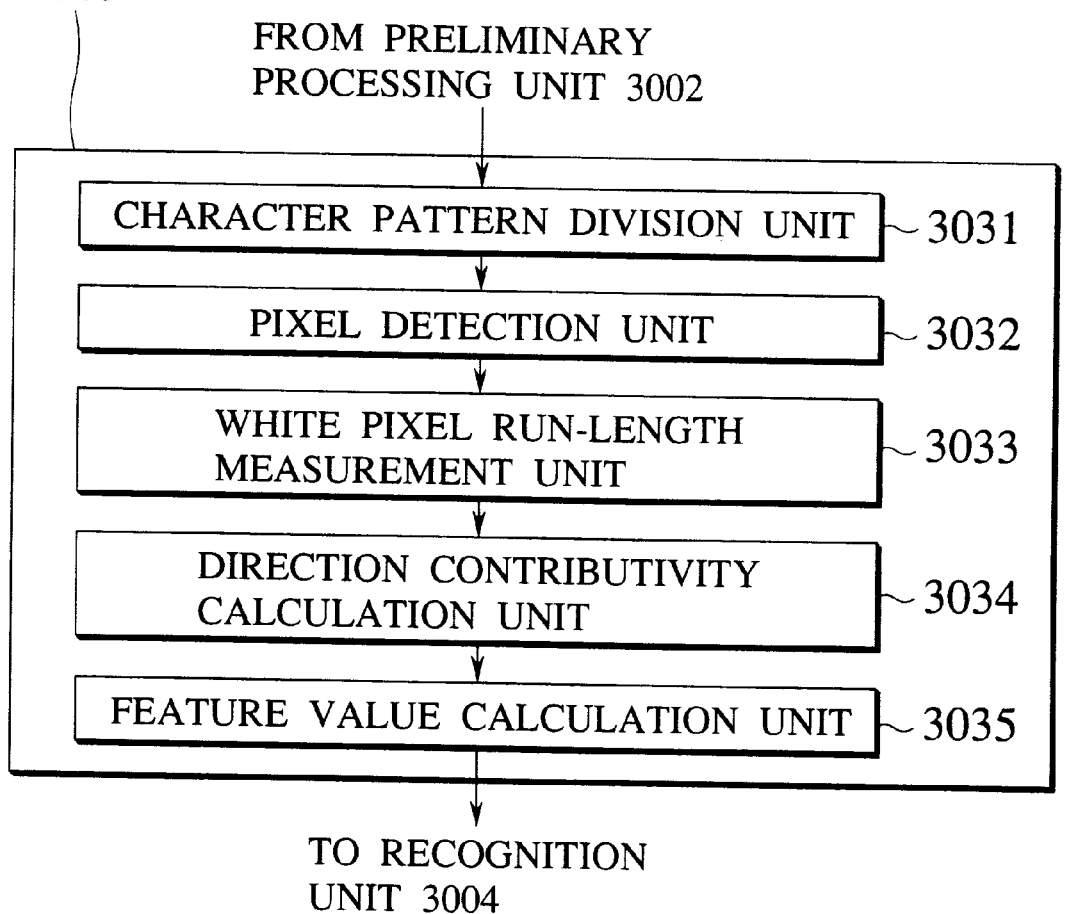
FIG. 42 is a block diagram showing an exemplary internal configuration of a feature extraction unit in the apparatus of FIG. 40.

FIG. 42 shows an exemplary internal configuration of the feature extraction unit 3003, which comprises a character pattern division unit 3031 for dividing the character pattern into a plurality of coarse mesh regions, a pixel detection unit 3032 for detecting each pixel existing in each mesh region and. judging whether it is white or black, a white pixel run-length measurement unit 3033 for extending the scanning lines into a plurality of directions (eight directions of 0°, 45°, 90°, 135°, 180°, 225°, 270° and 315° for example) from each white pixel in each mesh region and obtaining the run-length of the white pixels in each direction, a direction contributivity calculation unit 3034 for calculating the direction contributivity values indicating a distribution of respective direction components of the white pixels from the white pixel run-lengths, and a feature value calculation unit 3035 for obtaining a feature value of the entered character pattern by counting the direction contributivity values in each mesh region and normalizing the counted direction contributivity values by the number of white pixels in each mesh region.

The recognition unit 3004 produces a feature table for the purpose of recognizing the character pattern according to the direction contributivity values obtained by the feature extraction unit 3003, and carries out the character pattern recognition by matching the feature table with the feature dictionary table 3005 of recognizable characters provided in advance, using the conventionally known matching method.

Figure 43:
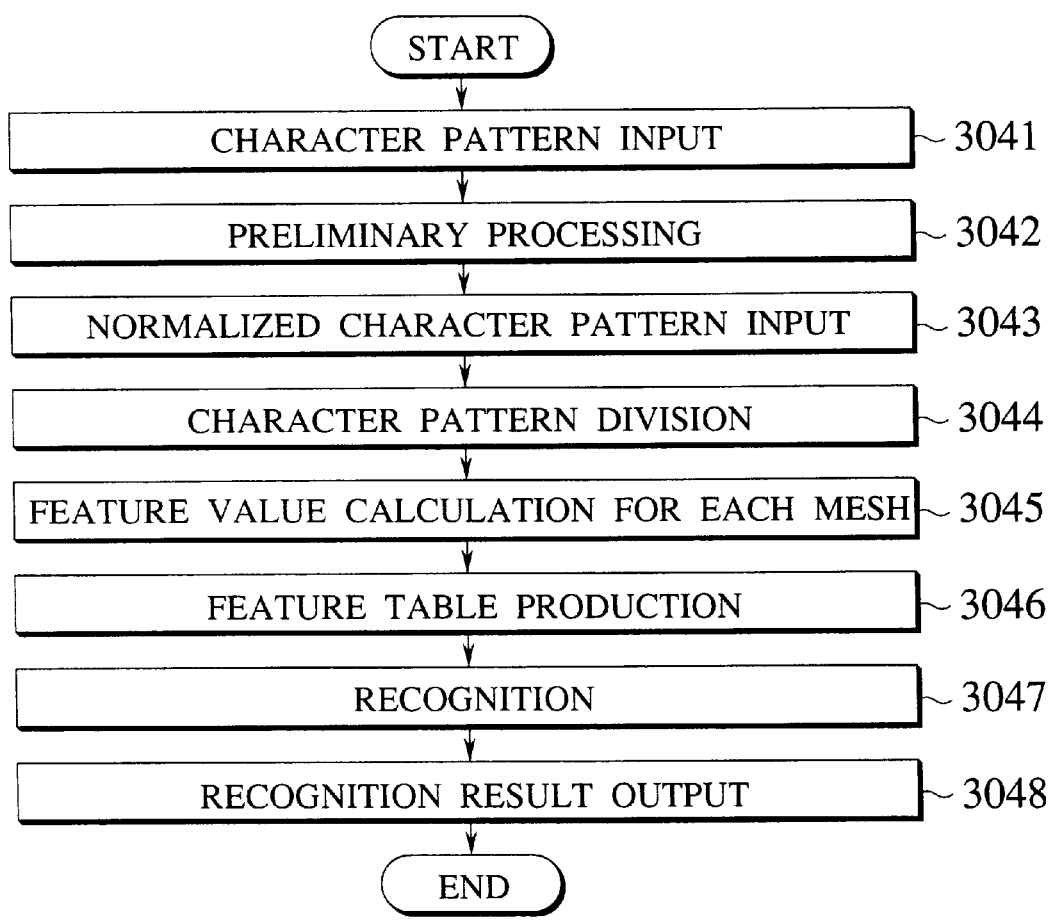
FIG. 43 is a flow chart for the processing procedure of the character recognition processing by the apparatus of FIG. 40.

As an exemplary case of the character recognition processing according to this fourth embodiment, a specific case of dividing the character pattern into coarse mesh regions, extending the scanning lines into eight directions (0°, 45°, 90°, 1350°, 180°, 225°, 270° and 315° which are labelled with numbers 1, 2, 3, 4, 5, 6, 7 and 8 respectively) from each white pixel in each mesh region, obtaining the direction contributivity of the white pixels and recognizing the character pattern will now be described. FIG. 43 shows the processing procedure of this character recognition processing, which proceeds as follows.

The input character pattern extracted as a region of a single character is entered into the preliminary processing unit 3002 (step 3041), and the preliminary processing unit 3002 carries out the position and size normalization of the input character pattern (step 3042). The normalized character pattern of N×N meshes obtained by the preliminary processing is then entered into the character division unit 3031 of the feature extraction unit 3003 (step 3043). The character pattern division unit 3031 uniformly divides the normalized character pattern Into K pieces of coarse mesh regions, such as square mesh regions (step 3044). The mesh divided character pattern (i.e., mesh regions obtained by dividing the character pattern) is then entered into the pixel detection unit 3032 and the calculation of the feature value in each mesh is carried out at the feature extraction unit 3003 as follows (step 3045).

Figure 44:
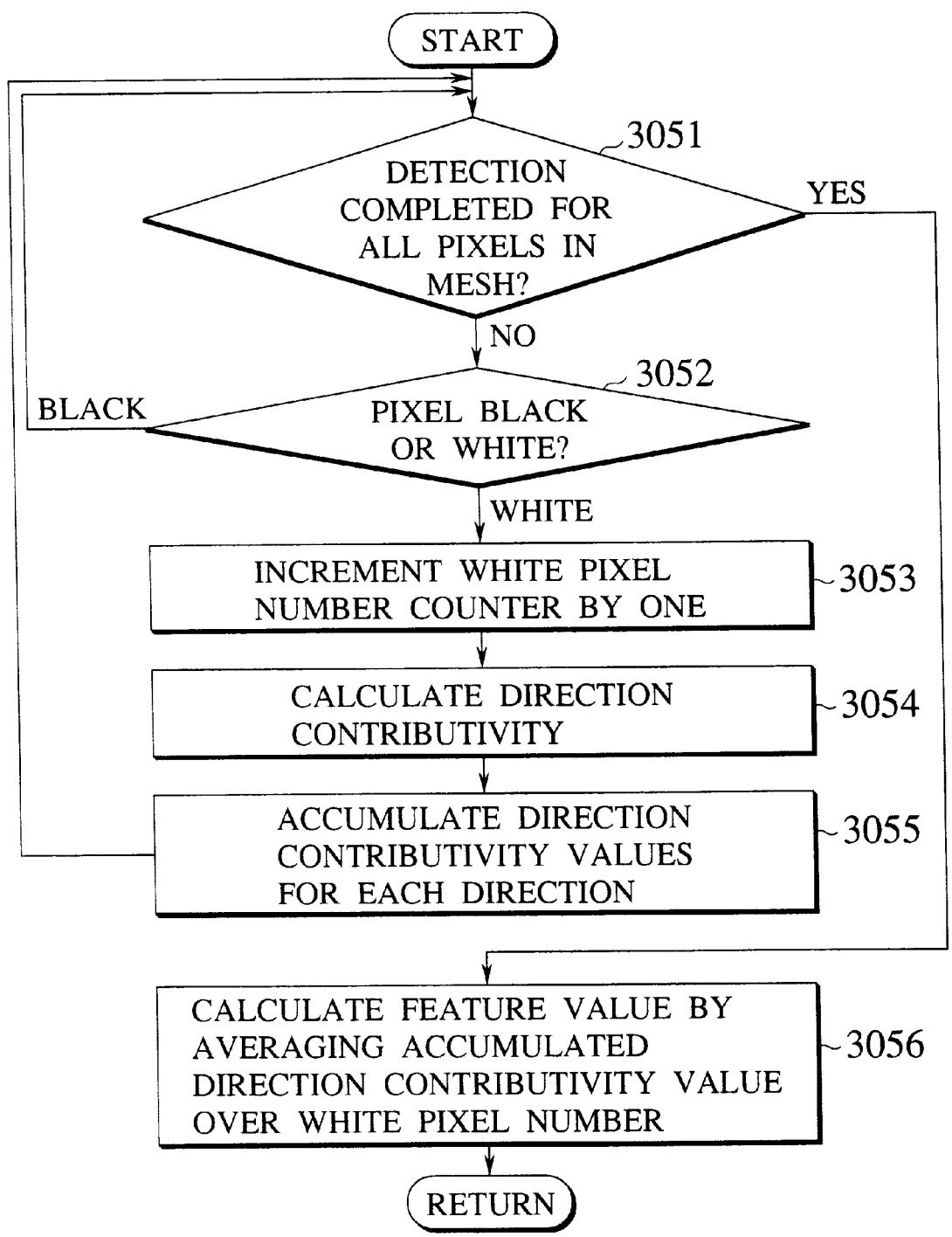
FIG. 44 is a flow chart for the processing procedure for calculating a feature value in each mesh within the processing procedure of FIG. 43.

FIG. 44 shows a specific processing procedure for the calculation of the feature value in each mesh at the feature extraction unit 3003. The pixel detection unit 3032 detects each pixel in each mesh region of the mesh divided character pattern until detection of all pixels in each mesh is completed (step 3051), and judges whether each detected pixel is white or black (step 3052). The white pixel is given to the white pixel run-length measurement unit 3033, where the count of the white pixel number is incremented by one (step 3053). Then, the direction contributivity is calculated for the detected white pixel as follows (step 3054).

Figure 45:
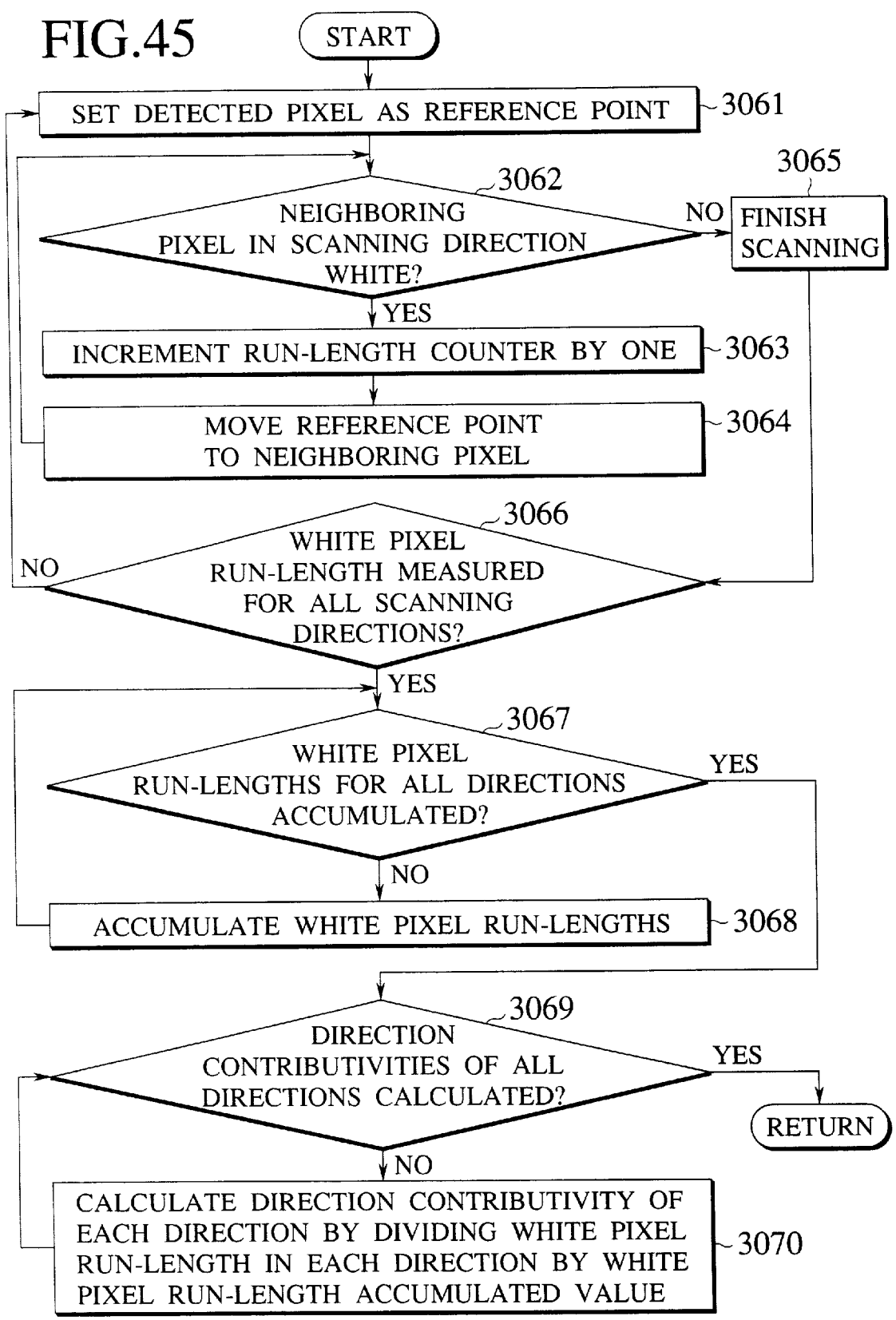
FIG. 45 is a flow chart for the processing procedure for calculating a direction contributivity at each pixel within the processing procedure of FIG. 44.

FIG. 45 shows a specific processing procedure for calculating the direction contributivity at each pixel. The white pixel run-length measurement unit 3033 sets the detected pixel as a reference point (step 3061) and detects a neighboring pixel by extending the scanning line in each direction, and judges whether the neighboring pixel in the scanning direction is white or not (step 3062). When the neighboring pixel in the scanning direction is white, the run-length counter is incremented by one (step 3063), the neighboring pixel is newly set as a reference point (step 3064), and the scanning processing is repeated. Here, the scanning processing is not limited to pixels within a mesh region in which the detected pixel exists, and carried out with respect to the entire normalized character pattern. When the neighboring pixel in the scanning direction is black or when there is no neighboring pixel in the scanning direction, the scanning is finished (step 3065). This processing is carried out for all of the eight directions (step 3066). The white pixel run-lengths for the eight directions are then given to the direction contributivity calculation unit 3034.

The direction contributivity calculation unit 3034 accumulates the white pixel run-lengths for the eight directions obtained from each white pixel, using the straightforward summation or the square root of square sum (steps 3067, 3068). Then, the direction contributivity of each direction is calculated by dividing the white pixel run-length of each direction by the white pixel run-length accumulated value (steps 3069, 3070). The direction contributivity f of each white pixel so obtained can be expressed in a form of an eight-dimensional vector given by:

$$f=(\alpha 1, \alpha 2, \alpha 3, \alpha 4, \alpha 5, \alpha 6, \alpha 7, \alpha 8)$$

where $\alpha 1, \alpha 2, \alpha 3, \alpha 4, \alpha 5, \alpha 6, \alpha 7$ and $\alpha 8$ are the direction contributivity components of the eight directions respectively, each of which is given by:

$$\alpha_i = l_i \Big/ \left(\left(\sum_{j=1}^{8} l_j^2\right)\right)^{1/2}$$

where $l_i$ (i=1, 2, ..., 8) is the white pixel run-length obtained in each direction, in the case of using the square root of square sum as the white pixel run-length accumulated value.

Returning now to FIG. 44, the direction contributivity f obtained in this way is then accumulated for all the white pixels in each mesh, for each direction (step 3055). The accumulated direction contributivity value and the white pixel number are then given to the feature value calculation unit 3035.

The feature value calculation unit 3035 calculates the feature value in each mesh by averaging the accumulated direction contributivity value over the number of white pixels in each mesh (step 3086). The feature value fk obtained at the k-th mesh region (k=1, 2, ..., k, ..., K) is given by:

$$fk=(\alpha k1, \alpha k2, \ldots, \alpha k8)$$

where $\alpha k1, \alpha k2, \ldots, \alpha k8$ are elements of the direction contributivity vector obtained by accumulating the direction contributivity vectors at all the white pixels existing in the k-th mesh region in respective directions and averaged over the number of white pixels.

The above processing is carried for all the mesh regions. As a result, the feature value F of the character pattern can be expressed as follows.

$$F(f1, f2 \ldots, fk, \ldots, fK)$$

Returning now to FIG. 43, the feature table is produced from values of the elements of the feature value F for the character pattern so obtained (step 3046).

Then, the recognition unit 3004 recognizes the character pattern by obtaining the conventionally known classifier D(F) such as the Euclidean distance for example (step 3047).

Here, the classifier is used such that the distance between the feature vector of the input character pattern and the feature vector of each character type that is stored in the feature table in advance is calculated and the character for which the calculated distance is the smallest (or the largest depending on the function used) is outputted as the candidate character (step 3048).

When the feature vector of the input character pattern is given by F=(f1, f2 ..., fk ..., fK) while the feature vector of the i-th character (1≦i≦M) in the feature table is given by Si=(si1, si2, ..., siK), and the Euclidean distance is to be used for instance, the classifier given by:

$$D(F, Si) = \left(\left(\sum_{j=1}^{K}(fj - sij)^2\right)\right)^{1/2}$$

will be calculated for each i=1 to M, and the i-th character for which D(F, Si) becomes the smallest will be outputted as the recognition result.

Figure 46:
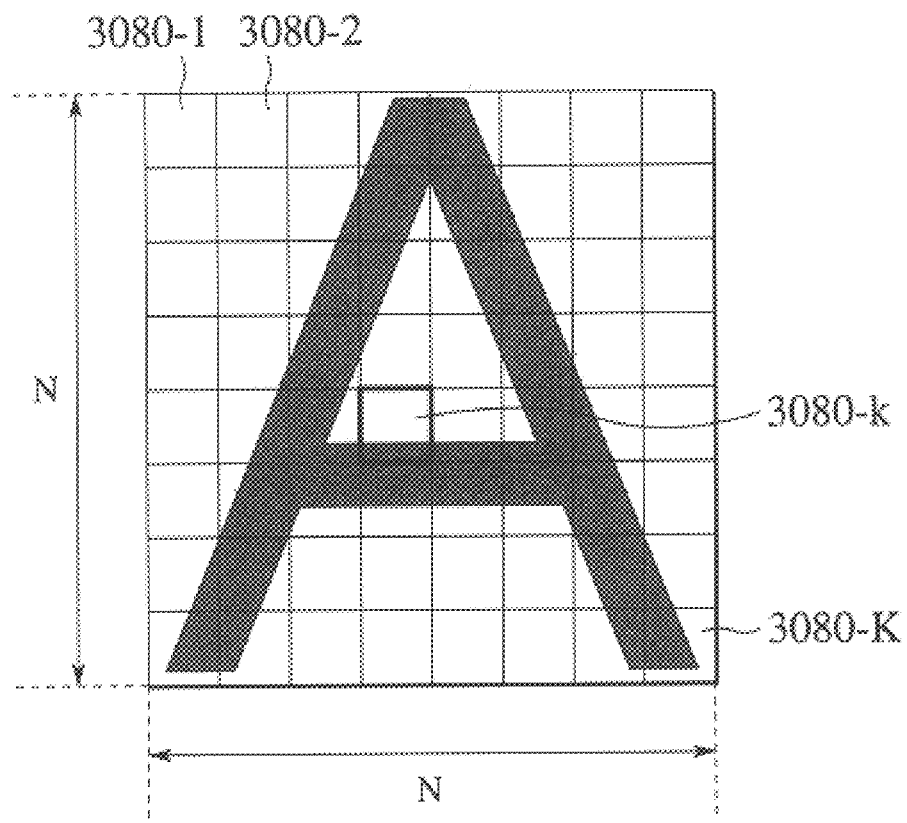
FIG. 46 is a diagram showing an exemplary case of character pattern division used in the apparatus of FIG. 40.

FIG. 46 shows an exemplary case of dividing the character pattern into K pieces of coarse square mesh regions 3080-1, 3080-2, ..., 3080-k, ..., 3080-K.

Figure 47:
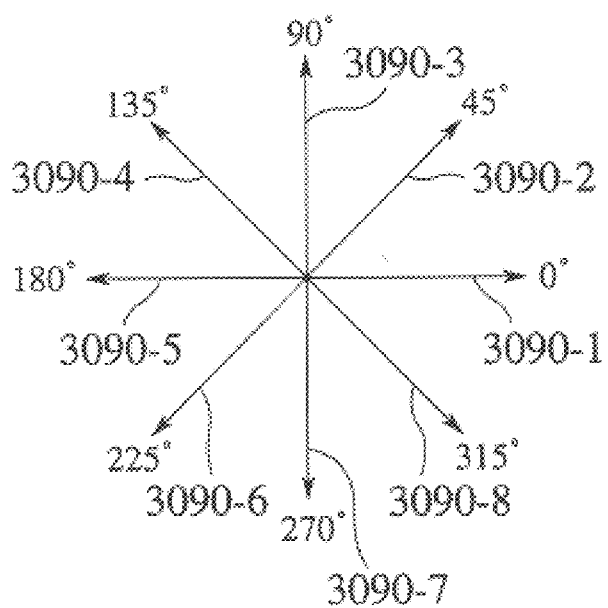
FIG. 47 is a diagram showing exemplary directions for extending scanning lines used in the apparatus of FIG. 40.

FIG. 47 shows exemplary eight directions 3090-1 to 3090-8 at 45° interval into which the scanning lines are to be extended in order to obtain the white pixel run-lengths in the character pattern.

Figure 48:
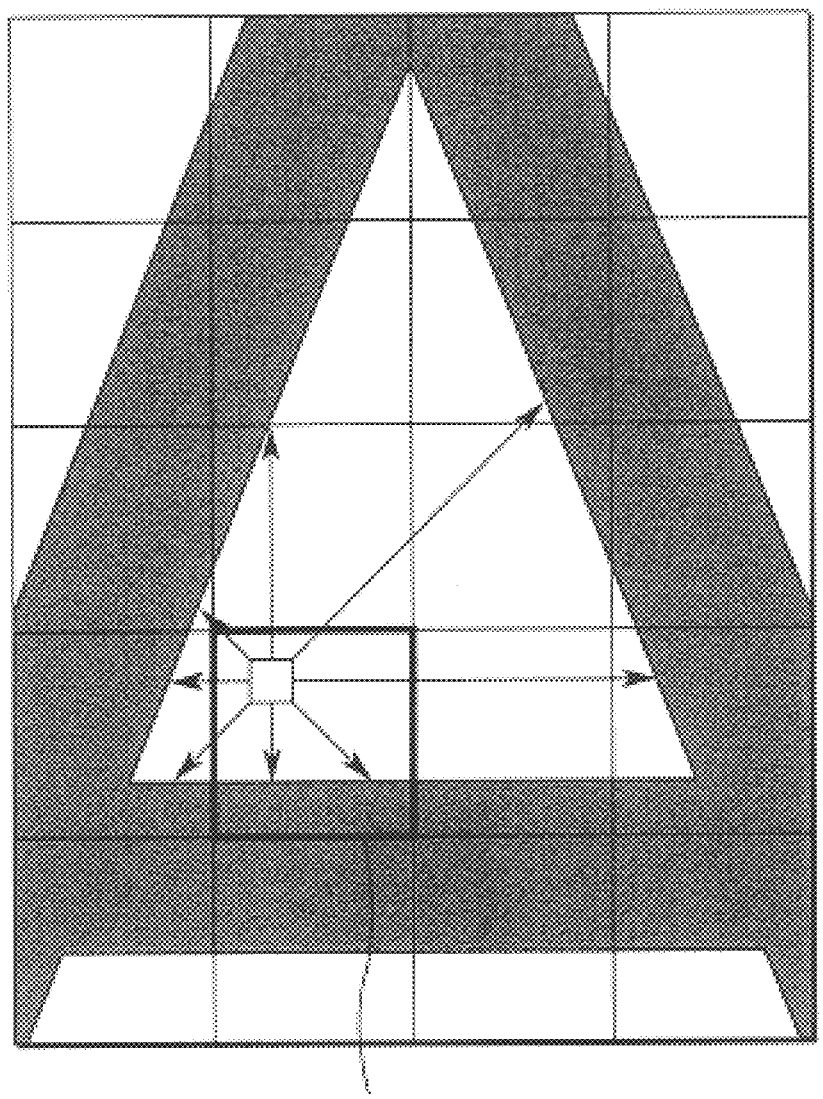
FIG. 48 is a diagram showing an exemplary state of obtaining white pixel run-lengths in the apparatus of FIG. 40.

FIG. 48 shows an exemplary state of obtaining the white pixel run-lengths by extending the scanning lines into eight directions in order to obtain the direction contributivity at the white pixel in the k-th mesh region 3080-k of FIG. 46.

In this fourth embodiment, it is also possible to measure the run-lengths of the black pixels instead of the white pixels, then calculating the direction contributivity, calculating the feature value, and recognizing the character pattern using this feature value.

In this way, it is possible to obtain the two-dimensional structure information regarding the character such as the inclination angle of the character line and the connectivity, so that it becomes possible to emphasize the differences in structure among different character types. Consequently, it becomes possible to recognize the recognition target character which is associated with the character line displacement or the contour portion deformation even in the case of dealing with many character types.

As described, according to this fourth embodiment, the direction contributivity of the white pixels are used so that it is possible to obtain the two-dimensional structure information such as relative intervals among character lines and the character line position relationship which can indicate the differences in structure among different character types. Also, the position or shape of the background portion has little change even when there is a change in the position of the character line, so that it is possible to achieve the robustness against the character line position change. Also, in general, the white pixels that constitute the background portion are more numerous than the black pixels that constitute the character portion, so that it is hardly affected by the character line contour shape change due to the image quality degradation.

On the other hand, when the direction contributivity of the black pixels are used, it is possible to obtain the two-dimensional structure information regarding the character such as the inclination angle of the character line and the connectivity, so that it becomes possible to emphasize the differences in structure among different character types.

Referring now to FIG. 49 to FIG. 59, the fifth embodiment of the present invention concerning a telop character pattern recognition will be described in detail. This fifth embodiment is directed to the processing using both white pixels and black pixels.

FIG. 49 shows an exemplary configuration of a character recognition apparatus in this fifth embodiment, which comprises a preliminary processing unit 3102 receiving an input character pattern 3101, a feature extraction unit 31903, and a recognition unit 3104 using a feature dictionary table 3105 and outputting a recognition result 3106.

The preliminary processing unit 3102 calculates a center of the input character pattern 3101 by calculating a horizontal width and a vertical width of the input character pattern 3101, using the conventionally known position normalization processing, for example, and carries out the translational shift processing for the input character pattern 3101 as a whole such that the center is located at a central position of a character frame. The preliminary processing unit 3102 also carries out the expansion/contraction processing of the input character pattern 3101 such that the horizontal width and the vertical width of the character become equal to the horizontal width and the vertical width of the character frame, using the conventionally known size normalization processing, for example.

FIG. 50A and FIG. 50B show an exemplary case of the normalization by the normalization processing of the preliminary processing unit 3102, with respect to a numerical character "4". FIG. 50A shows an exemplary input character pattern 3101 before the normalization processing, and FIG. 50B shows a character pattern after the position and size normalization processing are applied to the input character pattern 3101 of FIG. 50A at the preliminary processing unit 3102.

The feature extraction unit 3103 is the central element of this apparatus, which carries out the processing of entering the character pattern after the normalization processing at the preliminary processing unit 3102, dividing the entered character pattern into coarse mesh regions, extending scanning lines into a plurality of prescribed directions, such as eight directions of 0°, 45°, 90°, 135°, 180°, 225°, 270° and 315° for example, from each black pixel in each mesh region, measuring the run-length of black pixels that are connected in each direction, and obtaining the direction contributivity of the black pixels, while extending scanning lines into a plurality of prescribed directions from each white pixel in each mesh region, measuring the run-length of white pixels that are connected in each direction, and obtaining the direction contributivity of the white pixels.

Figure 51:
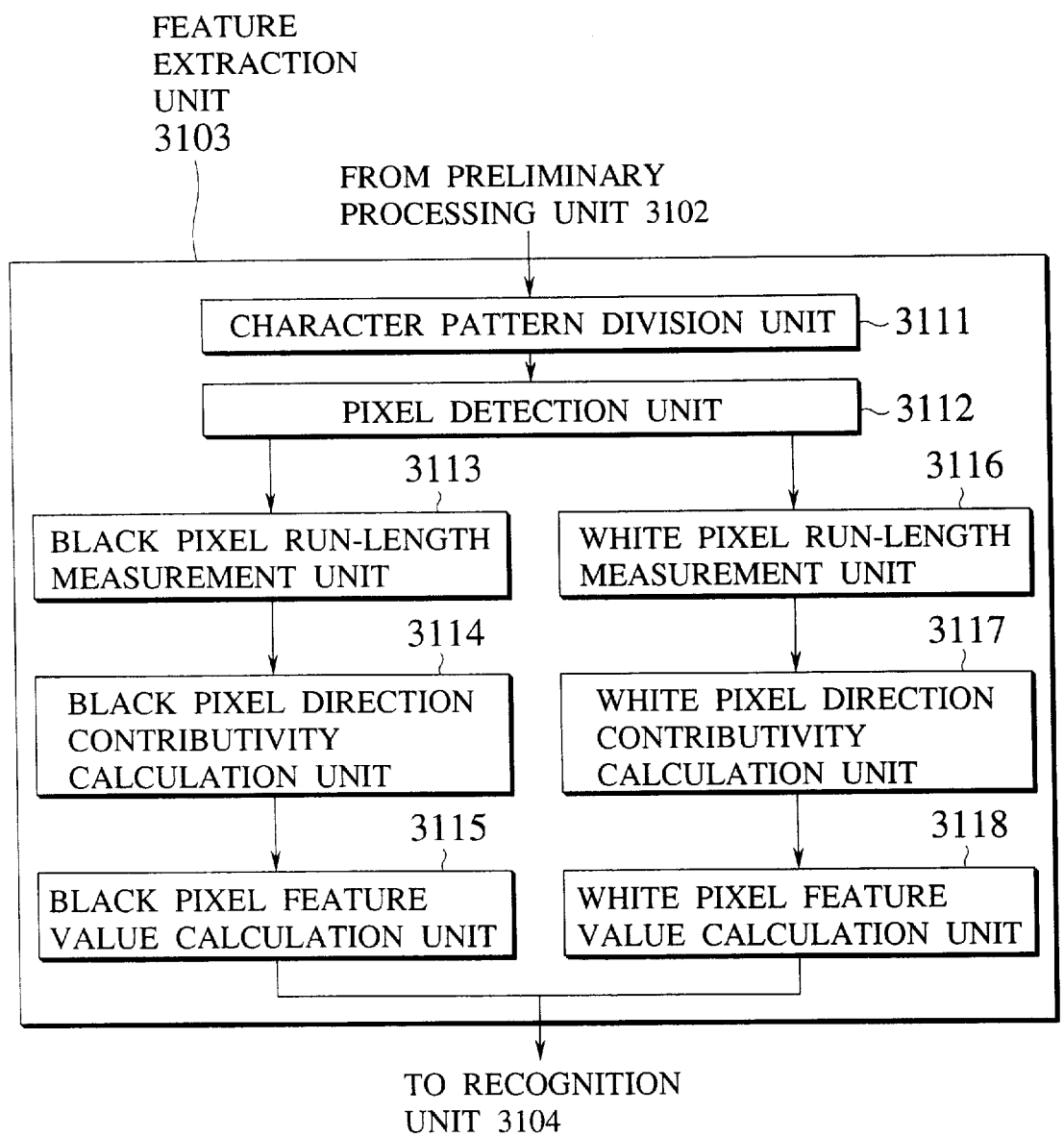
FIG. 51 is a block diagram showing an exemplary internal configuration of a feature extraction unit in the apparatus of FIG. 49.

FIG. 51 shows an exemplary internal configuration of the feature extraction unit 3103, which comprises a character pattern division unit 3111 for dividing the character pattern into a plurality of coarse mesh regions, a pixel detection unit 3112 for detecting each pixel existing in each mesh region and judging whether it is white or black, a black pixel run-length measurement unit 3113 for extending the scanning lines into a plurality of directions (eight directions of 0°, 45°, 90°, 135°, 180°, 225°, 270° and 315° for example) from each black pixel in each mesh region and obtaining the run-length of the black pixels in each direction; a black pixel direction contributivity calculation unit 3114 for calculating the direction contributivity values indicating a distribution of respective direction components of a character portion formed by the black pixels from the black pixel run-lengths, a black pixel feature value calculation unit 3115 for obtaining a feature value of the character portion in the entered character pattern by counting the direction contributivity values for each black pixel in each mesh region, a white pixel run-length measurement unit 3116 for extending the scanning lines-into a plurality of directions (eight directions of 0°, 45°, 90°, 135°, 180°, 225°, 270° and 315° for example) from each white pixel in each mesh region and obtaining the run-length of the white pixels in each direction, a white pixel direction contributivity calculation unit 3117 for calculating the direction contributivity values indicating a distribution of respective direction components of a background portion formed by the white pixels from the white pixel run-lengths, and a white pixel feature value calculation unit 3118 for obtaining a feature value of the background portion in the entered character pattern by counting the direction contributivity values for each white pixel in each mesh region.

The recognition unit 3104 produces a feature table for the purpose of recognizing the character pattern according to the direction contributivity values of the black pixels and the direction contributivity values of the white pixels obtained by the feature extraction unit 3103, and carries out the character pattern recognition by matching the feature table with the feature dictionary table 3105 of recognizable characters provided in advance, using both the direction contributivity of the white pixels and the direction contributivity of the black pixels for each character.

Figure 52:
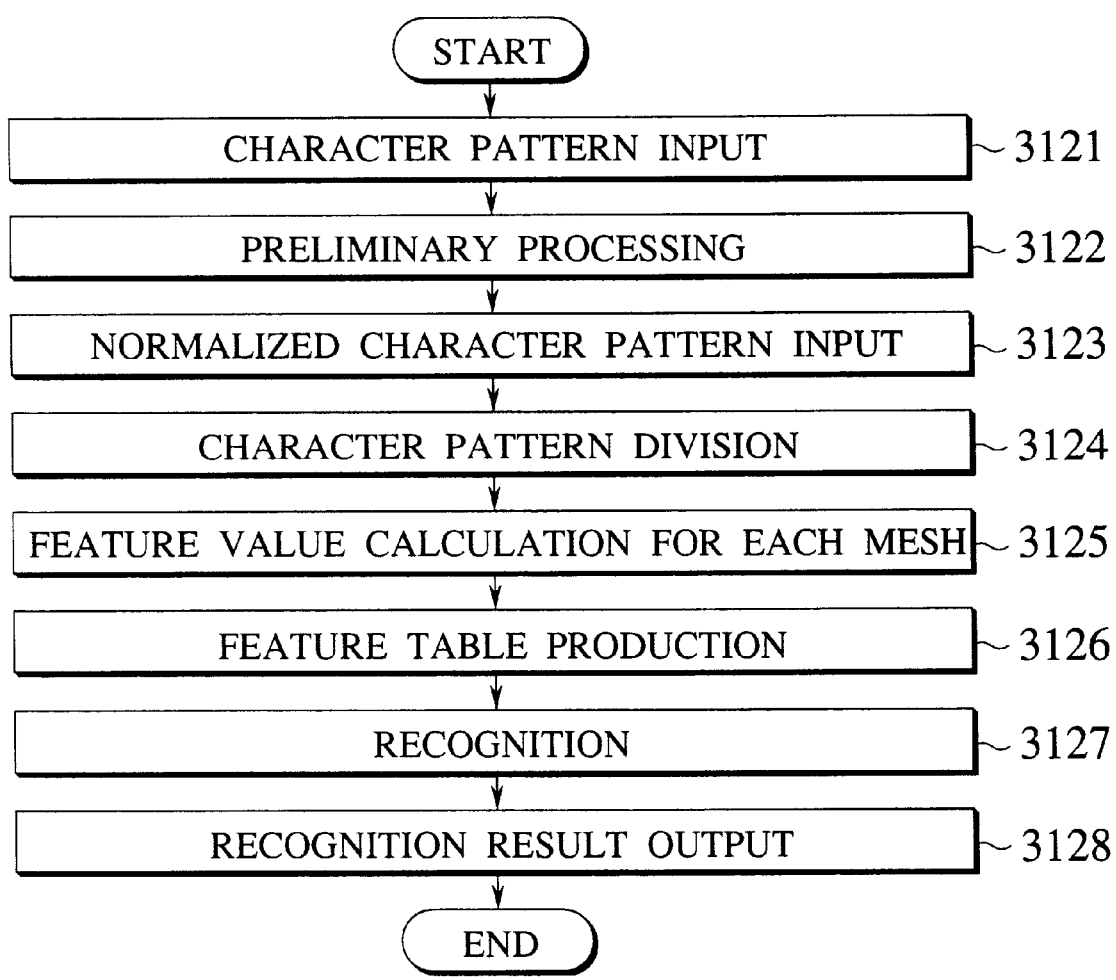
FIG. 52 is a flow chart for the processing procedure of the character recognition processing by the apparatus of FIG. 49.

As an exemplary case of the character recognition processing according to this fifth embodiment, a specific case of dividing the character pattern into coarse mesh regions, extending the scanning lines into eight directions (0°, 45°, 90°, 135°, 180°, 225°, 270° and 315° which are labelled with numbers 1, 2, 3, 4, 5, 6, 7 and 8 respectively) from each pixel in each mesh region, obtaining the direction contributivities of the black pixels and the white pixels and recognizing the character pattern will now be described. FIG. 52 shows the processing procedure of this character recognition processing, which proceeds as follows.

The input character pattern extracted as a region of a single character is entered into the preliminary processing unit 3102 (step 3121), and the preliminary processing unit 3102 carries out the position and size normalization of the input character pattern (step 3122). The normalized character pattern of N×N meshes obtained by the preliminary processing is then entered into the character division unit 3111 of the feature extraction unit 3103 (step 3123). The character pattern division unit 3111 uniformly divides the normalized character pattern into K pieces of coarse mesh regions, such as square mesh regions (step 3124). The mesh divided character pattern is then entered into the pixel detection unit 3112 and the calculation of the feature value in each mesh is carried out at the feature extraction unit 3103 as follows (step 3125).

Figure 53:
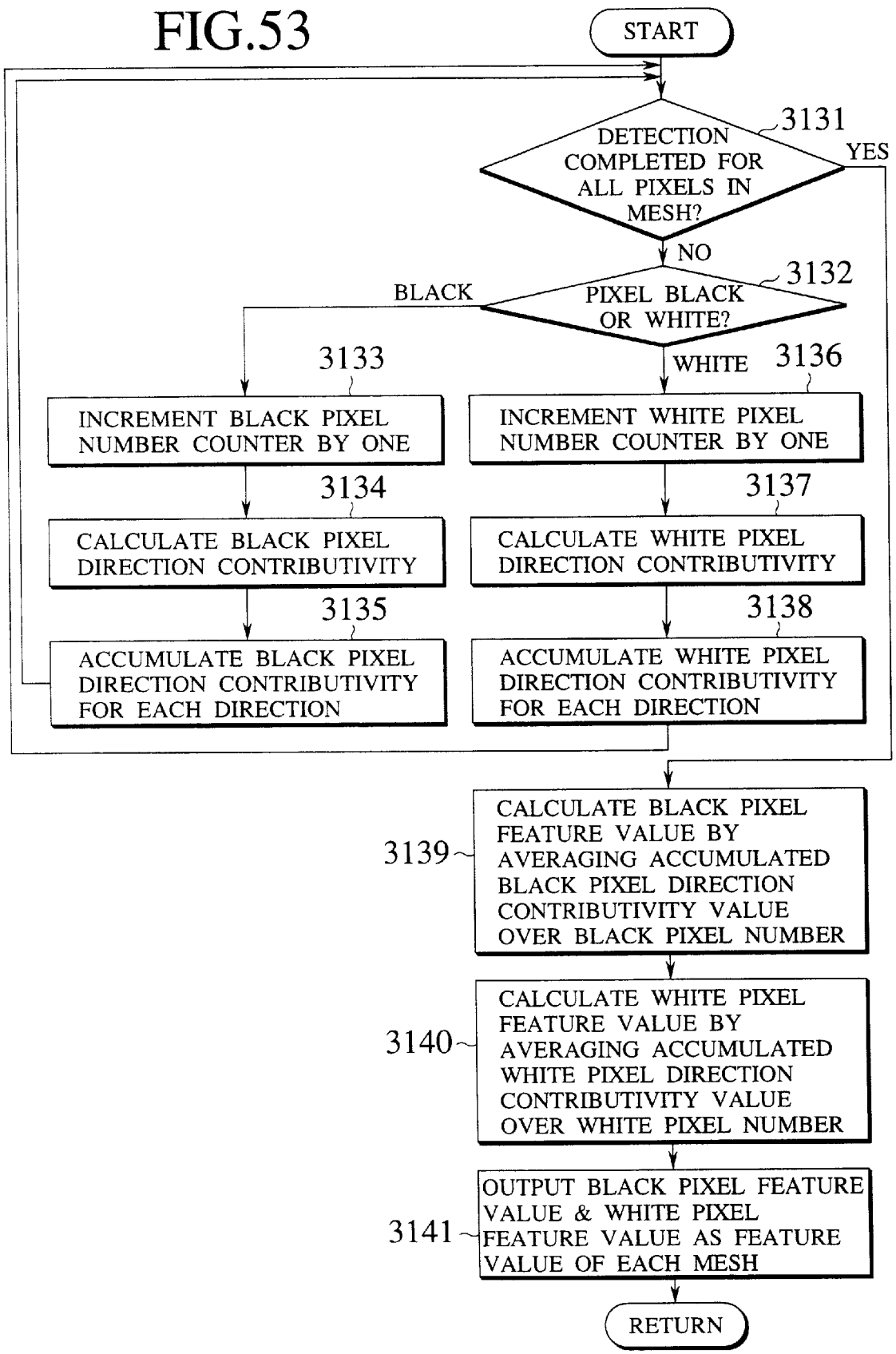
FIG. 53 is a flow chart for the processing procedure for calculating a feature value in each mesh within the processing procedure of FIG. 52.

FIG. 53 shows a specific processing procedure for the calculation of the feature value in each mesh at the feature extraction unit 3103. The pixel detection unit 3112 detects each pixel in each mesh region of the mesh divided character pattern until detection of all pixels in each mesh is completed (step 3131), and judges whether each detected pixel is white or black (step 3132). When the detected pixel is the black pixel, the detected black pixel is given to the black pixel run-length measurement unit 3113, where the count of the black pixel number is incremented by one (step 3133). Then, the direction contributivity is calculated for the detected black pixel as follows (step 3134). The case where the detected pixel is the white pixel will be described later.

Figure 54:
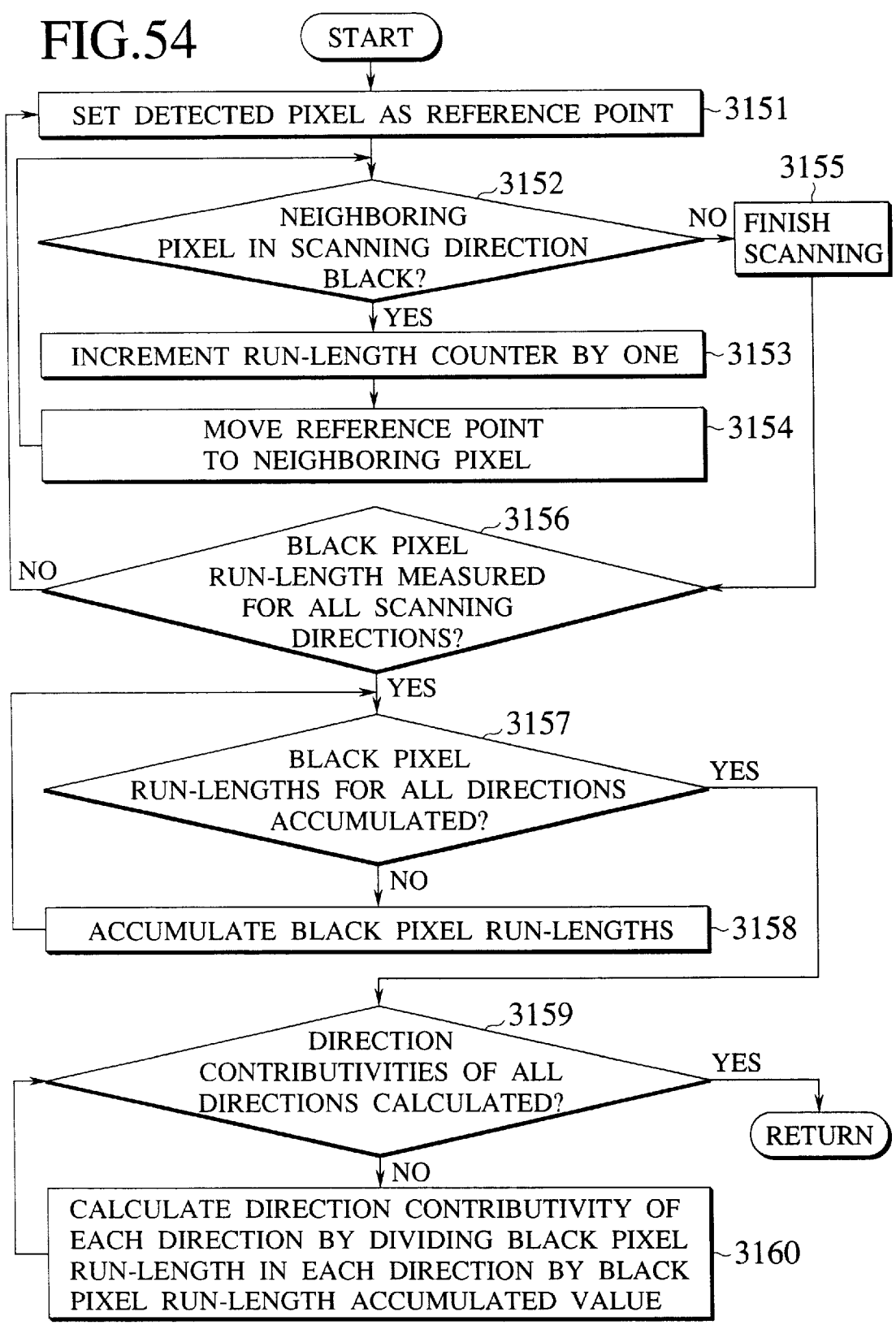
FIG. 54 is a flow chart for the processing procedure. for calculating a black pixel direction contributivity at each black pixel within the processing procedure of FIG. 53.

FIG. 54 shows a specific processing procedure for calculating the black pixel direction contributivity when the detected pixel is the black pixel. The black pixel run-length measurement unit 3113 sets the detected pixel as a reference point (step 3151) and detects a neighboring pixel by extending the scanning line in each direction, and judges whether the neighboring pixel in the scanning direction is black or not (step 3152). When the neighboring pixel in the scanning direction is black, the run-length counter is incremented by one (step 3153), the neighboring pixel is newly set as a reference point (step 3154), and the scanning processing is repeated. Here, the scanning processing is not limited to pixels within a mesh region in which the detected pixel exists, and carried out with respect to the entire normalized character pattern. When the neighboring pixel in the scanning direction is white or when there is no neighboring pixel in the scanning direction, the scanning is finished (step 3155). This processing is carried out for all of the eight directions (step 3156). The obtained black pixel run-lengths for the eight directions are then given to the black pixel direction contributivity calculation unit 3114.

The black pixel direction contributivity calculation unit 3114 accumulates the black pixel run-lengths for the eight directions obtained from each black pixel, using the straightforward summation or the square root of square sum (steps 3157, 3158). Then, the direction contributivity of each direction is calculated by dividing the black pixel run-length of each direction by the black pixel run-length accumulated value (steps 3159, 3160). The direction contributivity fb of each black pixel so obtained can be expressed in a form of an eight-dimensional vector given by:

$$fb=(\alpha 1, \alpha 2, \alpha 3, \alpha 4, '5, \alpha 6, \alpha 7, \alpha 8)$$

where $\alpha 1, \alpha 2, \alpha 3, \alpha 4, \alpha 5, \alpha 6, \alpha 7$ and $\alpha 8$ are the direction contributivity components of the eight directions respectively, each of which is given by:

$$\alpha_i = lb_i \left/ \left( \left( \sum_{j=1}^{8} lb_j^2 \right) \right)^{1/2} \right.$$

where $lb_i$ (i=1, 2, . . . , 8) is the black pixel run-length obtained in each direction, in the case of using the square root of square sum as the black pixel run-length accumulated value.

Returning now to FIG. 53, the direction contributivity fb obtained in this way is then accumulated for all the black pixels in each mesh, for each direction (step 3135). The accumulated direction contributivity value and the black pixel number are then given to the black pixel feature value calculation unit 3115.

On the other hand, when the detected pixel is the white pixel at the step 3132, the detected white pixel is given to the white pixel run-length measurement unit 3116, where the count of the white-pixel number is incremented by one (step 3136). Then, the white pixel direction contributivity is calculated for the detected white pixel as follows (step 3137).

Figure 55:
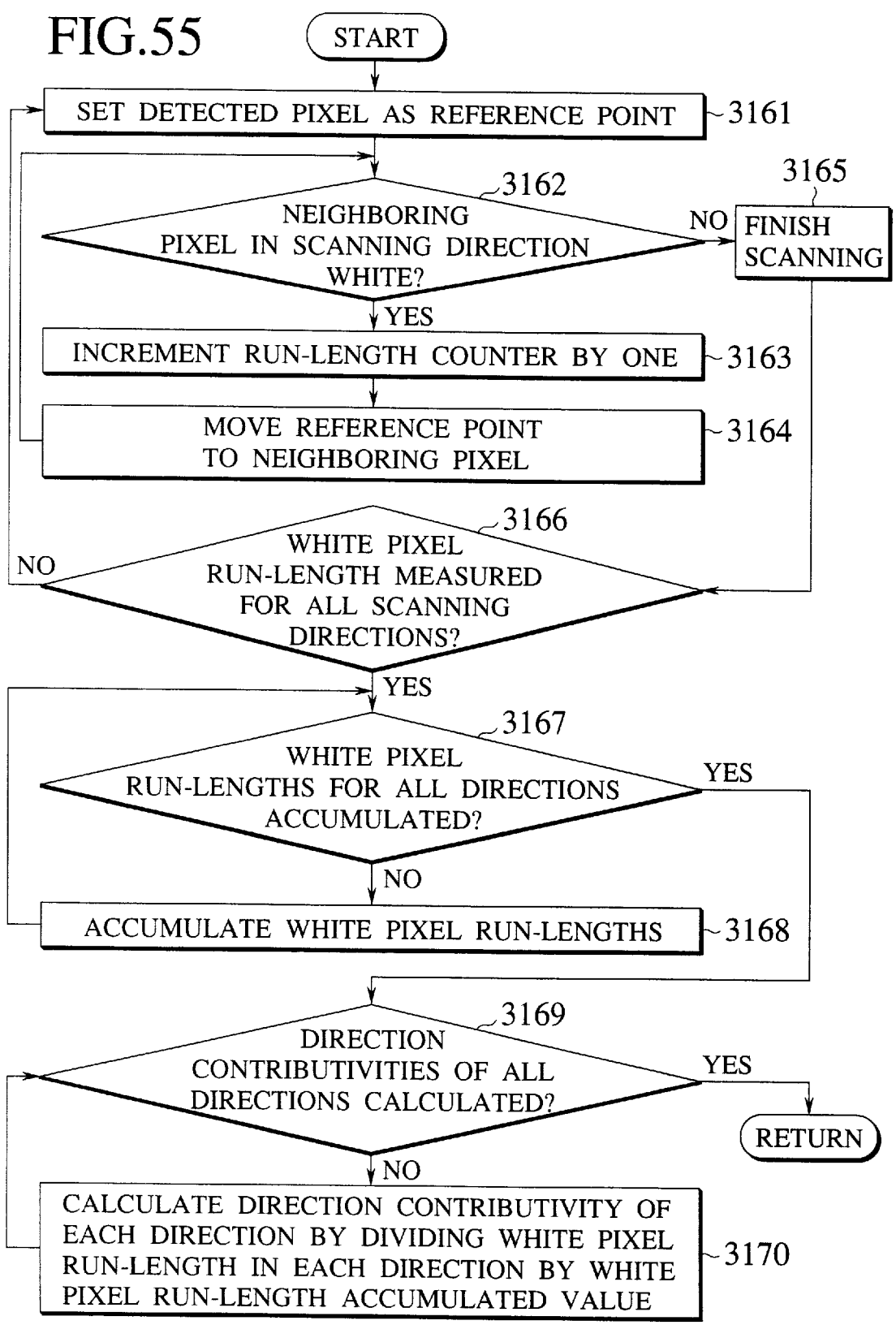
FIG. 55 is a flow chart for the processing procedure for calculating a white pixel direction contributivity at each white pixel within the processing procedure of FIG. 53.

FIG. 55 shows a specific processing procedure for calculating the white pixel direction contributivity when the detected pixel is the white pixel. The white pixel run-length measurement unit 3116 sets the detected pixel as a reference point (step 3161) and detects a neighboring pixel by extending the scanning line in each direction, and judges whether the neighboring pixel in the scanning direction is white or not (step 3162). When the neighboring pixel in the scanning direction is white, the run-length counter is incremented by one (step 3163), the neighboring pixel is newly set as a reference point (step 3164), and the scanning processing is repeated. Here, the scanning processing is not limited to pixels within a mesh region in which the detected pixel exists, and carried out with respect to the entire normalized character pattern. When the neighboring pixel in the scanning direction is black or when there is no neighboring pixel in the scanning direction, the scanning is finished (step 3165). This processing is carried out for all of the eight directions (step 3166). The obtained white pixel run-lengths for the eight directions are then given to the white pixel direction contributivity calculation unit 3117.

The white pixel direction contributivity calculation unit 3117 accumulates the white pixel run-lengths for the eight directions obtained from each white pixel, using the straightforward summation or the square root of square sum (steps 3167, 3168). Then, the direction contributivity of each direction is calculated by dividing the white pixel run-length of each direction by the white pixel run-length accumulated value (steps 3169, 3170). The direction contributivity fw of each white pixel so obtained can be expressed in a form of an eight-dimensional vector given by:

$$fw=(\beta 1, \beta 2, \beta 3, \beta 4, \beta 5, \beta 6, \beta 7, \beta 8)$$

where $\beta 1, \beta 2, \beta 3, \beta 4, \beta 5, \beta 6, \beta 7$ and $\beta 8$ are the direction contributivity components of the eight directions respectively, each of which is given by:

$$\beta_i = lw_i \left/ \left( \left( \sum_{j=1}^{8} lw_j^2 \right) \right)^{1/2} \right.$$

where $lw_i$ (i=1, 2, . . . , 8) is the white pixel run-length obtained in each direction, in the case of using the square root of square sum as the white pixel run-length accumulated value.

Returning now to FIG. 53, the direction contributivity fw obtained in this way is then accumulated for all the white pixels in each mesh, for each direction (step 3138). The accumulated direction contributivity value and the white pixel number are then given to the white pixel feature value calculation unit 3118.

The black pixel feature value calculation unit 3115 calculates the feature value for each black pixel in each mesh by averaging the accumulated black pixel direction contributivity value over the number of black pixels in each mesh (step 3139). The feature value fbk for the black pixel obtained at the k-th mesh region (k=1, 2 . . . , k, . . . , K) is given by:

$$fbk=(\oplus k1, \alpha k2, \ldots, \alpha k8)$$

where $\alpha k1, \alpha k2, \ldots, \alpha k8$ are elements of the direction contributivity vector obtained by accumulating the black pixel direction contributivity vectors at all the black pixels existing in the k-th mesh region in respective directions and averaged over the number of black pixels.

The white pixel feature value calculation unit 3118 calculates the feature value for each white pixel in each mesh by averaging the accumulated white pixel direction contributivity value over the number of white pixels in each mesh (step 3140). The feature value fwk for the white pixel obtained at the k-th mesh region (k=1, 2, . . . , k, . . . , K) is given by:

$$fwk = (\beta k1, \beta k2, \ldots, \beta k8)$$

where βk1, βk2, . . . , βk8 are elements of the direction contributivity vector obtained by accumulating the white pixel direction contributivity vectors at all the white pixels existing in the k-th mesh region in respective directions and averaged over the number of white pixels.

The feature value in each mesh is obtained by combining the black pixel feature value fbk and the white pixel feature value fwk, and outputted (step 3141). Thus the feature value fk obtained at the k-th mesh region is given by the following sixteen-dimensional vector.

$$fk = (\alpha k1, \alpha k2, \ldots, \alpha k8, \beta k1, \beta k2, \ldots, \beta k8)$$
$$= (fbk, fwk)$$

The above processing is carried for all the mesh regions. As a result, the feature value F of the character pattern can be expressed as follows.

$$F = (fb1, fw1, fb2, fw2, \ldots, fbk, fwk, \ldots, fbK, fwK)$$
$$= (f1, f2, \ldots, fk, \ldots, fK)$$

Returning now to FIG. 52, the feature table is produced from values of the elements of the feature value F for the character pattern so obtained (step 3126).

Then, the recognition unit 3104 recognizes the character pattern by obtaining the conventionally known classifier D(F) such as the Euclidean distance for example (step 3127).

Here, the classifier is used such that the distance between the feature vector of the input character pattern and the feature vector of each character type that is stored in the feature table in advance is calculated and the character for which the calculated distance is the smallest (or the largest depending on the function used) is outputted as the candidate character (step 3128).

When the feature vector of the input character pattern is given by F=(f1, f2, . . . , fk . . . , fK) while the feature vector of the i-th character (1≦i≦M) in the feature table is given by Si=(si1, si2, . . . , siK), and the Euclidean distance is to be used for instance, the classifier given by:

$$D(F, Si) = \left(\left(\sum_{j=1}^{K}(fj - sij)^2\right)\right)^{1/2}$$

will be calculated for each i=1 to M, and the i-th character for which D(F, Si) becomes the smallest will be outputted as the recognition result.

Figure 56:
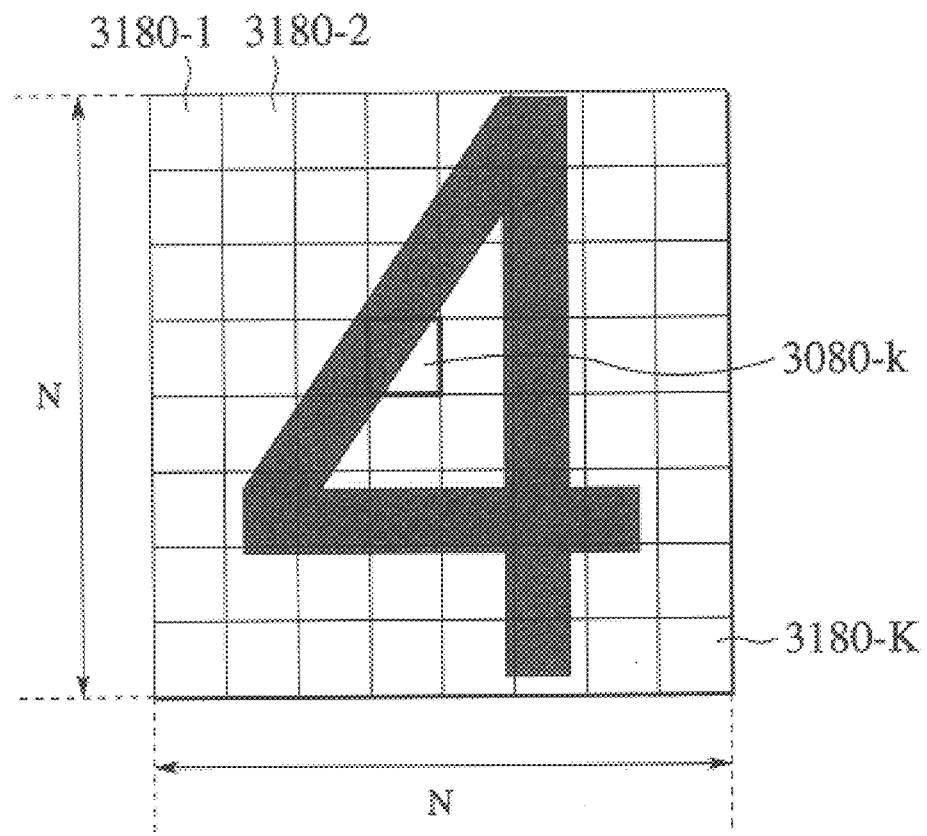
FIG. 56 is a diagram showing an exemplary case of character pattern division used in the apparatus of FIG. 49.

FIG. 56 shows an exemplary case of dividing the character pattern into K pieces of coarse square mesh regions 3180-1, 3180-2, . . . , 3180-k, . . . , 3180-K.

Figure 57:
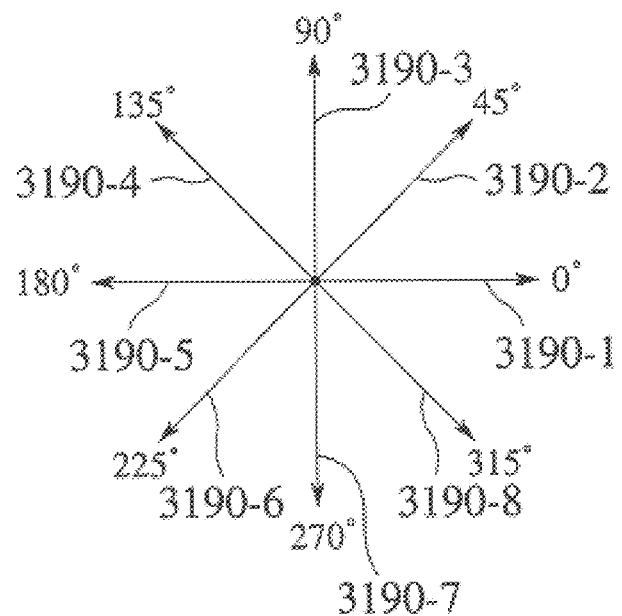
FIG. 57 is a diagram showing exemplary directions for extending scanning lines used in the apparatus of FIG. 49.

FIG. 57 shows exemplary eight directions 3190-1 to 3090-8 at 45° interval into which the scanning lines are to be extended in order to obtain the black pixel run-lengths and the white pixel run-lengths in the character pattern.

Figure 58:
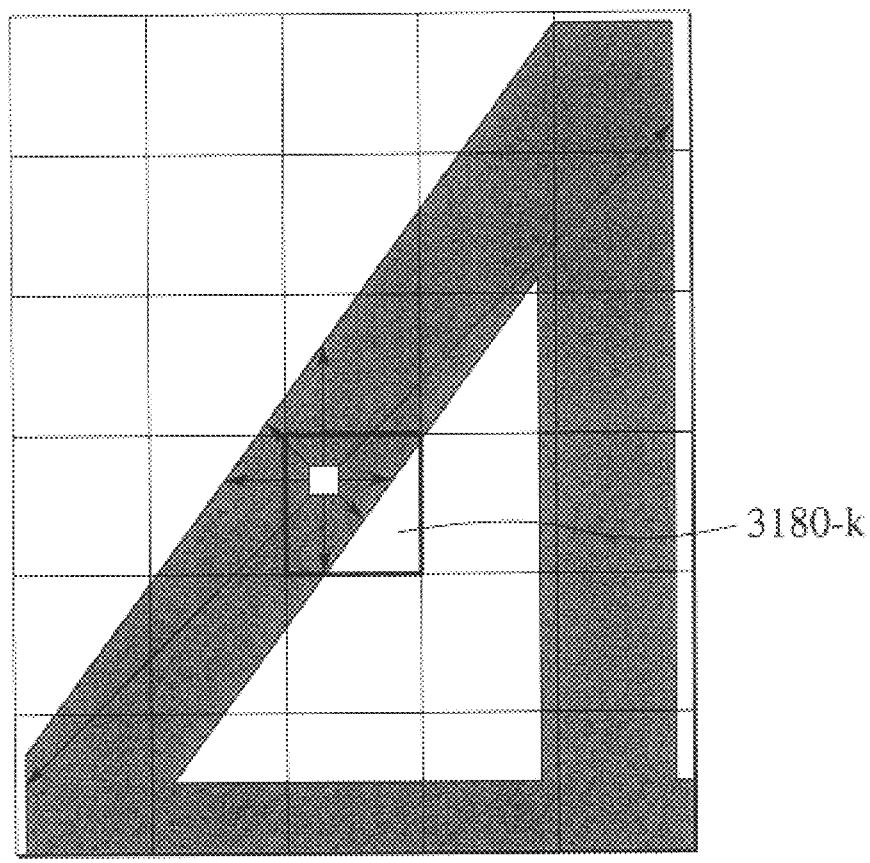
FIG. 58 is a diagram showing an exemplary state of obtaining black pixel run-lengths in the apparatus of FIG. 49.

FIG. 58 shows an exemplary state of obtaining the black pixel run-lengths by extending the scanning lines into eight directions in order to obtain the direction contributivity at the black pixel in the k-th mesh region 3180-k of FIG. 56.

Figure 59:
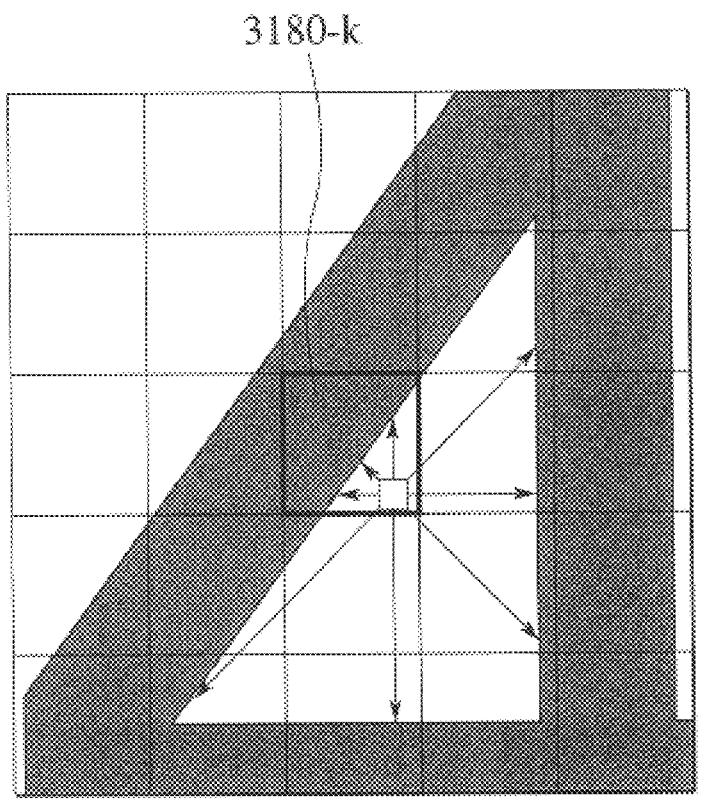
FIG. 59 is a diagram showing an exemplary state of obtaining white pixel run-lengths in the apparatus of FIG. 49.

FIG. 59 shows an exemplary state of obtaining the white pixel run-lengths by extending the scanning lines into eight directions in order to obtain the direction contributivity at the white pixel in the k-th mesh region 3180-k of FIG. 56.

According to the recognition experiment conducted by the present inventors using printing characters of 20 fonts and 3830 categories as the learning data registered in the feature dictionary table, approximately 3400 patterns extracted from the actual video data as evaluation data, the Euclidean distance for the recognition, and division of each character pattern into 8×8 rectangles or 8 sections in 8-directions for the feature extraction, it was demonstrated that the higher recognition rate can be obtained by the present invention for the contour deformed characters in the case of recognizing character patterns with little noise, and that the high recognition rate can be obtained more stably by extracting features from the background portion as well rather than extracting features only from the character portion. Also, since the actual data often contain the noise components in the background, the evaluation for character patterns with many noise was also conducted, and it was demonstrated that the lowering of the recognition rate due to noise can be suppressed by the present invention.

As described, according to this fifth embodiment, the direction contributivities of the white pixels and the black pixels are both used, so that the effects of the case using the white pixels alone can be complemented by the effects of the case using the black pixels alone, and therefore it becomes possible to more effectively recognize the recognition target character which is associated with the character line displacement or the contour portion deformation even in the case of dealing with many character types.

Note that, in the fourth and fifth embodiments described above, a part or a whole of the configurations shown in FIG. 40, FIG. 42, FIG. 49 and FIG. 51 can be implemented in a form of a computer, and the processing procedures shown in FIGS. 43, 44 and 45 or FIGS. 52, 53, 54 and 54 can be executed by a computer. The programs for causing the computer to functions as elements of these configurations or to execute these processing procedures can be stored and distributed in a computer readable recording medium such as floppy disk, MO, ROM, memory card, CD, DVD, removable disks, etc.

Next, various embodiments of the present invention concerning the utilization of the telop character extraction and recognition scheme as described in the above embodiments will be described.

Referring now to FIG. 60 to FIG. 63, the sixth embodiment of the present invention will be described in detail.

Conventionally, in order to record the video data during the broadcast, it has been necessary to record the video data by a video recorder or the like. However, in order to record the character information displayed in the video during the broadcast, it has been necessary to either jot it down or make the video recording of it quickly, and there are many cases of missing the actually necessary information.

As a solution to this problem, there has been a proposition of a TV set which has a function for storing still images at timings specified from a remote controller or the like in its memory. However, the number of images that can be stored has been limited to several frames to several tens of frames due to a limitation of a memory. For this reason, the conventionally adopted scheme is to make the still image storing only when it is specified from a remote controller or the like. As a result, however, there are cases where the remote controller is not at hand so that the image storing cannot be made timely. Also, it has been completely impossible to utilize the character information that was displayed while one was not watching.

Thus it is desirable to provide a video storage and display device which can realize the display of the character information by tracing back to the past, that is, an automatic electronic memo function so to speak, by automatically storing only those images in the video which contain the character information.

To this end, this sixth embodiment provides a video storage and display device that functions as a video display device for TV and the like, and which has a detection unit for detecting that the character information is displayed during the video, an extraction unit for extracting only representative character display frames from a plurality of frames in which the character display is detected, by deleting the other frames in which the same characters are shown, a first conversion unit for converting the character display frames into still images, a generation unit for generating still images at timings specified by still image storing commands from a user regardless of the character display, a storage unit for storing the generated still images, a second conversion unit for converting the still images into video data suitable for video display, and a display unit for displaying the stored still images according to operation commands from a user.

Here, the storage unit may have a long-term storage memory or disk in which the desired images specified by a user can be stored for a long time and a temporary storage buffer for storing the other images from which the older ones will be sequentially deleted as the buffer becomes full.

Also, the generation unit may have a recording unit for recording additional information such as time, channel, etc., in correspondence to the character appearing frame image to be displayed later on.

In addition, when it is possible to store a large amount of data in the device, the storage unit may have a playback unit for recording the video data over a prescribed period of time and playback the video before and after the character appearing frame.

Figure 60:
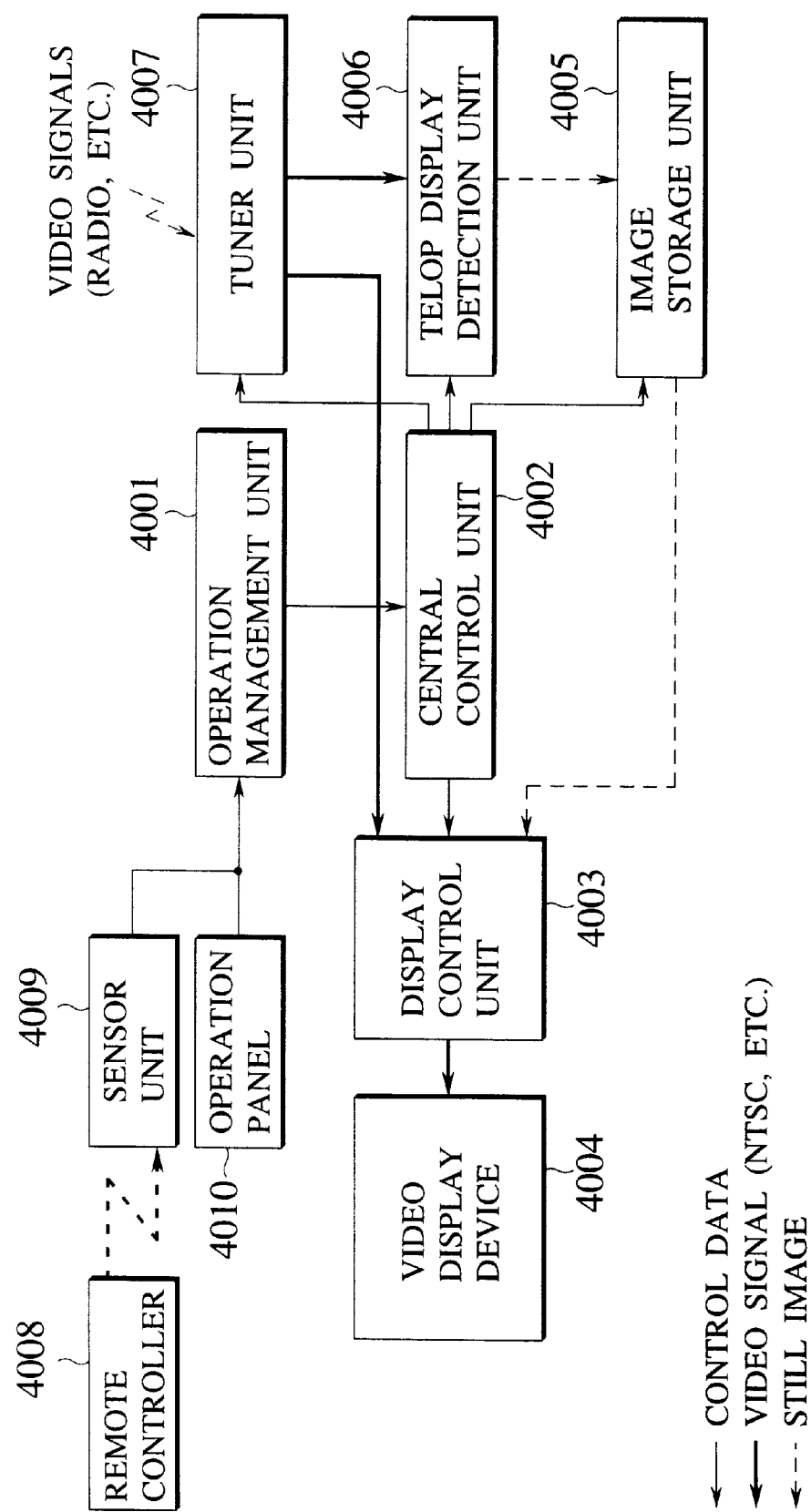
FIG. 60 is a block diagram showing an exemplary configuration of a video storage and display device according to the sixth embodiment of the present invention.

More specifically, FIG. 60 shows an exemplary configuration of such a video storage and display device of the sixth embodiment, which comprises an operation management unit 4001 for receiving operation command signals and sending control signals, a tuner unit 4007 for receiving video signals, a telop display detection unit 4006 for detecting characters from the images, an image storage unit 4005 for storing images that contain characters, a video display device 4004 for displaying the video signals received by the tuner unit 4007, a display control unit 4003 for controlling the video display device 4003, a remote controller 4008 for sending operation signals, a sensor unit 4009 for receiving the operation signals from the remote controller 4008 and entering them into the operation management unit 4001, an operation panel 4010 for entering operation signals directly into the operation management unit 4001, and a central control unit 4002 for controlling the tuner unit 4007, the telop display detection unit 4006, the image storage unit 4005 and the display control unit 4003.

In terms of hardware, this video storage and display device can be utilized as a video storage and display device for TV, PC, VTR, or DVD.

In this video storage and display device, the telop display detection unit 4006 detects that the character information such as that of telop or card is displayed during the video, and sequentially stores the images in which the character information is shown (the character appearing frames) as still images into the image storage unit 4005. Then, upon receiving a character appearing frame display request from a user through the remote controller 4008 or the control panel 4010, the still images stored in the image storage unit 4005 are converted into the video signals by the display control unit 4003 and displayed on a screen of the video display device 4004. The user can enter commands for image display start, fast forward, rewind, display stop, etc., from the remote controller 4008 and the operation panel 4010.

Figure 61:
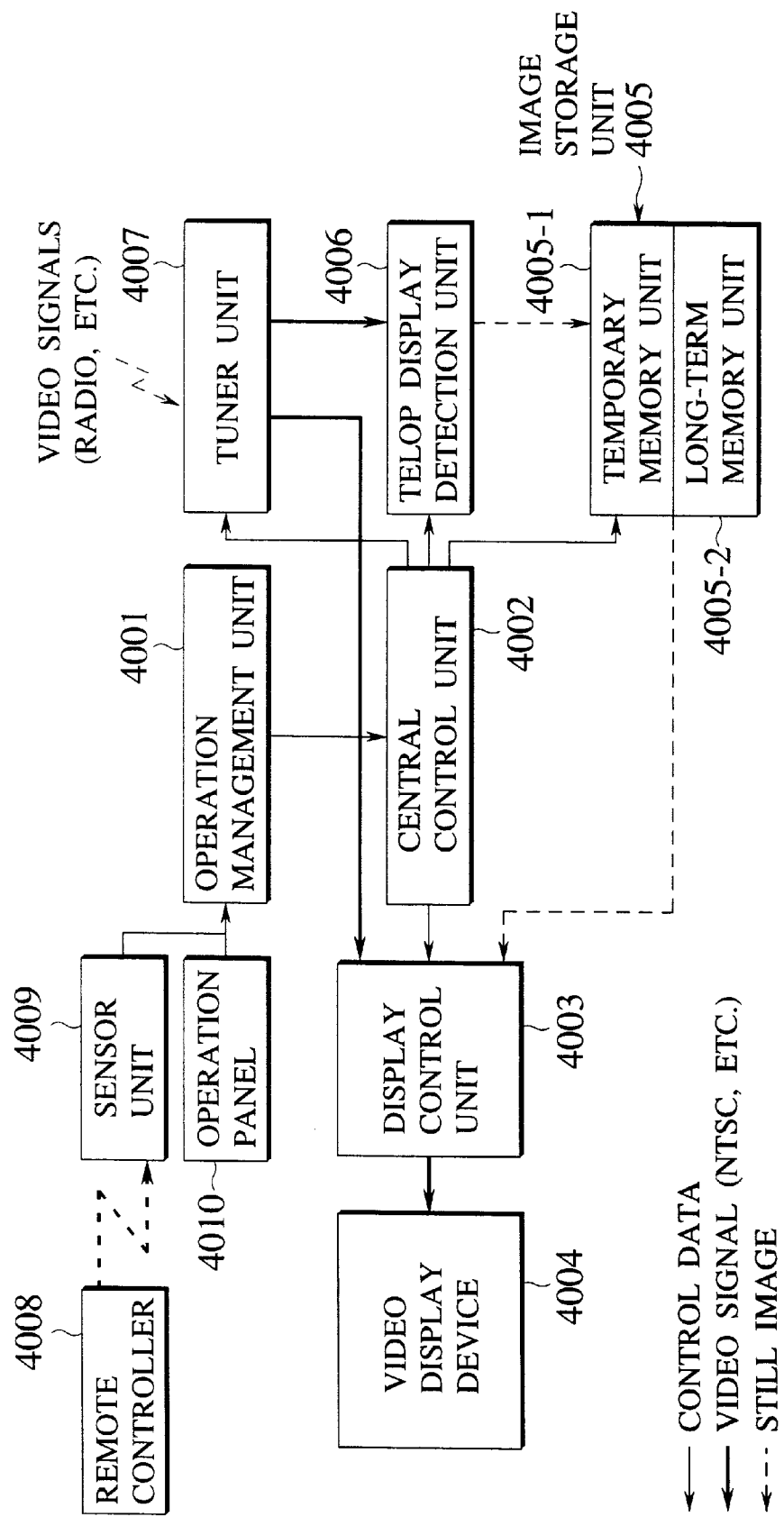
FIG. 61 is a block diagram showing one modified configuration of a video storage and display device according to the sixth embodiment of the present invention.

FIG. 61 shows a modified configuration of the video storage and display device of the sixth embodiment, which differs from FIG. 60 in that the image storage device 4005 is divided into a temporary memory unit 4005-1 and a long-term memory unit 4005-2.

The character information typically appears in succession so that it is impossible to store them all. For this reason, it is possible to use this modified configuration of FIG. 61 where the images for which the long term storing is desired can be stored in the long-term memory unit 4005-2 such as a long-term memory or disk when the user specifies it. The other images are stored in a temporary memory unit 4005-1, from which the older ones will be sequentially deleted when it becomes full.

Figure 62:
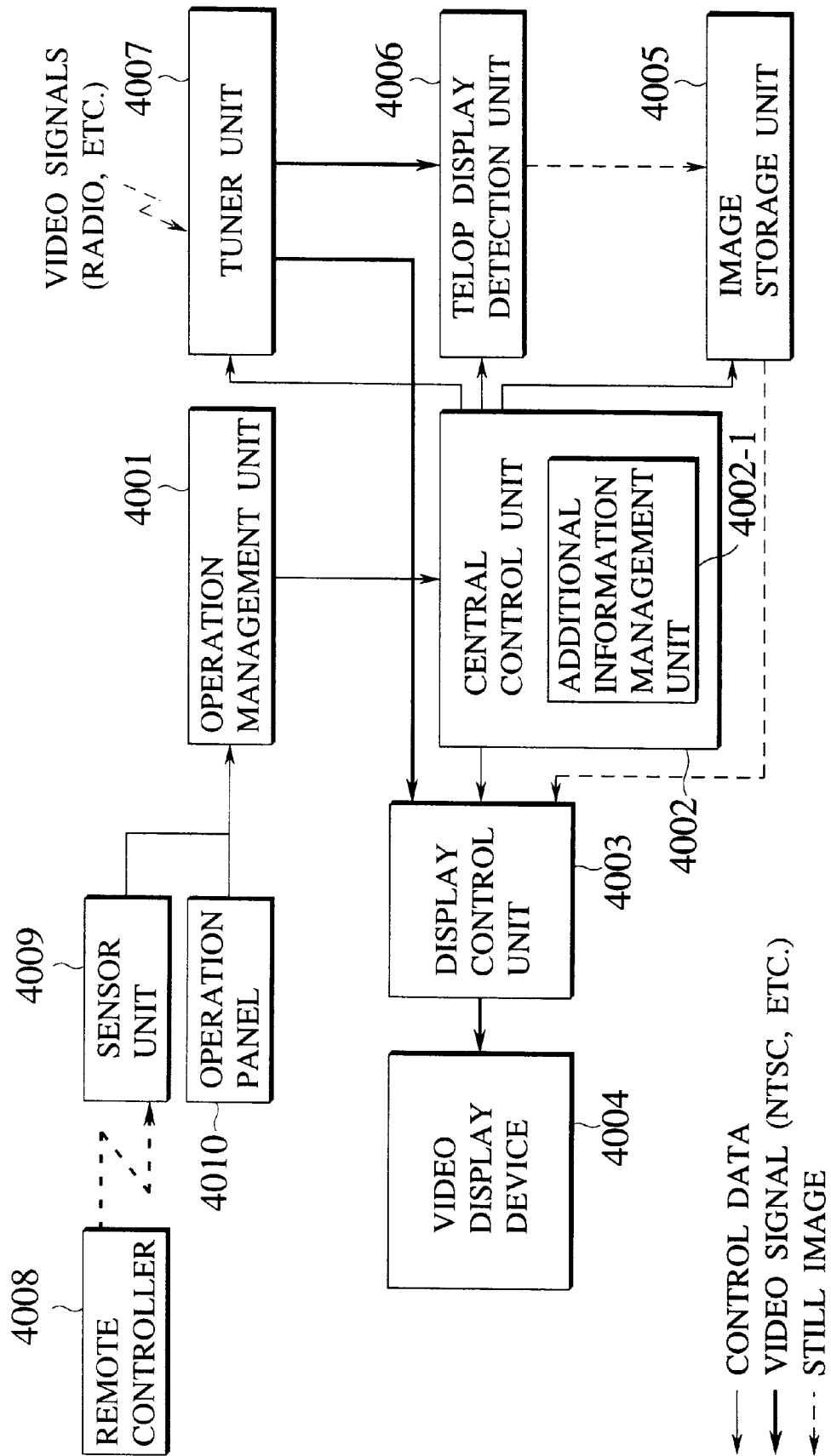
FIG. 62 is a block diagram showing another modified configuration of a video storage and display device according to the sixth embodiment of the present invention.

FIG. 62 shows another modified configuration of the video storage and display device of the sixth embodiment, which differs from FIG. 60 in that an additional information management unit 4002-1 is provided in the central control unit 4002. Using this additional information management unit 4002-1, the additional information such as time, channel, etc., can be added to the character appearing frame image at a time of display.

Figure 63:
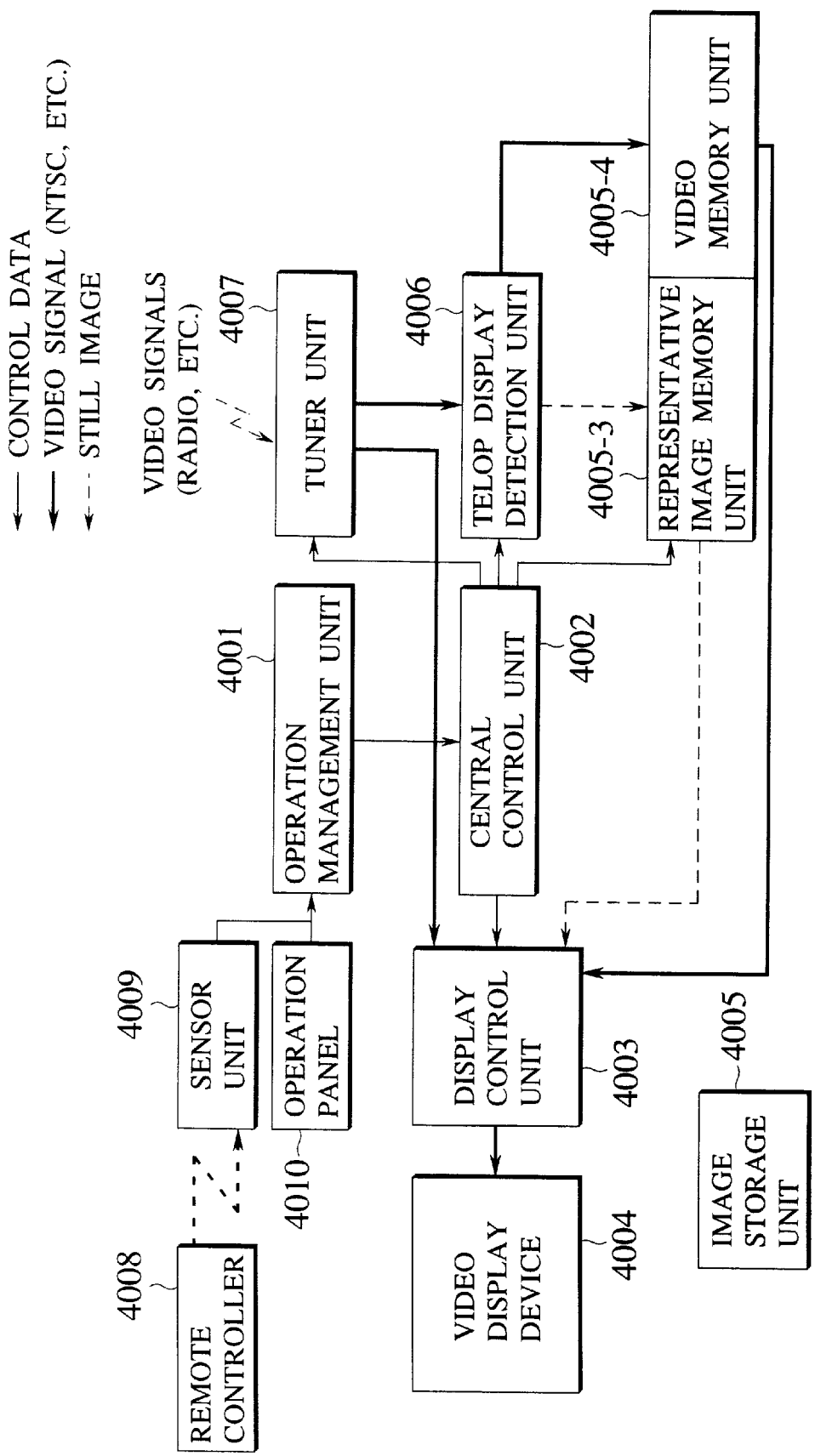
FIG. 63 is a block diagram showing another modified configuration of a video storage and display device according to the sixth embodiment of the present invention.

FIG. 63 shows another modified configuration of the video storage and display device of the sixth embodiment, which differs from FIG. 60 in that a representative image memory unit 4005-3 and a video memory unit 4005-4 are provided in addition to the image storage unit 4005. This configuration is suitable when a large amount of data can be stored in the device. The video data is recorded over a prescribed period of time such that the video before and after the character appearing frame can also be displayed.

As described, according to this sixth embodiment, only those images in which the character information is displayed are selectively recorded from the video data that last for much longer time (several minutes to several tens of minutes), by automatically detecting that the character information is displayed in the video. In this way, it becomes possible to realize the display of the character information by trancing back to the past, without requiring the user to give an image storage command each time.

Referring now to FIG. 64 to FIGS. 70A and 70B, the seventh embodiment of the present invention will be described in detail.

There is a proposition of a video retrieval and display device which has a function for retrieving video such as that of a TV program and a function for recognizing the telop characters displayed in the video, as disclosed in Japanese Patent Application Laid Open No. 3-160664 (1991). This device has a configuration combining the video tape recorder (VTR) and a workstation, where TV signals are entered into the VTR and the computer and the VTR records the input TV signals on VTR tapes while the computer carries out the processing for recognizing characters displayed in the video during the recording, records the character recognition results as index files in an external memory device of the computer, and marks numbers corresponding to the index files on the VTR tapes. Here, the character recognition is carried out at constant time interval. This device also has a function for easily retrieving and displaying the desired video from the recorded video data according to the markings on the VTR tapes.

Figure 70A:
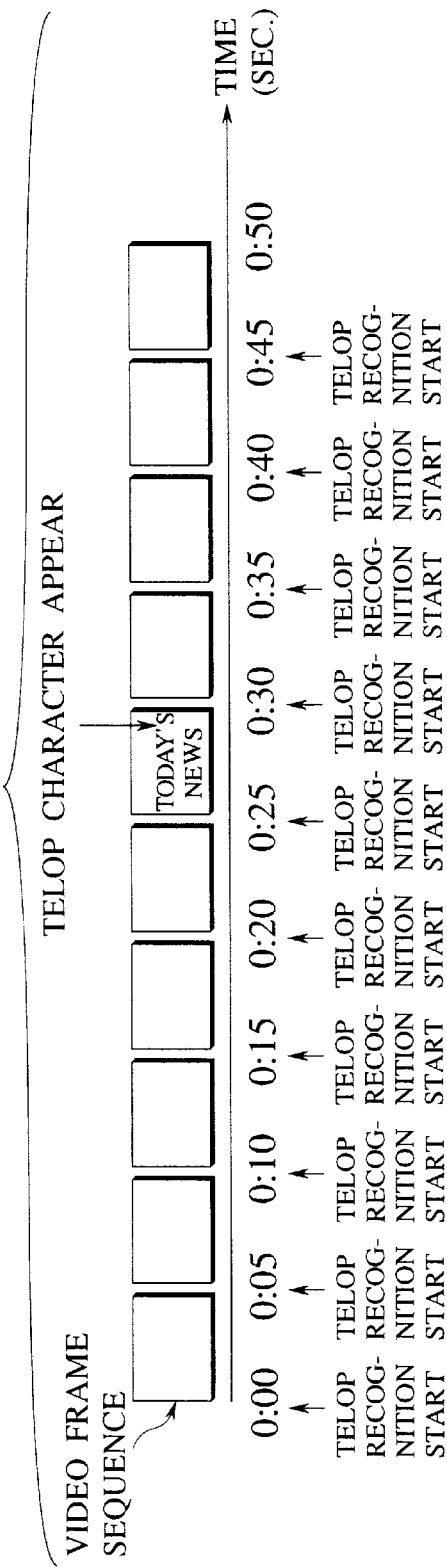
FIGS. 70A and 70B are diagrams for explaining problems of the operation by a conventional video retrieval and display device.
Figure 70B:
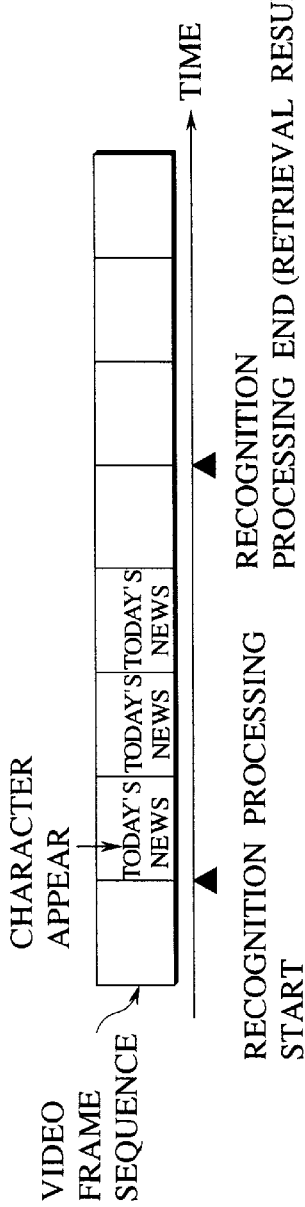

In this conventional device, however, the telop character recognition is carried out at constant time interval (such as five seconds) with respect to the video entered into the workstation, so that the character recognition processing is carried out for those frames in which the telop is not displayed as well, and there is a problem that many useless index files without the character information will be created (see FIG. 70A).

In addition, in this conventional device, the time at which the telop character recognition processing is finished is set as an information regarding time on the VTR tapes that corresponds to the telop character recognition result contained in the index file stored in the external memory device of the computer. However, various objects in various colors are displayed in the video so that it is difficult to finish every telop character recognition processing within a predetermined period of time. In other words, in this conventional device, the information regarding time on the VTR tapes that corresponds to the telop character recognition result contained in the index file is actually later than the time at which the telop characters are actually displayed as much as the time taken by the telop character recognition processing. For this reason, when the video retrieval is carried out, the retrieval result display starts from a frame of the time that is later than that at which the input telop characters are actually displayed so that the desired telop characters of the user cannot be seen in the retrieval result display (see FIG. 70B).

Thus it is desirable to provide a video retrieval and display device which can suppress generation of useless index files that results when the telop character recognition processing is carried out at constant time interval, and improve the delay of the telop character display time that is to be registered in the video storage medium such as VTR.

To this end, this seventh embodiment provides a video retrieval and display device in which the whether the telop characters are displayed or not is judged with respect to each frame of the input video signals and the character region extraction and character recognition processing is carried out with respect to those frames in which the telop characters are displayed. In this way, it is possible to suppress generation of index files without telop character information (see FIG. 66A).

Also, at a time of generating the index file that contains the telop character recognition result and an ID information of the telop character display time, the ID information of the timing at which the recognition processing target frame is entered into the device is used, instead of the ID information of the timing at which the telop character recognition processing is finished as in the conventional device. In this way, when the video retrieval is carried out, it becomes possible to realize the retrieval result display starting from the frame in which the telop characters are actually displayed (see FIG. 66B).

Figure 64:
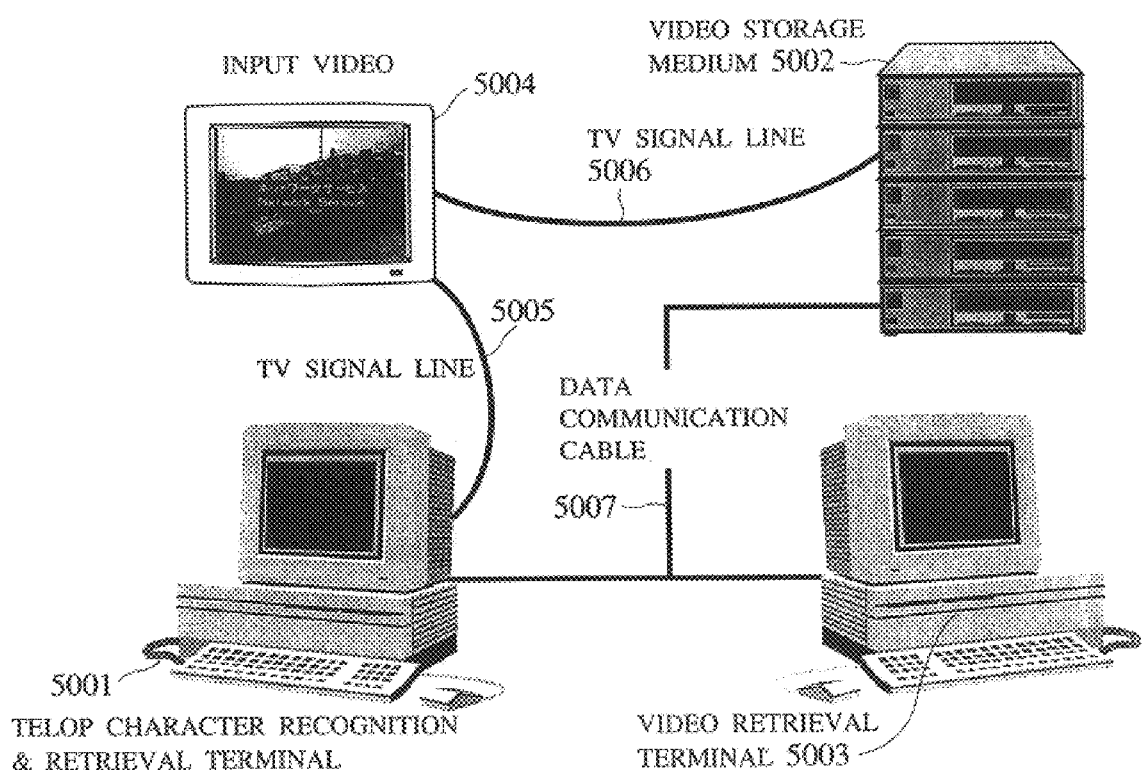
FIG. 64 is a block diagram showing a schematic configuration of a video retrieval and display device according to the seventh embodiment of the present invention.

More specifically, FIG. 64 shows an exemplary configuration of a video retrieval and display device in this seventh embodiment, which comprises a video input terminal 5004 such as TV tuner or video player, a telop character recognition and retrieval terminal 5001 such as PC or workstation, a video storage medium 5002 such as hard disk or VTR, and a video retrieval terminal 5003 such as PC or workstation.

The video input terminal 5004 and the telop character recognition and retrieval terminal 5001 are connected through a TV signal line 5005, while the video input terminal 5004 and the video storage medium 5002 are connected through a TV signal line 5006, and the telop character recognition and retrieval terminal 5001, the video storage medium 5002 and the video retrieval terminal 5003 are connected through a data communication cable 5007.

Figure 65:
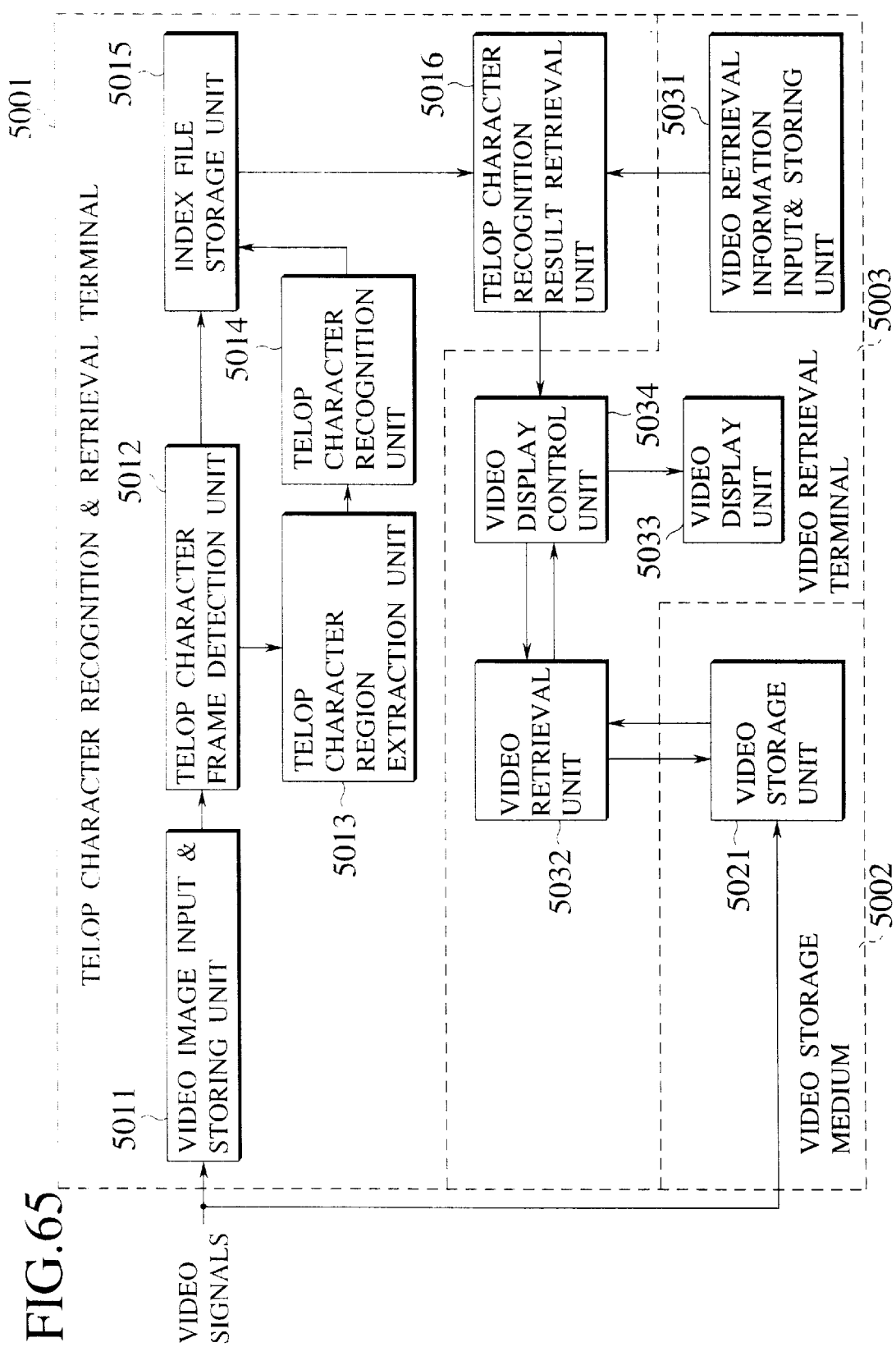
FIG. 65 is a block diagram showing an exemplary detailed configuration of the device of FIG. 64.
Figure 66A:
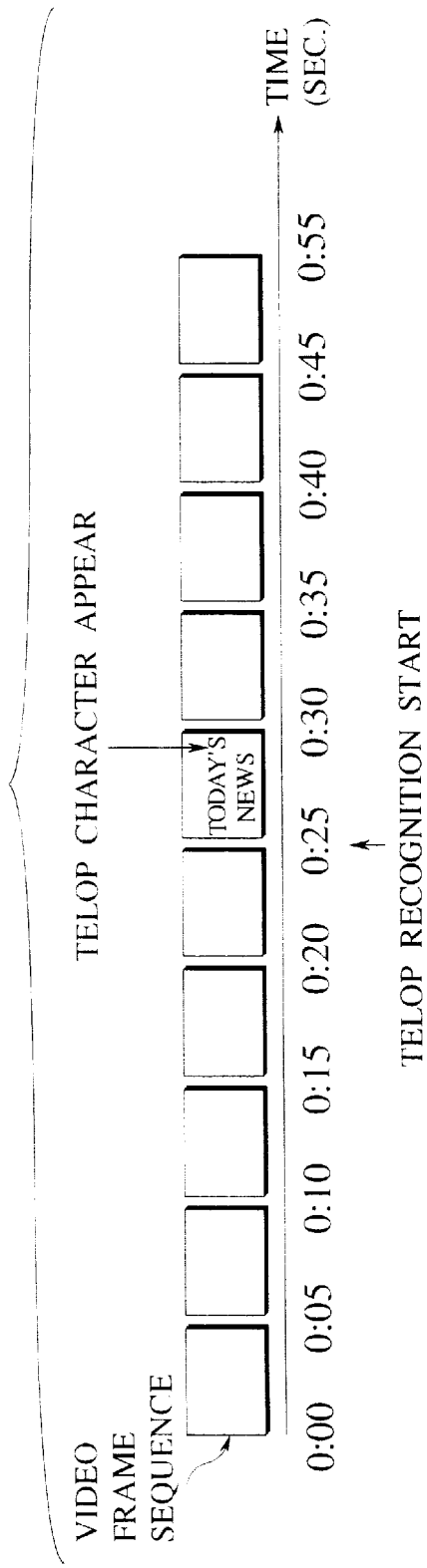
FIGS. 66A and 66B are diagrams for explaining effects of the operation by the device of FIG. 64.
Figure 66B:
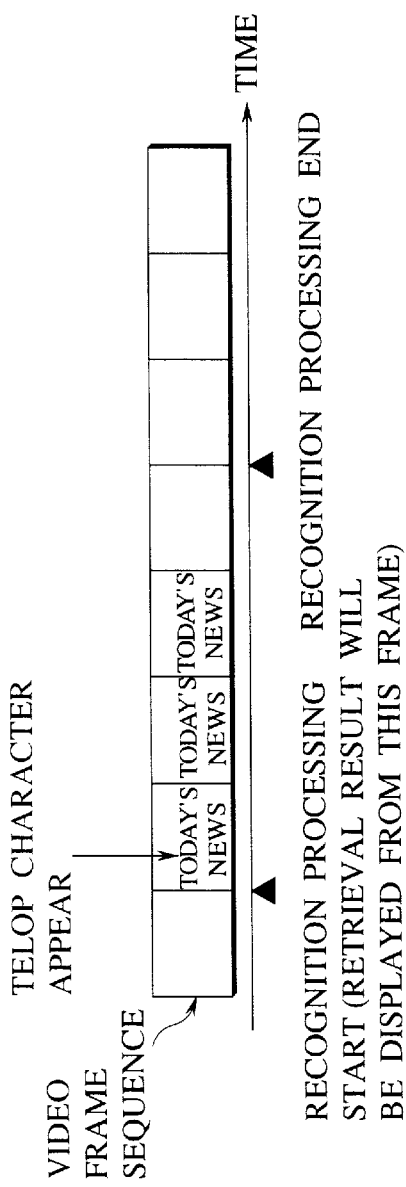

As shown in FIG. 65. the telop character recognition and retrieval terminal 5001 further comprises a video image input and storing unit 5011 for inputting and storing the video signals from the video input terminal 5004 in units of frames, an index file storage unit 5015 for storing index files, a telop character frame detection unit 5012 for receiving the video signals from the video image input and storing unit 5011 in units of frames, judging whether the telop characters are displayed in each input frame, and storing the telop character displaying frame and the ID information of the timing at which the telop character displaying frame was inputted at the video image input and storing unit 5011 as an index file into the index file storage unit 5015, a telop character region extraction unit 5013 for receiving the telop character displaying frame from the telop character frame detection unit 5012 and extracting a telop character region, a telop character recognition unit 5-14 for recognizing the telop characters in the extracted telop character region using the dictionary data, converting the recognized telop characters into character codes, and storing the obtained character codes into an index file in the index file storage unit 5015, and a telop character recognition result retrieval unit 5016 for retrieving the character codes in the index file storage unit 5015 according to a retrieval key given in terms of the character codes.

The video storage medium 5002 constitutes the video database in which the input video signals are stored along with the ID information in a video storage unit 5021.

The video retrieval terminal 5003 further comprises a video retrieval information input and storing unit 5031 for inputting and storing the retrieval key given in terms of the character codes for a desired video of the user using Web browser or the like, a video retrieval unit 5032 for retrieving the video which has the ID information in the index file obtained by the telop character recognition and retrieval terminal 5001 from the video storage unit 5021, a video display unit 5033 for displaying the video, and a video display control unit 5034 for giving the ID information in the index file to the video retrieval unit 5032 and displaying the video obtained by the video retrieval unit 5032 on the video display unit 5033.

Next, the operation of this video retrieval and display device of this seventh embodiment will be described.

First, the video data are entered into the video storage medium 5002 and the telop character recognition and retrieval terminal 5001. At the video storage medium 5002, the video and the ID information (such as time information) of the timing at which the video was inputted are stored in the video storage unit 5021. At the telop character recognition and retrieval terminal 5001, the processing for the telop character displaying frame detection, the telop character region extraction, and the telop character recognition is carried out, and the telop character recognition result (character codes) and the ID information of the timing at which the telop character displaying frame was inputted are stored as the index file into the index file storage unit 5015. Then, the user specifies the desired video from an interface (such as WWW browser) in terms of character codes through the video retrieval information input and storing unit 5031 of the video retrieval terminal 5003. The entered character codes are searched in the index files stored in the index file storage unit 5015 of the telop character recognition and retrieval terminal 5001, and the video having the corresponding ID information is retrieved from the video storage unit 5021 and displayed at the video display unit 5033 (such as a computer display) of the video retrieval terminal 5003.

Figure 67:
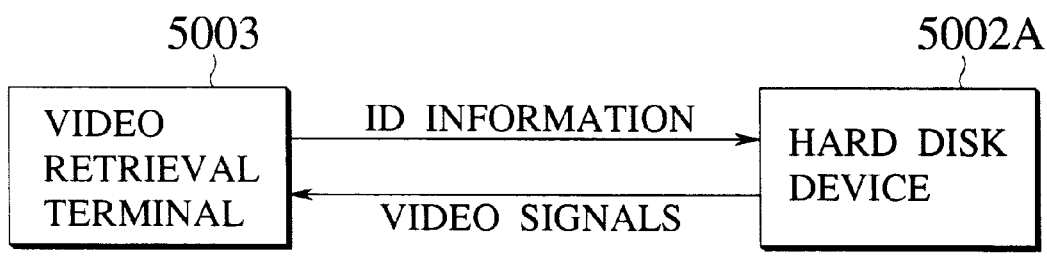
FIG. 67 is a diagram showing an exemplary case of using a hard disk device as a video storage medium in the device of FIG. 64.

FIG. 67 shows an exemplary case of using the hard disk device 5002A as the video storage medium 5002, where the video signals are digitized and stored into the hard disk device 5002A along with the ID information (such as time information) of the timing at which the video was inputted. At a time of video retrieval, the ID information of the retrieval result is received from the video retrieval terminal 5003, and the corresponding video is displayed on the video display unit 5033 of the video retrieval terminal 5003.

Figure 68:
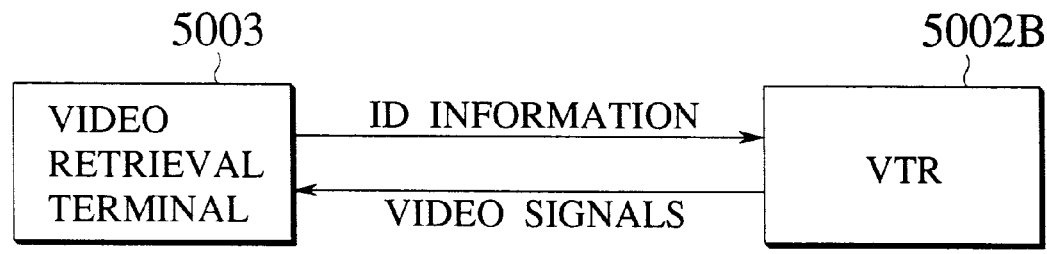
FIG. 68 is a diagram showing an exemplary case of using a video tape recorder as a video storage medium in the device of FIG. 64.

FIG. 68 shows an exemplary case of using the video tape recorder (VTR) 5002B as the video storage medium 5002, where the video signals are stored along with the ID information (such as information on a counter which is set to "0" at a top position of the tape) in the VTR 5002B. At a time of video retrieval, the ID information of the retrieval result is received from the video retrieval terminal 5003, the skipping to the corresponding video portion is made and the corresponding video portion is displayed on the video display unit 5033 of the video retrieval terminal 5003.

Figure 69:
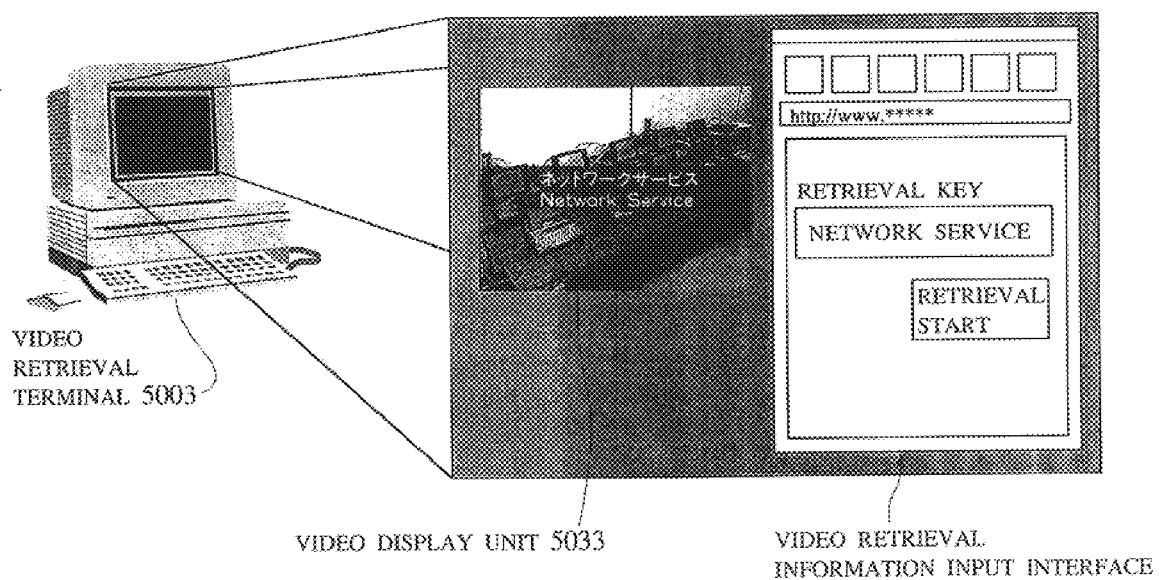
FIG. 69 is an illustration of an exemplary user interface used in the device of FIG. 64.

FIG. 69 shows an exemplary user interface at the video retrieval terminal 5003, where the retrieval result video will be displayed when the retrieval key is entered in terms of character codes (such as "network service" as shown in FIG. 69) and the retrieval start button is pressed.

As described, according to this seventh embodiment, in a system for retrieving and displaying video according to the recognition result of the telop characters in the video, it is possible to suppress generation of useless video index files without telop character information, and set the accurate time at which the telop characters are displayed in the video index file to be stored in the video storage device.

Referring now to FIG. 71 to FIG. 76, the eighth embodiment of the present invention will be described in detail.

There is a commercially available video tape recorder device which has functions for recording the tape ID in a sub-track of the tape at a time of recording, recording signals indicating the recording start and the recording end on the tape, recording an information for setting correspondence between information regarding the recording start and end times and the signals on the tape in a memory within the recording device, recording an information indicating whether the playback has been made or not also in the memory, displaying a list of information on the recording start and end times and whether it is already playbacked or not on a screen at a time of playback, and carrying out the skipping to an item specified by the user on the list screen and playbacking the specified item.

However, in this conventional video tape recorder device, the information in the list is limited to such information as the recording start and end times and whether it is already playbacked or not, and there are many cases where it is impossible to judge what the recorded video really is from such information alone.

Thus it is desirable to provide a video recording and playback device in which the recorded video information is given a higher ability of being viewed at a glance such that the re-utilization (viewing, retrieval, rearranging, and editing) of the video becomes easier.

To this end, this eighth embodiment provides a video recording and playback device, in which a vacant space for recording content information is secured, and an occurrence of a display of the character information is detected after the recording is started. Then, a marking signal indicating the occurrence of the display of the character information and its ID is recorded in the recording medium upon detection, and the detected character information is recognized and the recognition result is recorded in the vacant region. Then, the marking signals are detected in the fast forward mode, and a list screen is generated by reading the recorded contents of the vacant region and displayed. Then, the marking signal having ID corresponding to the item selected by the user on the displayed list screen is detected in the fast forward mode, and the skipping to the timing at which the character information is displayed followed by the normal speed playback is carried out.

In this video recording and playback device, after the recording starts, the occurrence of the display of the character information such as that of telop or card is detected, and the marking signal indicating the character information display and its ID are recorded at a timing of the display of the character information. The detected telop characters are converted into codes by the character recognition processing and recorded (either in the recording medium (tape, DVD, hard disk) or in a dedicated memory such as a memory provided in a VTR device). At this point, the marking signal and the text information are set in correspondence by assigning the same ID as the marking signal. At a time of playback, the recorded marking signals and text information are searched in the fast forward mode, and a list screen of these information is displayed. By making a selection of an item on that list screen, the skipping to the desired video followed by the normal speed playback of the desired video is carried out.

Alternatively, this eighth embodiment provides a video recording and playback device in which a keyword is entered and a recording time is set up while the occurrence of a display of the character information is detected and the detected character information is recognized. Then, when the recognition result coincide with the keyword, the marking signal is recorded in the recording medium and the recording is carried over the recording time. Then, the marking signals are detected in the fast forward mode, and the character display frames are displayed in a form suitable for browsing. Then, the marking signal corresponding to a frame selected by the user from the displayed character display frames is detected, and the skipping to the timing at which the character information is displayed followed by the normal speed playback is carried out.

In this video recording and playback device, the marking signal indicating the character information display and its ID is recorded at a timing of the display of the character information which coincides with the entered keyword. Thereafter, the operation is similar to the previous case.

Note that the video recording and playback device of this eighth embodiment can be used as a VTR device, DVD device, or PC having the video playback function.

Figure 71A:
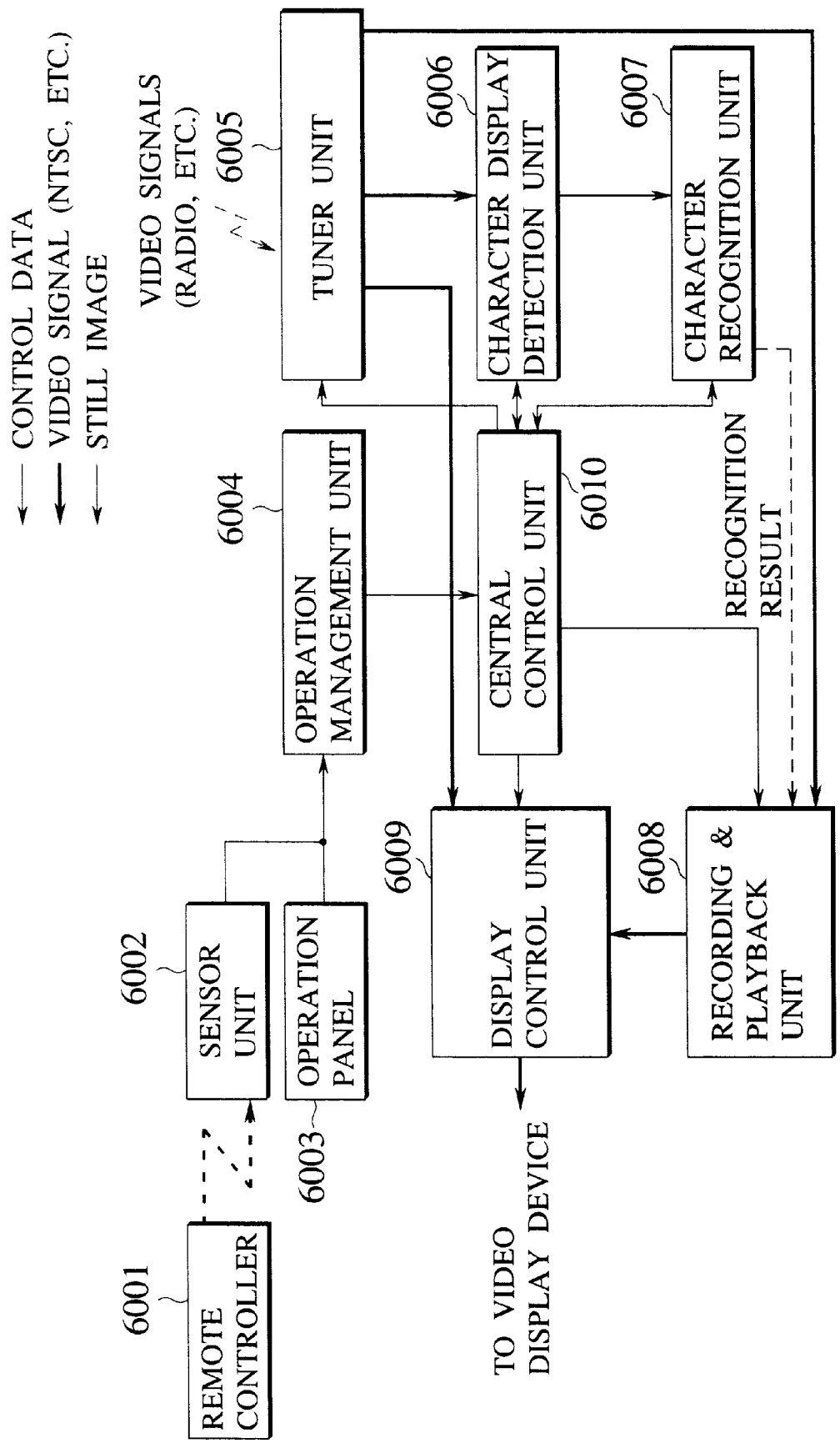
FIG. 71A is a block diagram showing one exemplary configuration of a video recording and playback device according to the eighth embodiment of the present invention.

More specifically, FIG. 71A shows an exemplary configuration of the video recording and playback device in this eighth embodiment, which comprises a remote controller 6001, a sensor unit 6002, an operation panel 6003, an operation management unit 6004, a tuner unit 6005, a character display detection unit 6006, a character recognition unit 6007, a recording and playback unit 6008, a display control unit 6009, and a central control unit 6010.

Here, the character display detection unit 6006 automatically detects telop or card displayed in the video during the recording. The central control unit 6010 carries out various controls such as the control of operations the recording and playback unit 6008 (recording, playback, fast forward, etc.) according to a command from the operation management unit 6004, the control of the recording and the detection of the marking signal indicating the character appearance, the control of the display of the character displaying frame, etc.

This configuration of FIG. 71A corresponds to the case of recording the recognition result obtained by the character recognition unit 6007 in a video recording device for which nonlinear accesses are possible such as DVD and hard disk device which is provided in the recording and playback unit 6008. In this case, the recognition result information is stored in a vacant region of the recording medium (or a non-volatile memory within the device), and collectively read out and browsed at a time of playback.

Figure 71B:
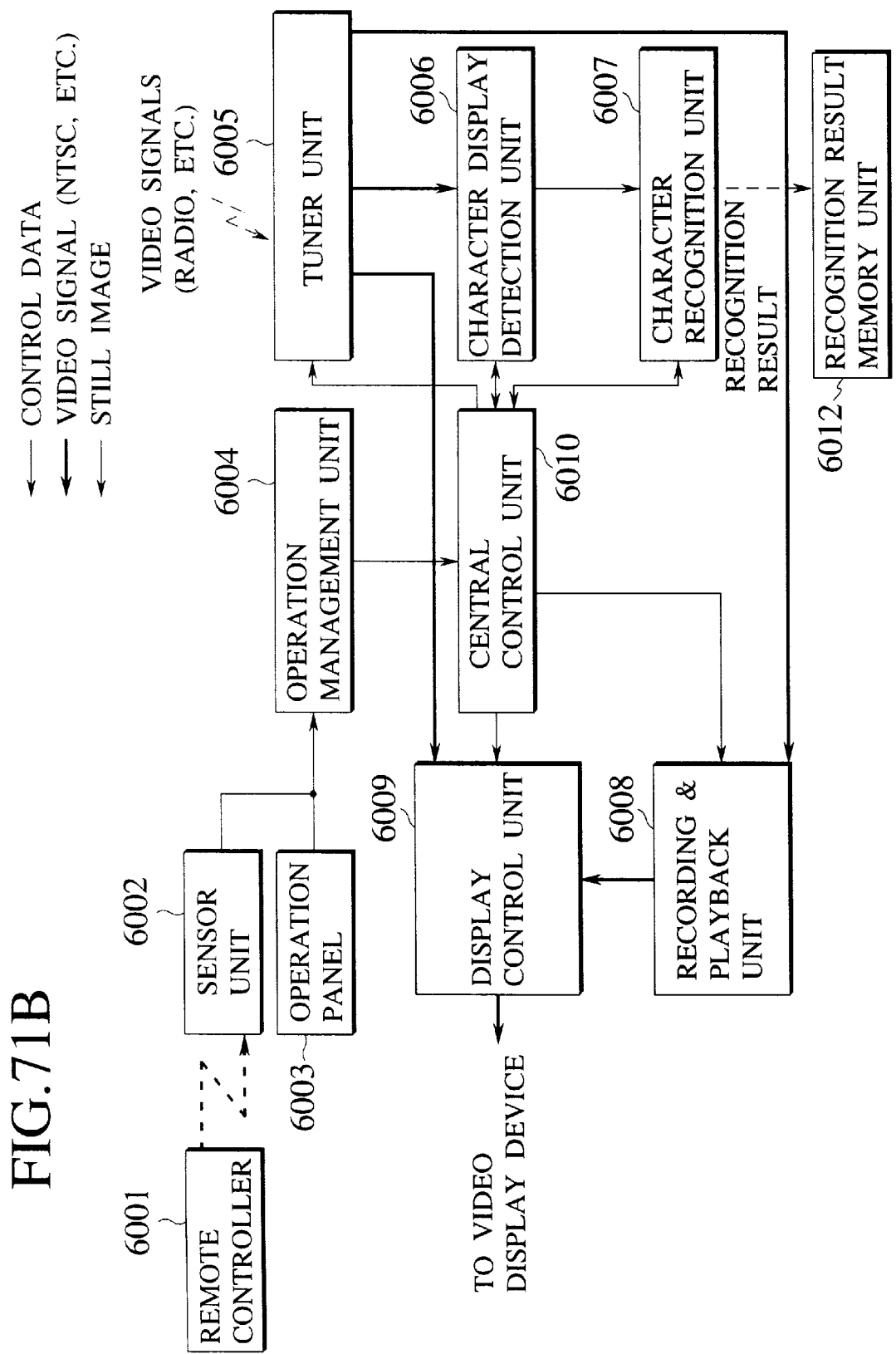
FIG. 71B is a block diagram showing one modified configuration of a video recording and playback device according to the eighth embodiment of the present invention.

Alternatively, it is also possible to use a configuration shown in FIG. 71B which corresponds to the case of recording the recognition result obtained by the character recognition unit 6007 in a video recording device for which nonlinear accesses are not possible such as VTR.

In this case the recognition result information is stored in a non-volatile memory in a recognition result memory unit 6012, and collectively read out and browsed at a time of playback.

The operation of this video recording and playback device of FIG. 71A or FIG. 71B will now be described with references to FIG. 72 and FIG. 73.

Figure 72:
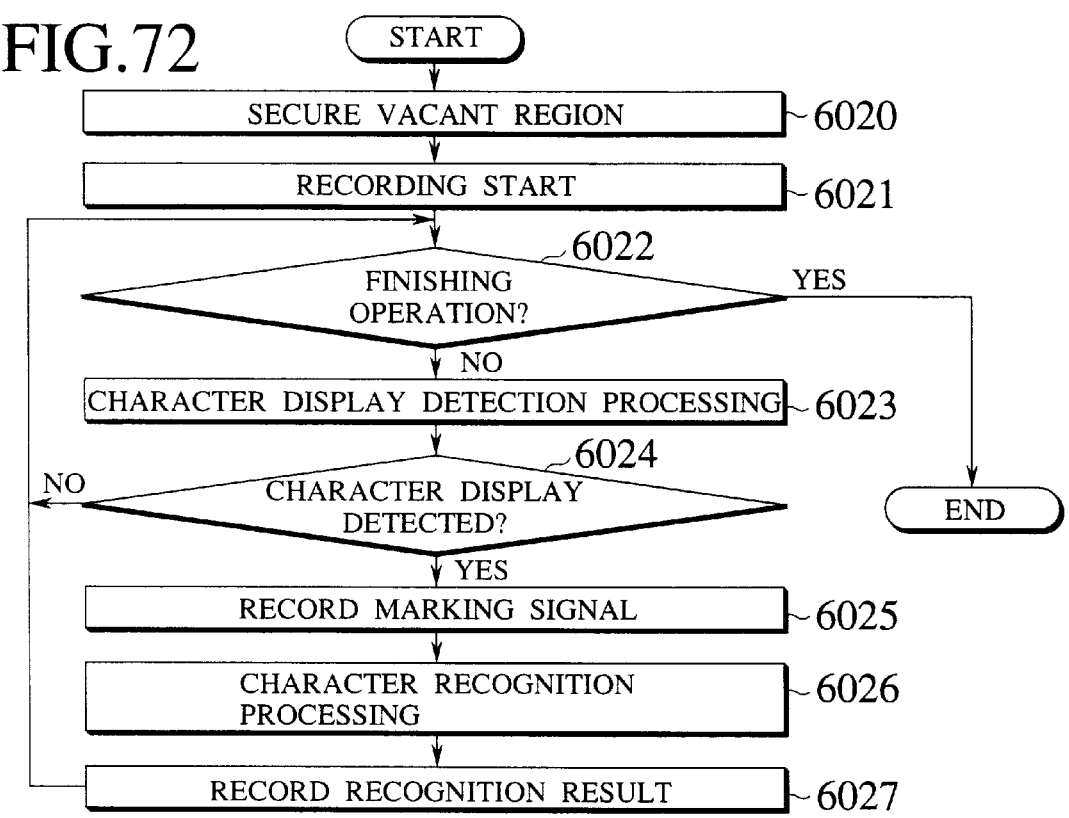
FIG. 72 is a flow chart for the processing procedure at a time of recording by the device of FIG. 71.

Namely, FIG. 72 shows the processing procedure at a time of recording, which proceeds as follows.

First, a vacant region for recording content information is secured (step 6020), and the recording is started (step 6021). Then, unless the finishing operation is made (step 6022 NO), the detection of the display of the character information such as telop or card is carried out (step 6023). When the character display is detected (step 6024 YES), the marking signal indicating the occurrence of the display of the character information is recorded in the recording medium (step 6025). Then, the detected characters are recognized (step 6026) and the recognition result is recorded in the vacant region (step 6027). This operation will be repeated until the recording finishing operation is made (step 6022 YES).

Figure 73:
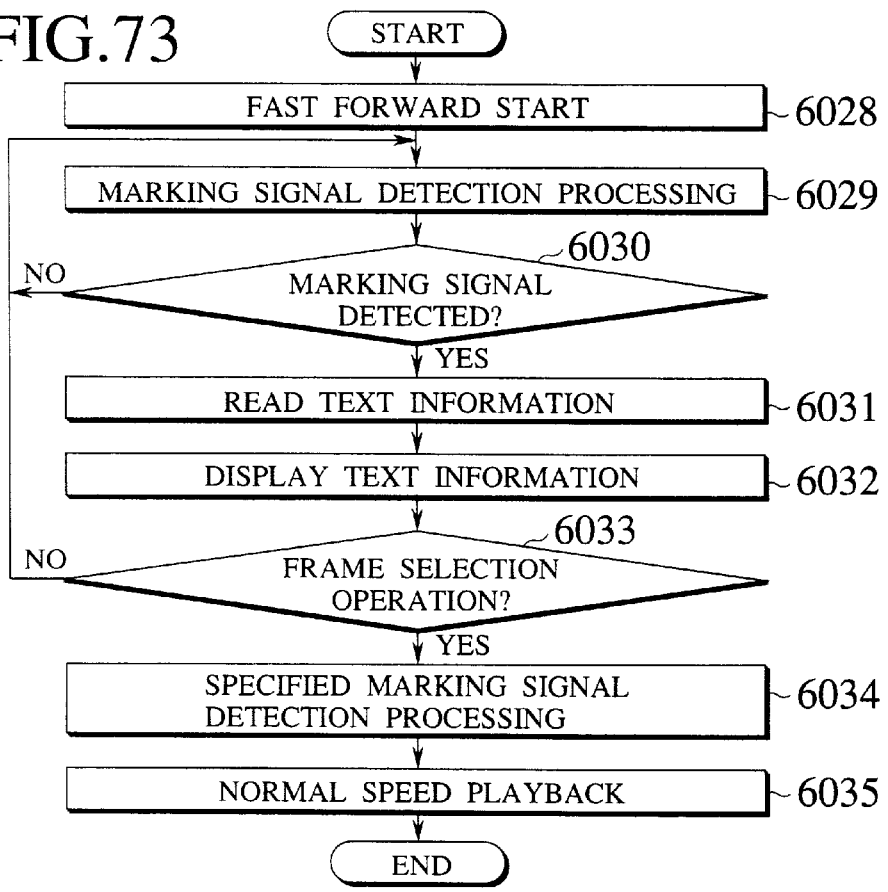
FIG. 73 is a flow chart for the processing procedure at a time of playback by the device of FIG. 71.

On the other hand, FIG. 73 shows the processing procedure at a time of playback, which proceeds as follows.

First, the fast forward mode is started (step 6028), and the detection of the marking signal is carried out (step 6029). When the marking signal is detected (step 6030 YES)+the text information in the vacant region is read out (step 6031) and sequentially displayed in a form suitable for browsing (step 6032). When the user makes the frame selection operation (step 6033 YES), the marking signal corresponding to the selected frame is detected (step 6034), and the skipping to the detected marking signal followed by the normal speed playback is carried out (step 6035).

Note that the vacant region for recording content information may be provided in the recording medium or a memory in the device (a memory which maintains the record even when the power is turned off and which can be rewritten according the need).

Figure 74A:
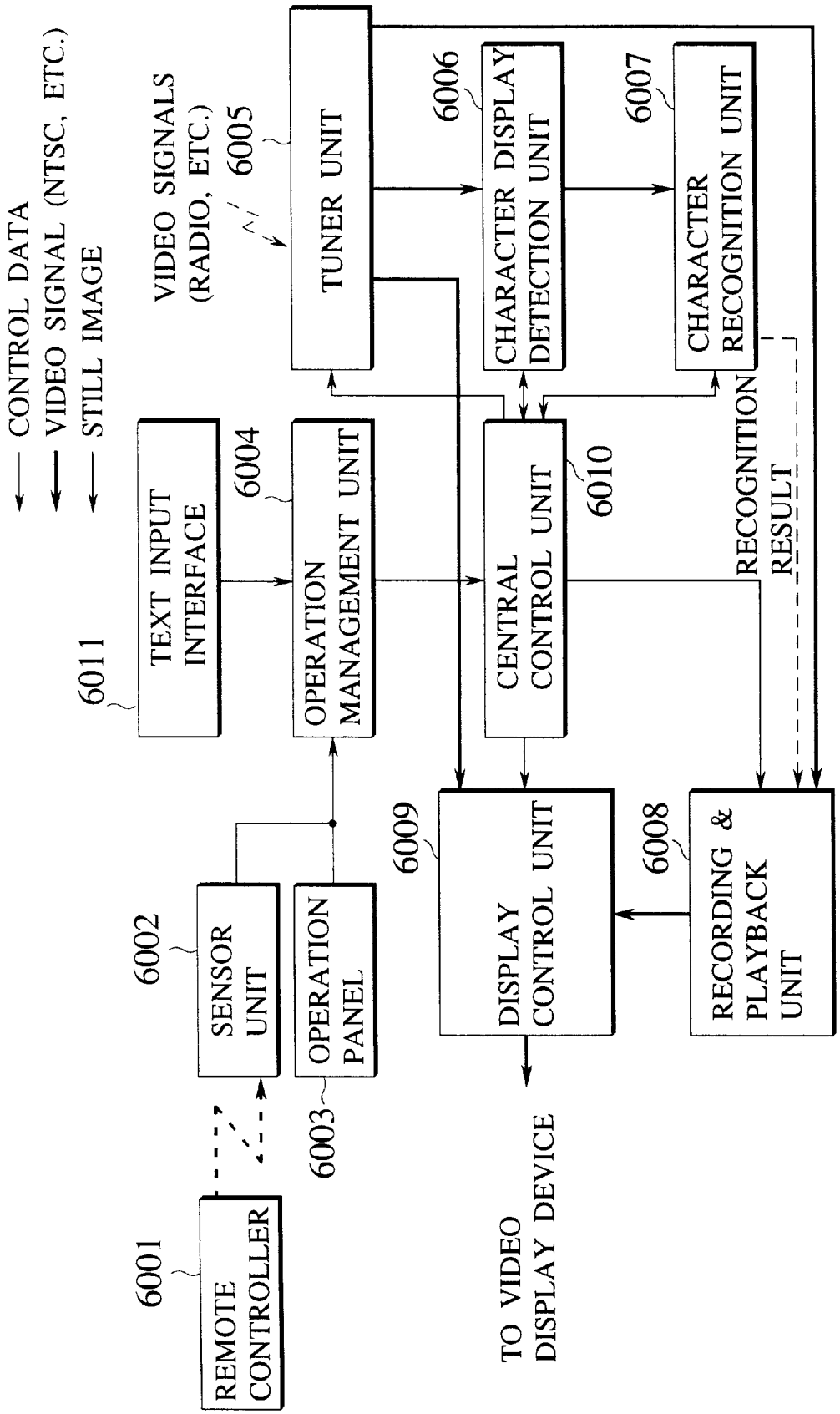
FIG. 74A is a block diagram showing another exemplary configuration of a video recording and playback device according to the eighth embodiment of the present invention.
Figure 74B:
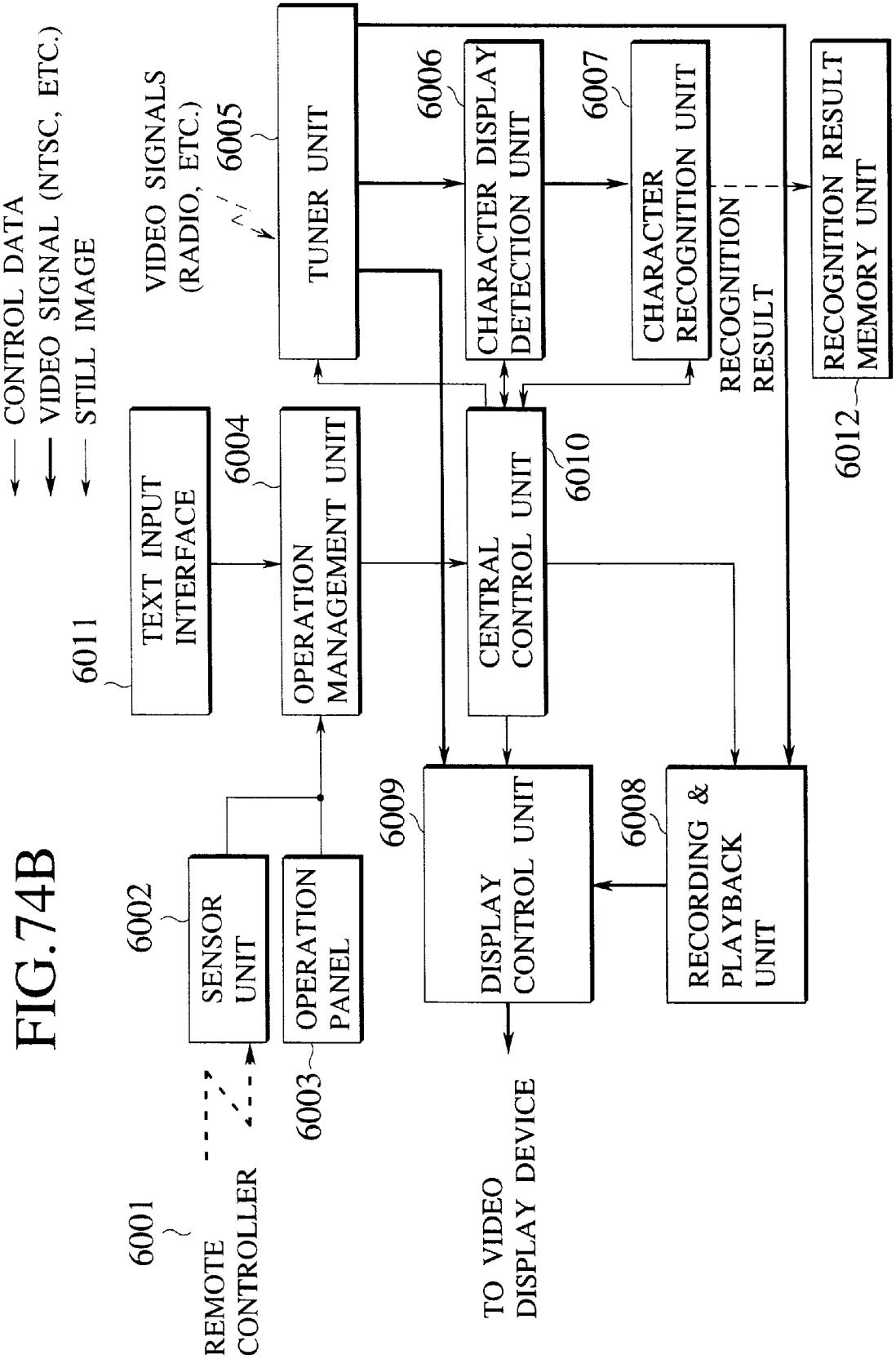
FIG. 74B is a block diagram showing another modified configuration of a video recording and playback device according to the eighth embodiment of the present invention.

FIG. 74A and FIG. 74B show another exemplary configurations of the video recording and playback device in this eighth embodiment, which differ from those of FIG. 71A and FIG. 71B in that an text input interface 6011 for entering text is additional provided.

The operation of this video recording and playback device of FIG. 74A or FIG. 74B will now be described with references to FIG. 75 and FIG. 76.

Figure 75:
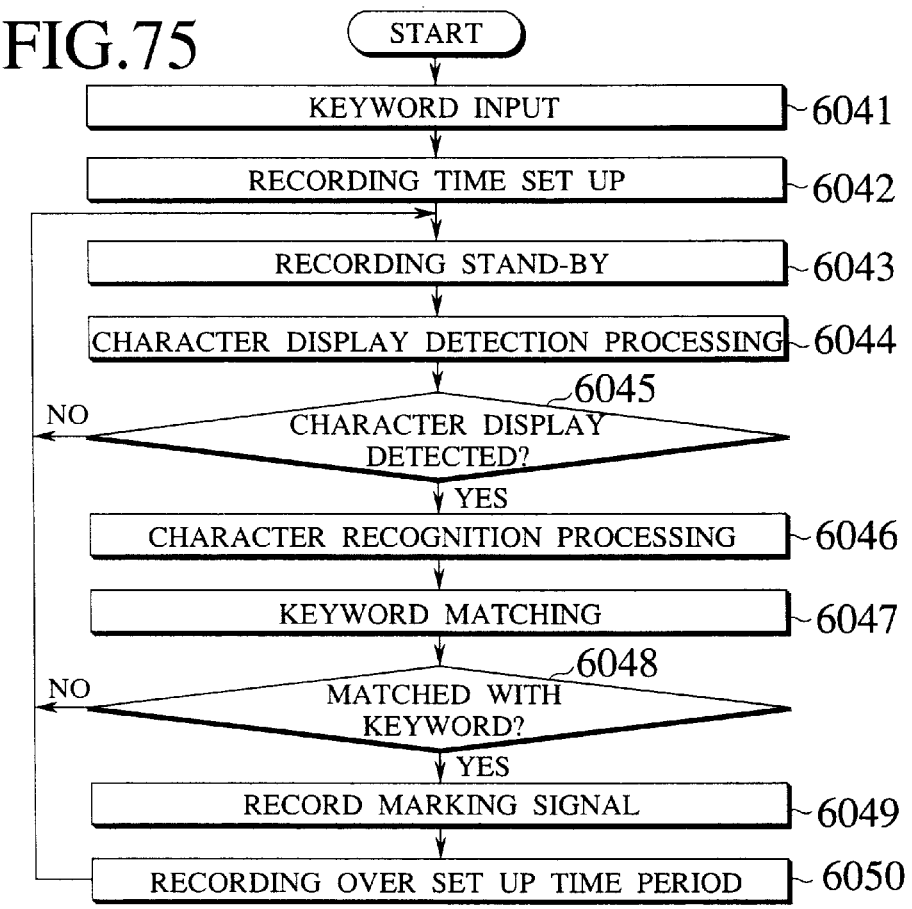
FIG. 75 is a flow chart for the processing procedure at a time of recording by the device of FIG. 75.

Namely, FIG. 75 shows the processing procedure at a time of recording, which proceeds as follows.

First, a keyword is entered from the text input interface 6011 (step 6041), and the recording time is set up (step (6042). Then, it is put in the recording stand-by state (step 6043), while the detection of the display of the character information such as telop or card is carried out (step 6044). When the character display is detected (step 6045 YES), the detected characters are recognized (step 6046) and the recognition result is matched with the entered keyword (step 6047). When the recognition result matches with the keyword 8step 6048 YES), the marking signal indicating the occurrence of the display of the character information is recorded in the recording medium (step 6049), and the recording is carried out for the recording time set up at the step 6042 (step 6050). This operation will be repeated as many times as necessary.

Figure 76:
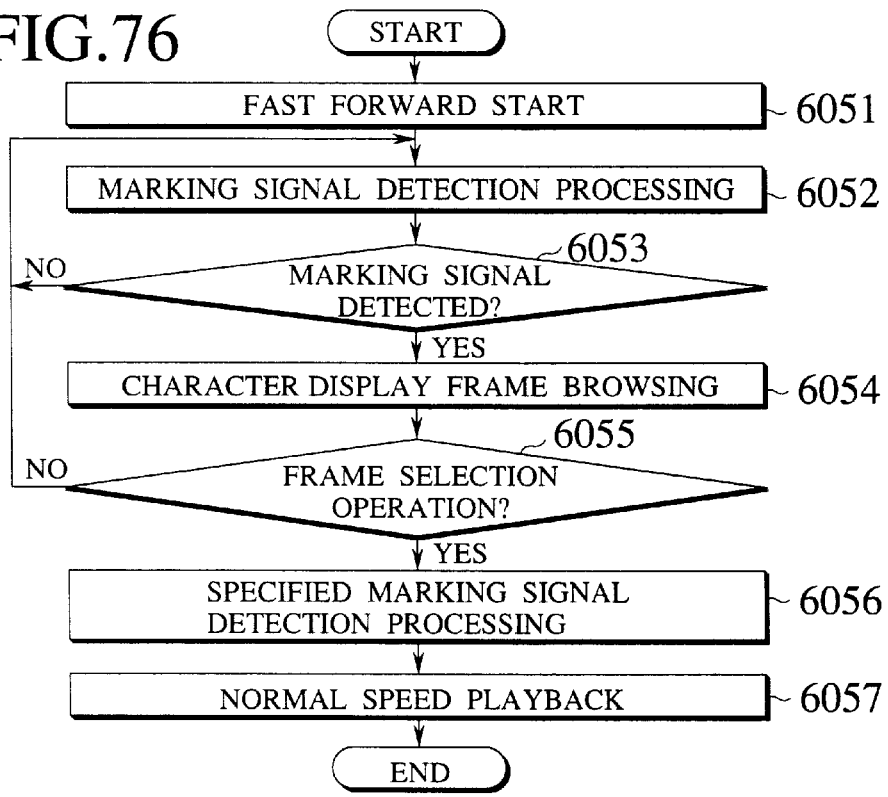
FIG. 76 is a flow chart for the processing procedure at a time of playback by the device of FIG. 76.

On the other hand, FIG. 76 shows the processing procedure at a time of playback, which proceeds as follows.

First, the fast forward mode is started (step 6051), and the detection of the marking signal is carried out (step 6052). When the marking signal is detected (step 6053 YES), the detected character display frames are displayed in a form suitable for browsing (step 6054). When the user makes the frame selection operation (step 6055 YES), the marking signal corresponding to the selected frame is detected (step 6056), and the skipping to the detected marking signal followed by the normal speed playback is carried out (step 6057).

Note that the character display detection unit 7006 directly receives the video signals from the tuner unit 7005, so that the character detection processing can be carried out even in the recording stand-by state.

Also, at a time of recording the marking signal by detecting the display of the character information during the recording, when the processing for detecting the occurrence of the display of the character information takes a certain amount of time (such as one or two seconds or more), the recording point of the marking signal will be displaced from the timing of the character displaying frame detection by that certain amount of time. In anticipation of such cases, it is also possible to start the playback from a timing which is earlier than the timing at which the marking signal is detected by that certain amount of time.

Also, at a time of starting the recording from a timing at which the character information that matches with the specified keyword, when the processing for detecting the occurrence of the display of the character information takes a certain amount of time (such as one or two seconds or more), the recording start point will be displaced from the timing of the character displaying frame detection by that certain amount of time so that the top portion of the corresponding video data for that certain amount of time will not be recorded. In order to cope with this it is possible to provide a buffer (circuit) for delaying the video signals for that certain amount of time and carry out the recording of the delayed video signals.

Note that the processing procedures of FIGS. 72, 73, 75 and 76 can be recorded as the video recording and playback programs on the recording medium such as CD-ROM, floppy disk, semiconductor memory, etc., and then read out and executed by the computer which controls the recording and playback unit 6008.

As described, according to this eighth embodiment, the character information such as that of telop or card that appears in the video is presented in a form of a list screen, and the skipping to the item selected on the list screen is carried out so that the recorded video information is given a higher ability of being viewed at a glance such that the re-utilization of the video information becomes easier and more efficient.

Referring now to FIG. 77 to FIG. 85, the ninth embodiment of the present invention will be described in detail.

This ninth embodiment also aims to provide a video recording and playback device in which the recorded video information is given a higher ability of being viewed at a glance such that the re-utilization (viewing, retrieval, rearranging, and editing) of the video becomes easier.

To this end, this ninth embodiment provides a video recording and playback device in which key frames which are frame images effective in providing an overview of the video content are detected from the video during the recording, and marking signals indicating the appearances of these key frames are recorded in the recording medium at timings at which the key frames are detected. Then, in the fast forward mode, the fast forward operation is interrupted whenever the marking signal is detected and the normal speed playback is carried out temporarily, and the key frames are sequentially displayed as still images in a form suitable for browsing during the normal playback. When the user selects a specific key frame from a plurality of key frames displayed in a form suitable for browsing, the timing at which the marking signal corresponding to the selected key frame is recorded is detected, and the skipping to the top of that key frame followed by the normal speed playback is carried out.

In this video recording and playback device, the key frames are displayed as still images in a form suitable for browsing, so that the recorded video information can be given a higher ability of being viewed at a glance.

This ninth embodiment also provides a video recording and playback device in which a content information recording region is secured in a recording medium or a memory at the start of the recording, while key frames which are frame images effective in providing an overview of the video content are detected from the video during the recording, and marking signals indicating the appearances of these key frames are recorded in the recording medium at timings at which the key frames are detected. Then, the key frames are stored in the memory, while a list screen is produced according to the key frames stored in the memory and stored into the content information recording region at the end of the recording. Then, in the fast forward mode, the list screen is displayed upon detecting the content information recording region, and when the user selects a specific key frame from the list screen, the timing at which the marking signal corresponding to the selected key frame is recorded is detected, and the skipping to the top of that key frame followed by the normal speed playback is carried out.

In this video recording and playback device, the content information recording region is secured at the start of the recording. Then, the key frame images detected during the recording are stored in the memory, and the list screen is produced at the end of the recording and stored in the content information recording region. Then, at a time of playback, the top list screen is displayed, so that the recorded video information can be given a higher ability of being viewed at a glance.

This ninth embodiment also provides a video recording and playback device in which key frames which are frame images effective in providing an overview of the video content are detected from the video during the recording, and marking signals indicating the appearances of these key frames are recorded in the recording medium at timings at which the key frames are detected. Also, when the telop frame is detected, the telop image is extracted. Then, in the fast forward mode, the fast forward operation is interrupted whenever the marking signal is detected and the normal speed playback is carried out temporarily, and the key frames are sequentially displayed as still images in a form suitable for browsing during the normal playback. When the user selects a specific key frame from a plurality of key frames displayed in a form suitable for browsing, the timing at which the marking signal corresponding to the selected key frame is recorded is detected, and the skipping to the top of that key frame followed by the normal speed playback is carried out.

At a time of displaying the key frames in a form suitable for browsing, it is expected that the size of each key frame becomes rather small. In the case of telop frame, the information conveyed by the telop frame will be largely lost if the characters written in the. telop are too small to read. Consequently, in this video recording and playback device, a telop region in which the telop characters are shown alone is extracted from the telop frame, and displayed such that the telop characters are readable even at a time of browsing.

This ninth embodiment also provides a video recording and playback device in which key frames which are frame images effective in providing an overview of the video content are detected from the video during the recording, according to domains defining video categories that are set up by the user, and marking signals indicating the appearances of these key frames are recorded in the recording medium at timings at which the key frames are detected. Then, in the fast forward mode, the fast forward operation is interrupted whenever the marking signal is detected and the normal speed playback is carried out temporarily, and the key frames are sequentially displayed as still images in a form suitable for browsing during the normal playback. When the user selects a specific key frame from a plurality of key frames displayed in a form suitable for browsing, the timing at which the marking signal corresponding to the selected key frame is recorded is detected, and the skipping to the top of that key frame followed by the normal speed playback is carried out.

This video recording and playback device uses the general purpose key frames (such as telop, shot boundary, CM boundary). For different domains (categories such as music show, news, etc.), the nature of the key frames can be quite different (a start of music in the music show, the telop display in the news, for example). For this reason, in this video recording and playback device, the key frame detection is carried out according to a model set up for each domain. The user can specify the domain. Also, the domain can be set up automatically using the electronic program table or the like.

Note that the video recording and playback device of this ninth embodiment can be used as a VTR device, DVD device, or PC having the video playback function.

Figure 77:
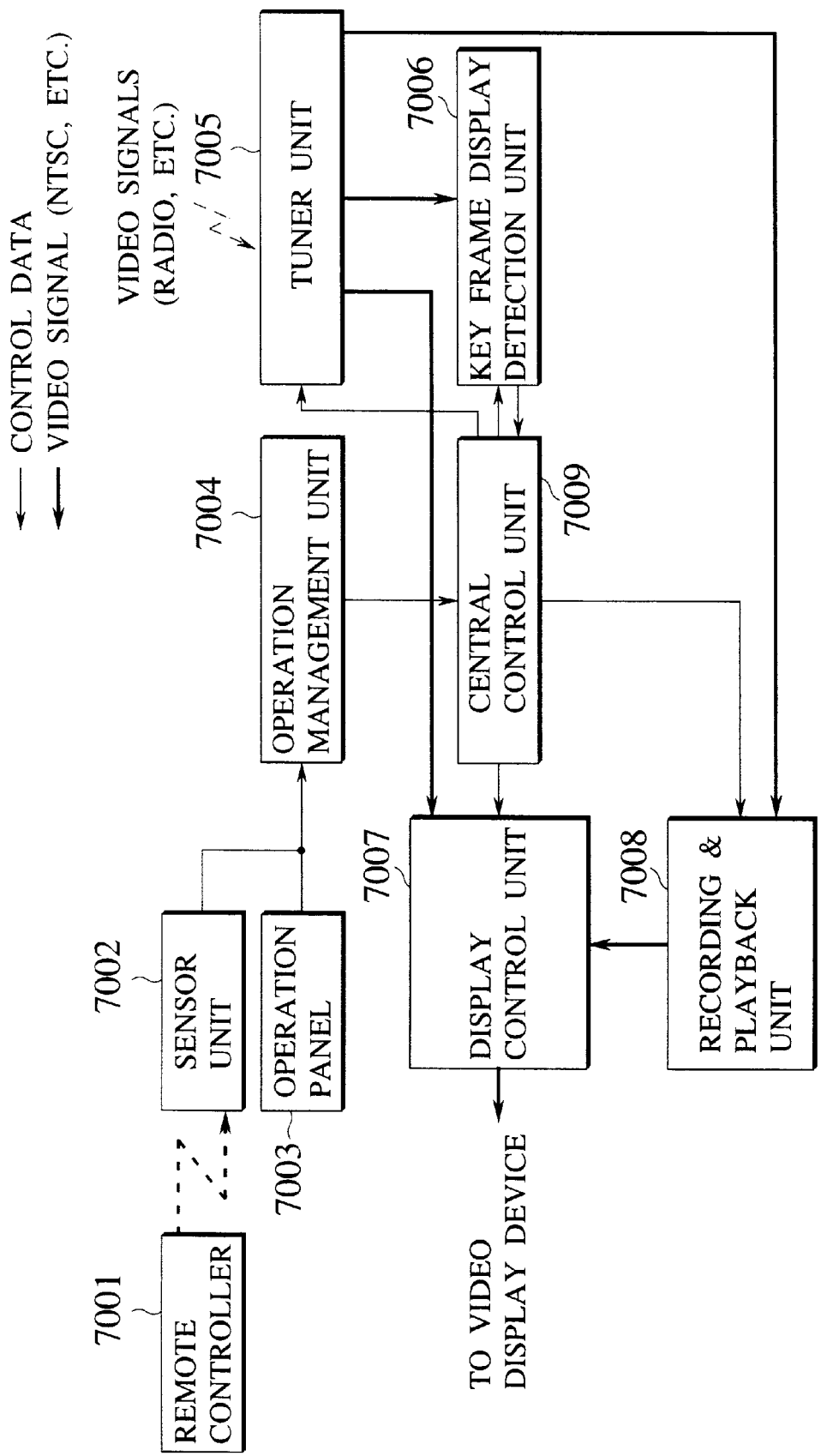
FIG. 77 is a block diagram showing an exemplary configuration of a video recording and playback device according to the ninth embodiment of the present invention.

More specifically, FIG. 77 shows an exemplary configuration of the video recording and playback device in this ninth embodiment, which comprises a remote controller 7001, a sensor unit 7002, an operation panel 7003, an operation management unit 7004, a tuner unit 7005, a key frame detection unit 7006, a display control unit 7007, a recording and playback unit 7008, and a central control unit 7009.

Here, the key frame detection unit 7006 automatically detects frame images (key frames) which are effective in providing an overview of the video content, such as the telop appearing frame, the program start frame after CM, etc., in the video during the recording. The central control unit 7009 carries out various controls such as the control of operations the recording and playback unit 7008 (recording, playback, fast forward, etc.) according to a command from the operation management unit 7004, the control of the recording of the marking signal indicating the appearance of the key frame, etc.

The operation of this video recording and playback device of FIG. 77 will now be described with references to FIG. 78 to FIG. 85, for four cases.

Figure 78:
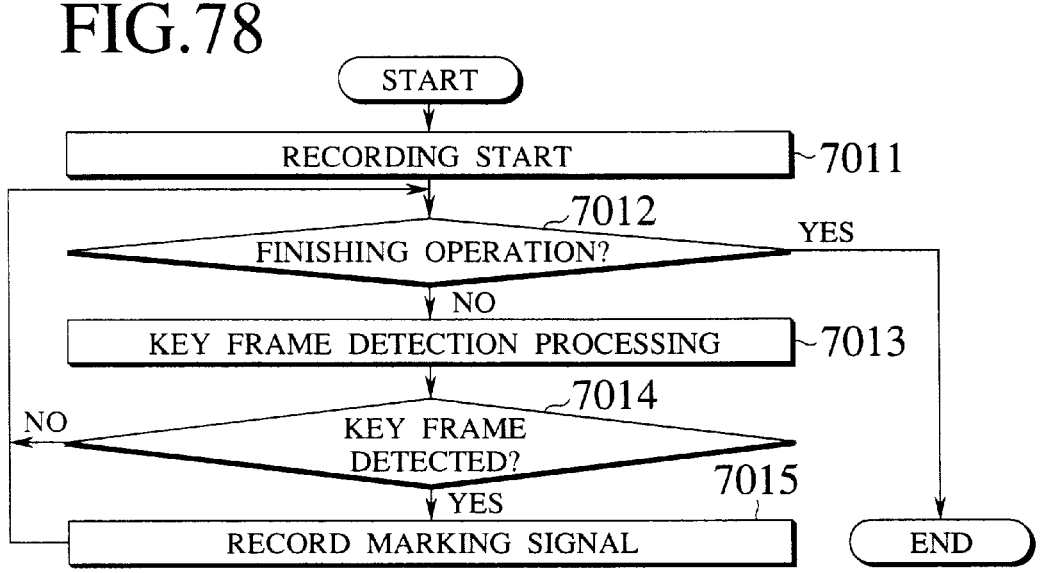
FIG. 78 is a flow chart for the processing procedure at a time of recording by the device of FIG. 77 in the first case.
Figure 79:
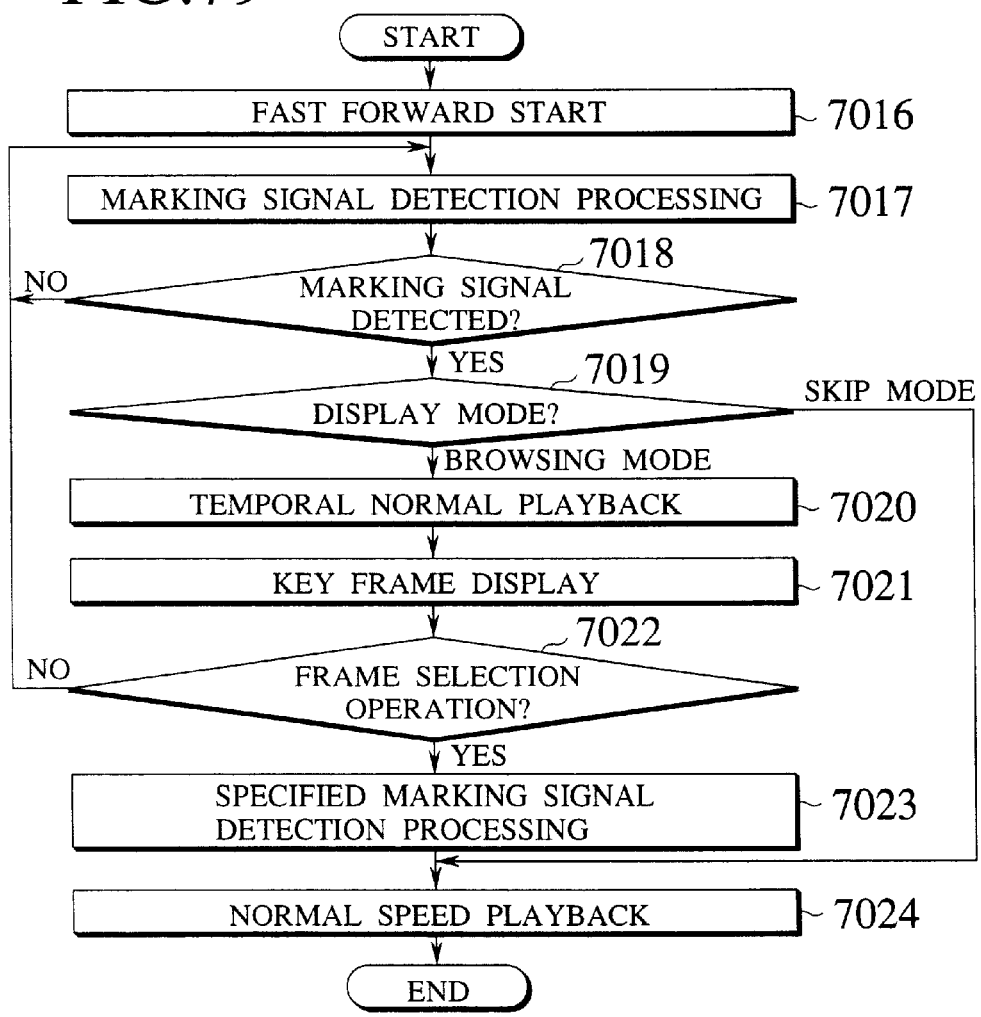
FIG. 79 is a flow chart, for the processing procedure at a time of playback by the device of FIG. 77 in the first case.

(1) First Case (FIG. 78, FIG. 79)

FIG. 78 shows the processing procedure at a time of recording in the first case, which proceeds as follows.

First, the recording is started (step 7011), and unless the finishing operation is made (step 7012 NO), the detection of the key frame is carried out (step 7013). When the key frame is detected (step 7014 YES), the marking signal indicating the appearance of the key frame is recorded in the recording medium at a timing at which the key frame Is detected (step 7015). This operation will be repeated until the recording finishing operation is made (step 7012 YES).

On the other hand, FIG. 79 shows the processing procedure at a time of playback in the first case, which proceeds as follows.

First, the fast forward mode is started (step 7016), and the detection of the marking signal is carried out (step 7017). When the marking signal is detected (step 7018 YES), the display mode is judged (step 7019). In the case of the skip mode, the normal speed playback is carried out (step 7024), whereas in the case of the browsing mode, the normal speed playback is carried out temporarily (step 7020) and the key frames are sequentially displayed in a form suitable for browsing (step 7021). When the user makes the key frame selection operation (step 7022 YES), the marking signal corresponding to the selected key frame is detected (step 7023), and the skipping to the detected marking signal, that is the top of the selected key frame, followed by the normal speed playback is carried out (step 7024).

Figure 80:
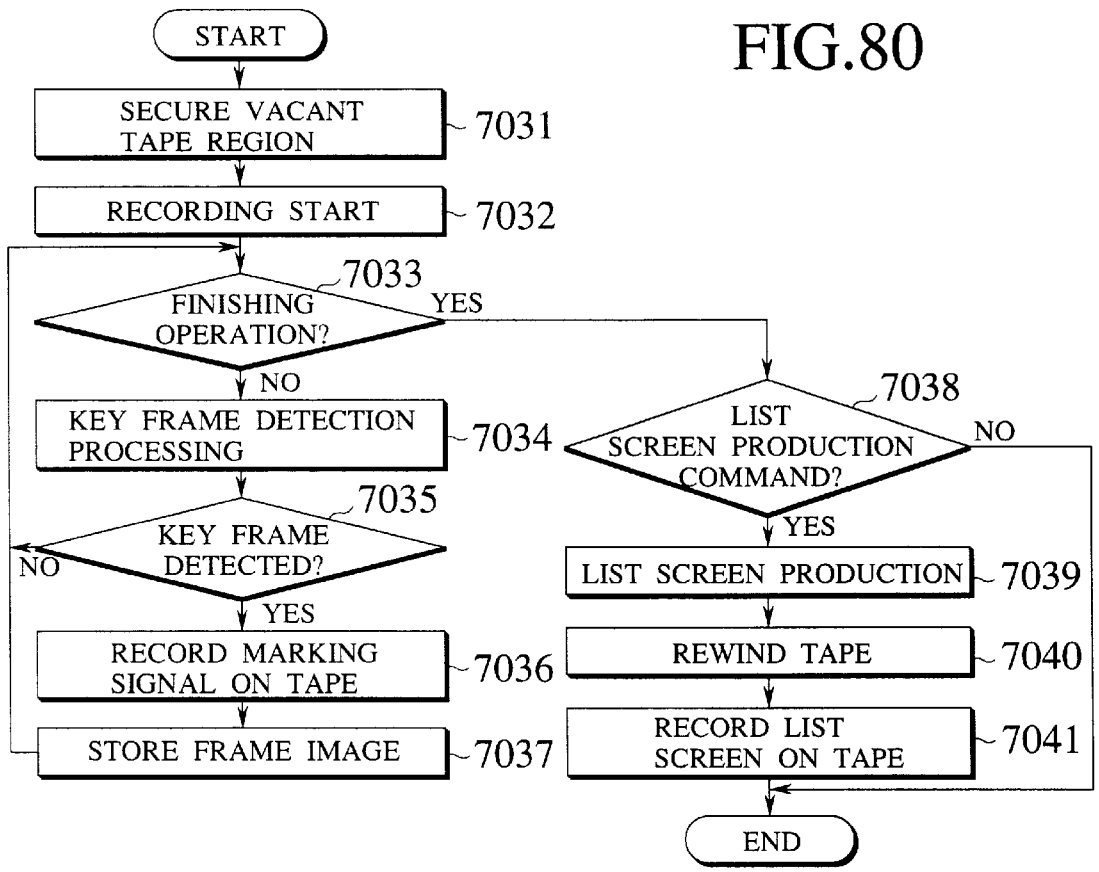
FIG. 80 is a flow chart for the processing procedure at a time of recording by the device of FIG. 77 in the second case.
Figure 81:
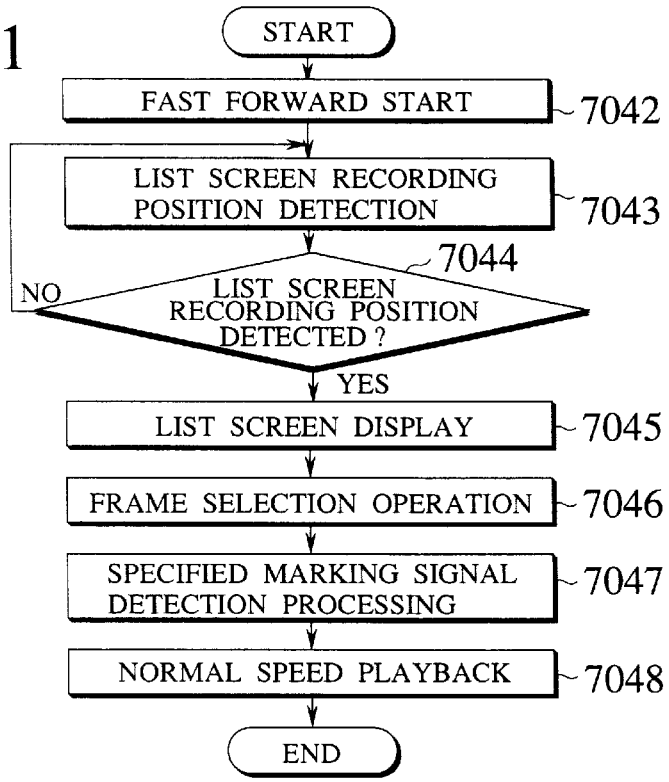
FIG. 81 is a flow chart for the processing procedure at a time of playback by the device of FIG. 77 in the second case.

(2) Second Case (FIG. 80, FIG. 81)

FIG. 80 shows the processing procedure at a time of recording in the second case, which proceeds as follows.

First, a vacant region is secured in the recording medium or the memory as an information recording region (step 7031), and the recording is started (step 7032). Then, unless the finishing operation is made (step 7033 NO), the detection of the key frame is carried out (step 7034). When the key frame is detected (step 7035 YES), the marking signal indicating the appearance of the key frame is recorded in the recording medium at a timing at which the key frame is detected (step 7036) and the key frame is stored in the memory 7037. This operation will be repeated until the recording finishing operation is made (step 7033 YES).

When the recording finishing operation is made (step 7033 YES) and the list screen production command is made (step 7038 YES), the list screen is produced (step 7039), the recording medium is rewound (step 7040), and the list screen is recorded in the vacant region of the recording medium (step 7041).

On the other hand, FIG. 81 shows the processing procedure at a time of playback in the second case, which proceeds as follows.

First, the fast forward mode is started (step 7042), and the detection of the list screen recording position is carried out (step 7043). When the list screen recording position is detected (step 7044 YES), the list screen is displayed (step 7045). When the user makes the key frame selection operation from the list screen (step 7046 YES), the marking signal corresponding to the selected key frame is detected (step 7047), and the skipping to the detected marking signal, that is the top of the selected key frame, followed by the normal speed playback is carried out (step 7048).

Figure 82:
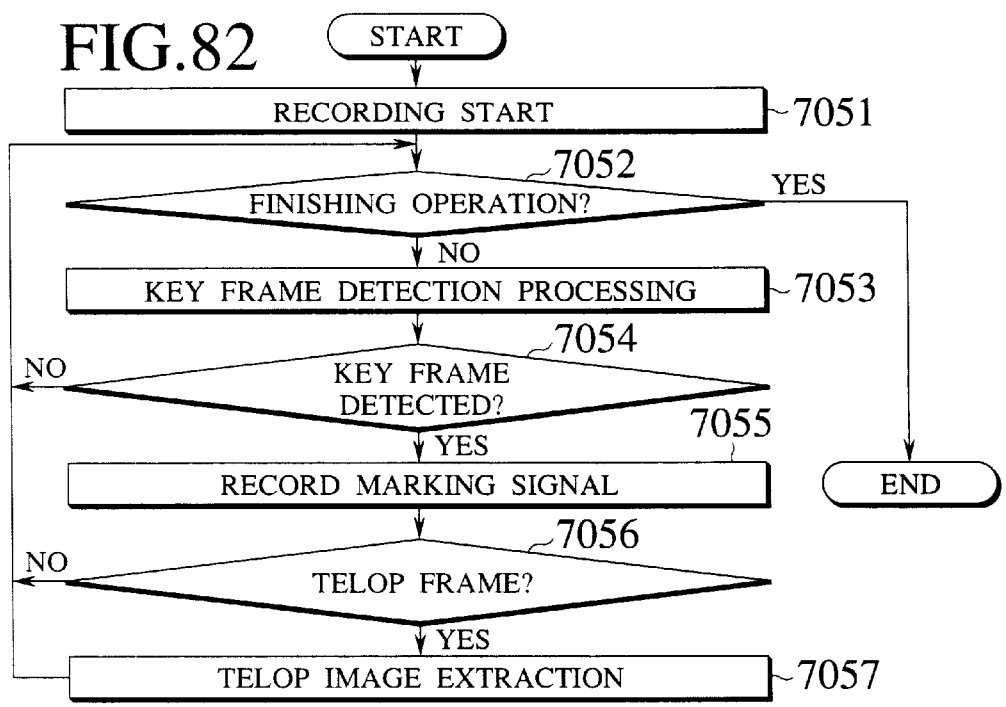
FIG. 82 is a flow chart for the processing procedure at a time of recording by the device of FIG. 77 in the third case.
Figure 83:
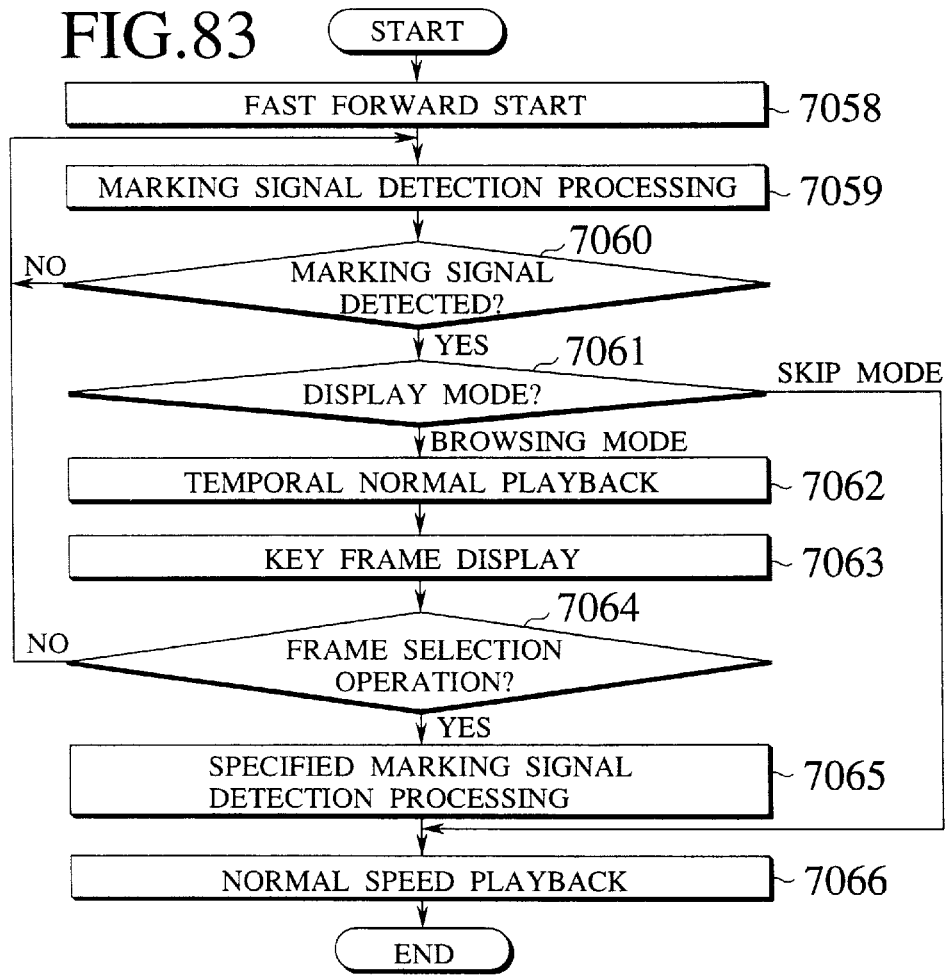
FIG. 83 is a flow chart for the processing procedure at a time of playback by the device of FIG. 77 in the third case.

(3) Third Case (FIG. 82, FIG. 83)

FIG. 82 shows the processing procedure at a time of recording in the third case, which proceeds as follows.

First, the recording is started (step 7051), and unless the finishing operation is made (step 7052 NO), the detection of the key frame is carried out (step 7053). When the key frame is detected (step 7054 YES), the marking signal indicating the appearance of the key frame is recorded in the recording medium at a timing at which the key frame is detected (step 7055). Then, when the telop frame is detected (step 7056), the telop image is extracted 8step 7057). This operation will be repeated until the recording finishing operation is made (step 7052 YES).

On the other hand, FIG. 83 shows the processing procedure at a time of playback in the third case, which proceeds as follows.

First, the fast forward mode is started (step 7058), and the detection of the marking signal is carried out (step. 7059). When the marking signal is detected (step 7060 YES), the display mode is judged (step 7061). In the case of the skip mode, the normal speed playback is carried out (step 7066), whereas in the case of the browsing mode, the normal speed playback is carried out temporarily (step 7062) and the key frames are sequentially displayed in a form suitable for browsing (step 7063). When the user makes the key frame selection operation (step 7064 YES), the marking signal corresponding to the selected key frame is detected (step 7065), and the skipping to the detected marking signal, that is the top of the selected key frame, followed by the normal speed playback is carried out (step 7066).

(4) Fourth Case (FIG. 84, FIG. 85)

FIG. 84 shows the processing procedure at a time of recording in the fourth case, which proceeds as follows.

First, the recording is started (step 7071), and unless the finishing operation is made (step 7072 NO), the user sets up the domain (step 7073). Then, the detection of the key frame is carried out (step 7074). When the key frame is detected (step 7075 YES), the marking signal indicating the appearance of the key frame is recorded in the recording medium at a timing at which the key frame is detected (step 7076). This operation will be repeated until the recording finishing operation is made (step 7072 YES).

On the other hand, FIG. 85 shows the processing procedure at a time of playback in the fourth case, which proceeds as follows.

First, the fast forward mode is started (step 7077), and the detection of the marking signal is carried out (step 7078). When the marking signal is detected (step 7079 YES), the display mode is judged (step 7080). In the case of the skip mode, the normal speed playback is carried out (step 7085), whereas in the case of the browsing mode, the normal speed playback is carried out temporarily (step 7081) and the key frames are sequentially displayed in a form suitable for browsing (step 7082). When the user makes the key frame selection operation (step 7083 YES), the marking signal corresponding to the selected key frame is detected (step 7084), and the skipping to the detected marking signal, that is the top of the selected key frame, followed by the normal speed playback is carried out (step 7085).

Note that the processing procedures of FIGS. 77 to 85 can be recorded as the video recording and playback programs on the recording medium such as CD-ROM, floppy disk, semiconductors memory, etc., and then read out and executed by the computer which controls the recording and playback unit 7008.

Note also that when the processing for detecting the appearance of the key frame takes a certain amount of time (such as one or two seconds or more), the recording point of the marking signal will be displaced from the timing of the key frame detection by that certain amount of time. In anticipation of such cases, it is also possible to start the playback from a timing which is earlier than the timing at which the marking signal is detected by that certain amount of time.

Note also that, in the above, four cases of the operation according to this ninth embodiment have been described for an exemplary of using VTR as the recording and playback device, but it is equally possible to use any other suitable recording and playback device such as DVD, in which case the steps specific to the case of using VTR such as step 7020 of FIG. 79, step 7040 of FIG. 80, step 7062 of FIG. 83 and step 7081 of FIG. 85 may be omitted, as should be apparent to those skilled in the art.

As described, according to this ninth embodiment, the scenes which are effective in providing an overview of the video content such as the telop appearing frame, the program start frame after CM, etc., are presented in a form of a list screen, and the skipping to the desired item selected on the list screen is carried out so that the recorded video information is given a higher ability of being viewed at a glance such that the re-utilization of the video information becomes easier.

Referring now to FIG. 86 to FIG. 91, the tenth embodiment of the present invention will be described in detail.

As an environment which allows the display of the TV broadcast and the WWW browser on the same screen, there are a TV set having Internet browser function and a PC having TV tuner. In either one, TV and WWW browser operate separately, so that the interest aroused while watching TV must be manually entered into the WWW browser by the user, which is quite tedious.

As an alternative scheme, there is a scheme for transmitting HTML. (Hyper Text Markup Language) information by utilizing vacant regions in the TV broadcast signals, and displaying the related Information on the browser, which is already practiced in Japan.

However, this scheme has a problem in that it takes a lot of time and effort to produce HTML contents in accordance with this scheme so that the information that can be provided by this scheme is quite limited.

Thus it is desirable to provide a video related information retrieval device which presupposes the environment capable of utilizing both TV video and WWW browser by displaying them simultaneously, and which is capable of automatically retrieving and displaying the Internet information related to the video content by utilizing the character information such as that of telop or card that is often displayed in the TV broadcast.

To this end, this tenth embodiment provides a video related information retrieval device using a video display device capable of simultaneously displaying TV broadcast and WWW browser information, in which the character information displayed in the received TV video is detected, the characters in the detected character displaying frame are recognized, and the recognized text information is stored. Then, an appropriate retrieval key is generated by using the sequentially stored text information, the text data such newspapers and magazines that are registered in the database, and the additional information that is specified by the viewer in advance for the purpose of retrieval according to the need. Then, the generated retrieval key is inputted into the WWW browser and the Internet information retrieved by using the entered retrieval key is displayed. Here, the character information detection may be made from the telop or the card displayed in the TV video.

Figure 86:
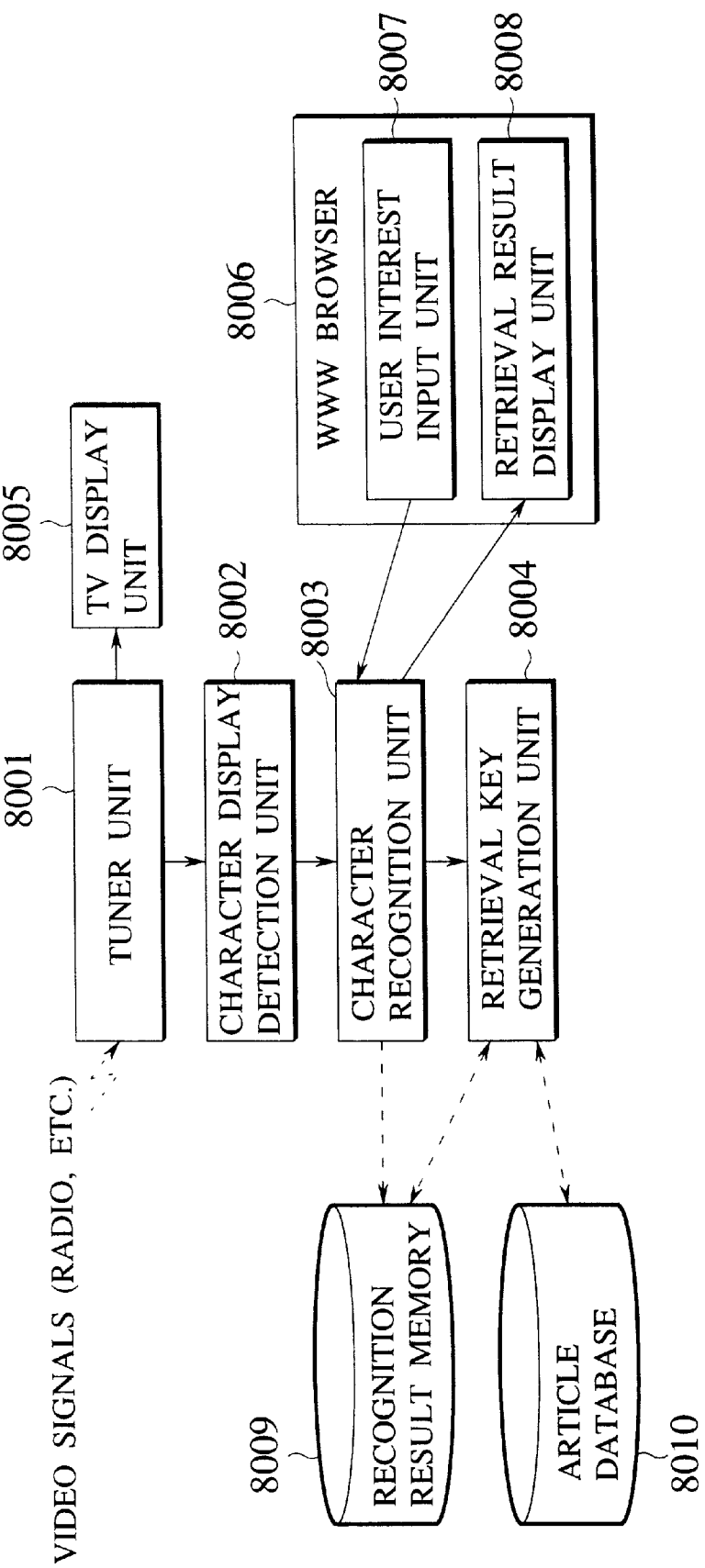
FIG. 86 is a block diagram showing one exemplary configuration of a video related information retrieval device according to the tenth embodiment of the present invention.

More specifically, FIG. 86 shows an exemplary configuration of the video related information retrieval device in this tenth embodiment, which is in a form of a TV set capable of utilizing TV video and WWW browser simultaneously, such as Internet TV, PC having TV tuner, or data broadcast receiver.

In this device of FIG. 86, the radio video signals are received at a tuner unit 8001, and displayed on a TV display unit 8005. Also, the display of the character information is detected by a character display detection unit 8002 by utilizing the character broadcasting of the TV video, the character image is extracted and recognized at a character recognition unit 8003, and the recognized text information is stored in a recognition result memory 8009.

Here, it is possible to use the recognition result alone as the retrieval key. However, an enormous amount of retrieval results would be obtained if a single keyword is used so that it is not very practical. For this reason, there is a need to generate a keyword that can reflect the content of the video more closely. To this end, it is possible to realize the retrieval that can reflect the video content more closely by taking theological product (AND) of a plurality of recognition results. Furthermore, it is also possible to further modify this provision and realize the more vivid retrieval by generating the keyword as follows.

Namely, the retrieval key generation unit 8004 calculates the matching level of each stored text information with respect to the article database 8010 (of newspaper and magazine articles, encyclopedia, etc.), such that it is possible to ascertain the context behind a group of displayed text information. Then, using keywords that appear in the article which has a high matching level with the subject specified in advance among them, it is possible to obtain the retrieval result which is related to the provided information and which covers a wide range.

At this point, it is possible to obtain the retrieval result according to the user's interest by taking the logical product (AND) of the above described retrieval key with a subject data indicating the user's interest (such as gastronomical information, information related to books, etc.) that is set up in advance at a user interest input unit 8007 of the WWW browser 8006.

By generating the retrieval key at the retrieval key generation unit 8004 using the article database 8010, there is also an advantage that the incompleteness of the character recognition can be complemented.

The generated retrieval key is inputted into the WWW browser 8006, in which the retrieval is carried out automatically by the WWW retrieval engine and the retrieval result is displayed at a retrieval result display unit 8008, in the case of the automatic mode.

The above described processing is carried out automatically by taking the display of the character information as a trigger. In addition, a checking and correcting mode in which the user can check and correct the retrieval key is also provided. The user can view the related information on the WWW browser 8007 according to the need of the interest. It is of course also possible to carry out the retrieval according to the manual input of the user.

Figure 87:
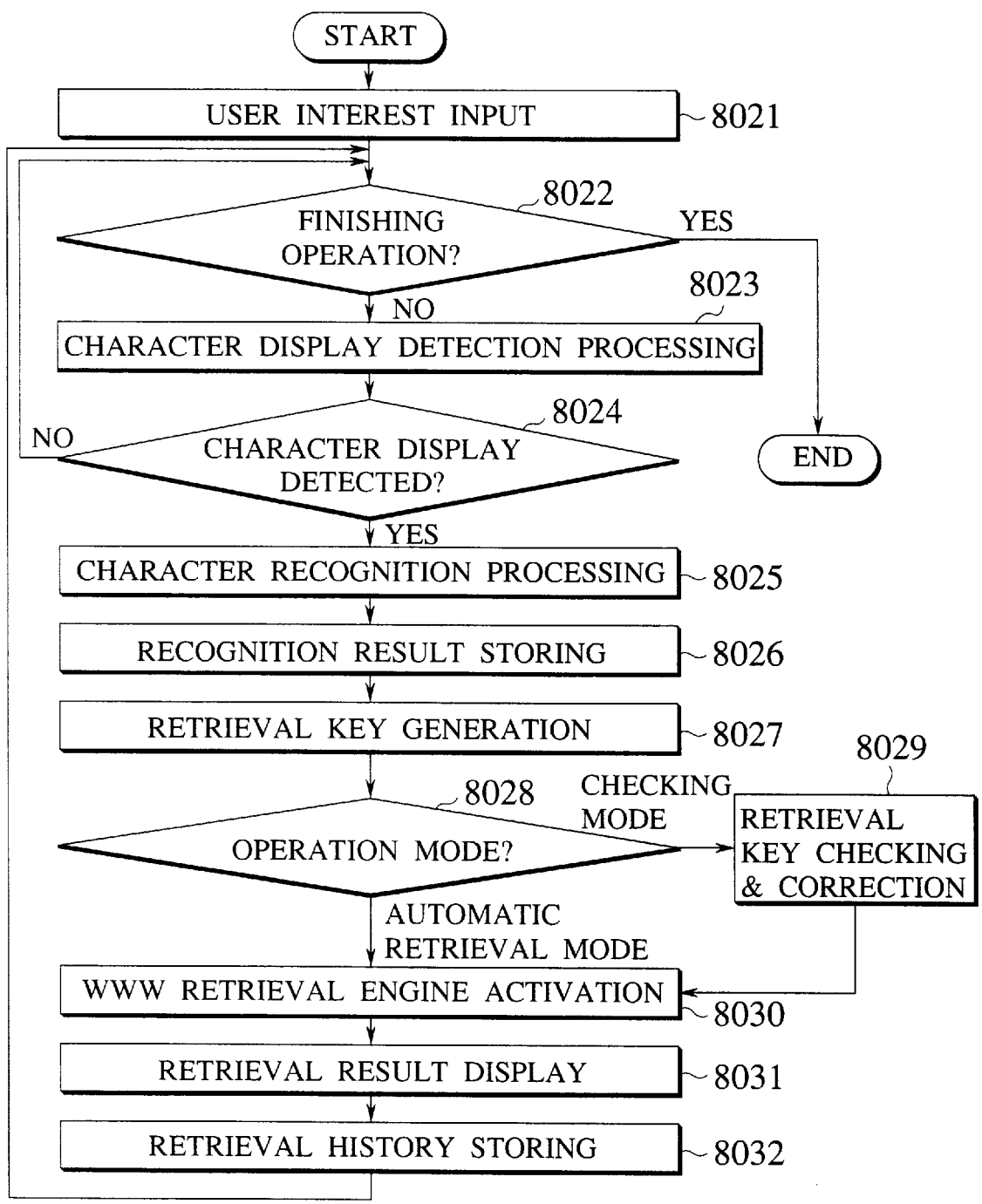
FIG. 87 is a flow chart for the processing procedure in the device of FIG. 86.

FIG. 87 shows the processing procedure of this video related information retrieval device of FIG. 86, which proceeds as follows.

In advance, the subject requested by the user or interested by the user is entered into the device (step 8021). Then, unless the finishing operation is made (step 8022 NO), the detection of the character display in TV video is carried out (step 8023). When the character display is detected (step 8024 YES), the character recognition is carried out (step 8025), and the recognition result is stored (step 8026).

Next, the retrieval key is generated by referring to the similar articles or the like in the database on a basis of the input user subject (step 8027), and in the case of the checking mode (step 8028 checking mode), the retrieval key is checked and corrected (step 8029). This step 8029 will be skipped in the case of the automatic retrieval mode (step 8028 automatic retrieval mode).

Then, the retrieval key is entered into the WWW browser and the WWW retrieval engine is activated (step 8030). After that, the WWW retrieval result is displayed 8step 8031), and stored (step 8032). This processing is repeated until the finishing operation is made (step 8022 YES).

Figure 88:
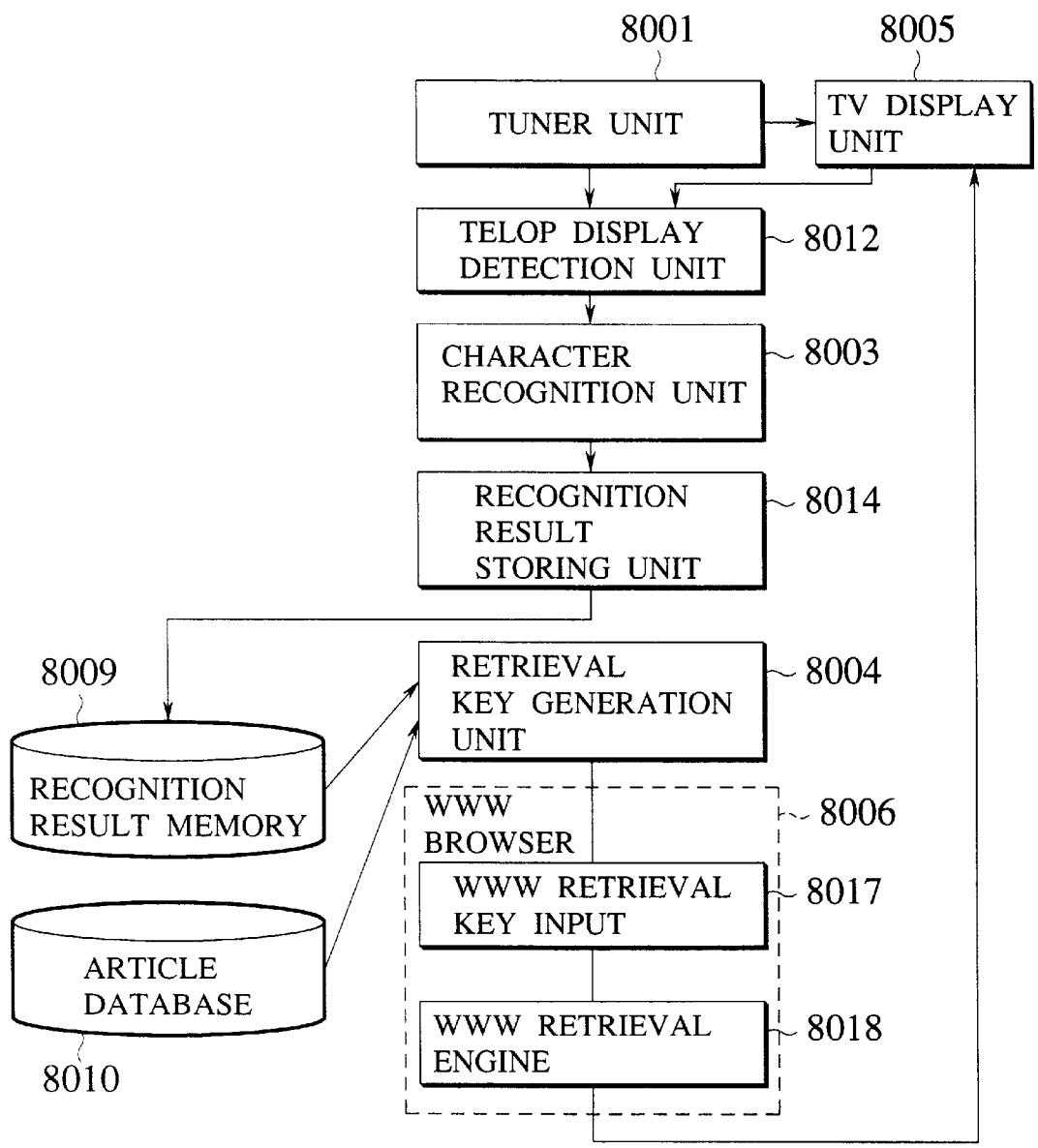
FIG. 88 is a block diagram showing another exemplary configuration of a video related information retrieval device according to the tenth embodiment of the present invention.

FIG. 88 shows another exemplary configuration of the video related information retrieval device of this tenth embodiment, which differs from that of FIG. 86 in that the character display detection unit 8002 is replaced by a telop display detection unit 8012 for detecting the character information in the telop displayed by the TV broadcast. FIG. 88 also shows a recognition result storing unit 8014 for storing the recognition result into the recognition result memory 8009, and a retrieval key input unit 8017 and a WWW retrieval engine 8018 which are provided in the WWW browser 8006.

Figure 89:
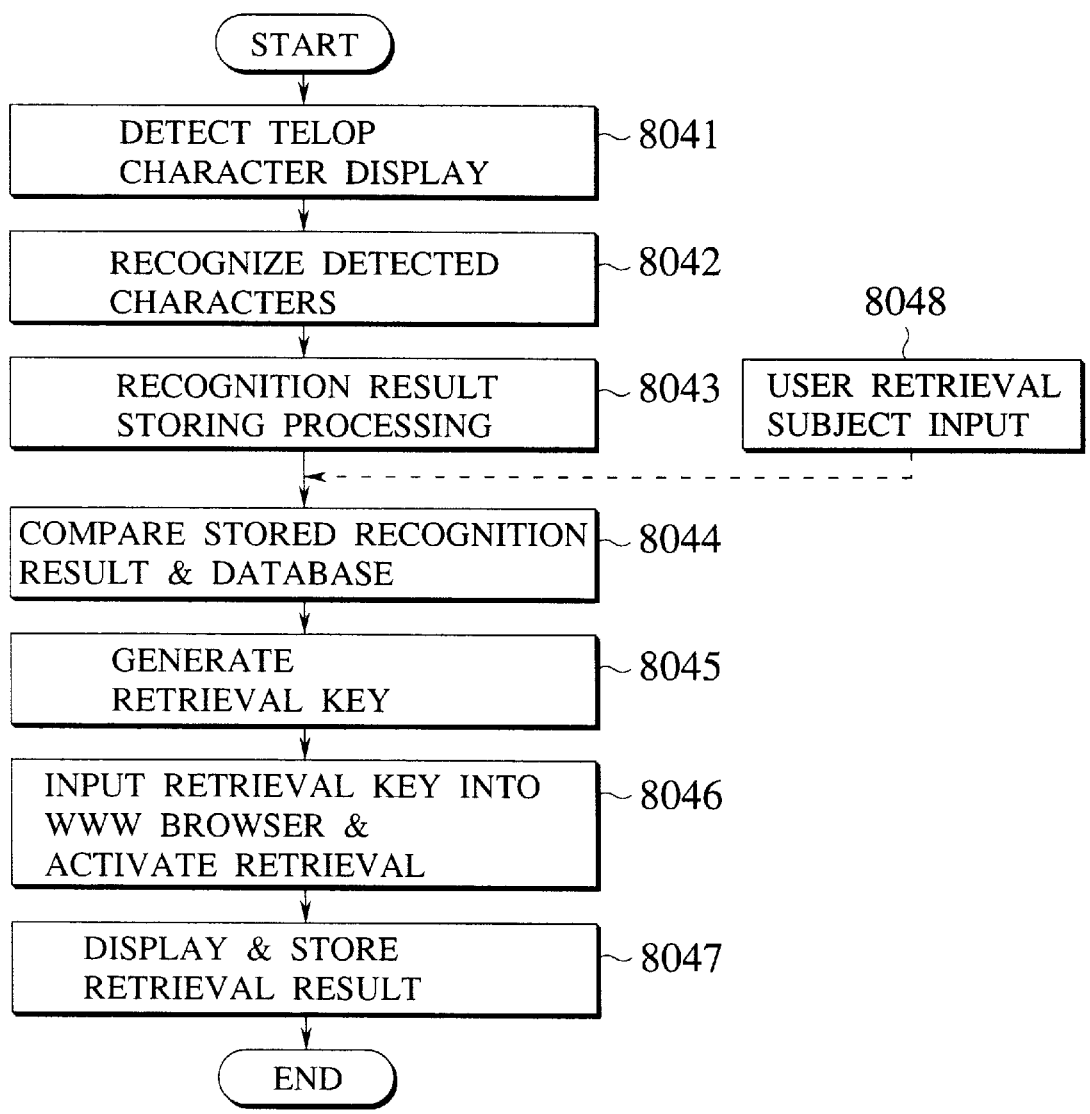
FIG. 89 is a flow chart for the processing procedure in the device of FIG. 88.

FIG. 89 hows the processing procedure of this video related information retrieval device of FIG. 88 for collecting the retrieval words by utilizing the telop displayed by the TV broadcast, which proceeds as follows.

First, the display of the telop characters is detected (step 8041), the detected characters are recognized (step 8042) and the recognition result is stored (step 8043). In addition, the user retrieval subject may be entered if necessary (step 8048).

Then, the stored recognition result is compared with the database (step 8044), and an appropriate retrieval key is generated (step 8045). Then, the retrieval key is entered into the WWW browser and the WWW retrieval engine is activated (step 8046), and the retrieval result is displayed and stored (step 8047). In the configuration of FIG. 88, the retrieval result can be displayed at the TV display unit 8005.

Figure 90:
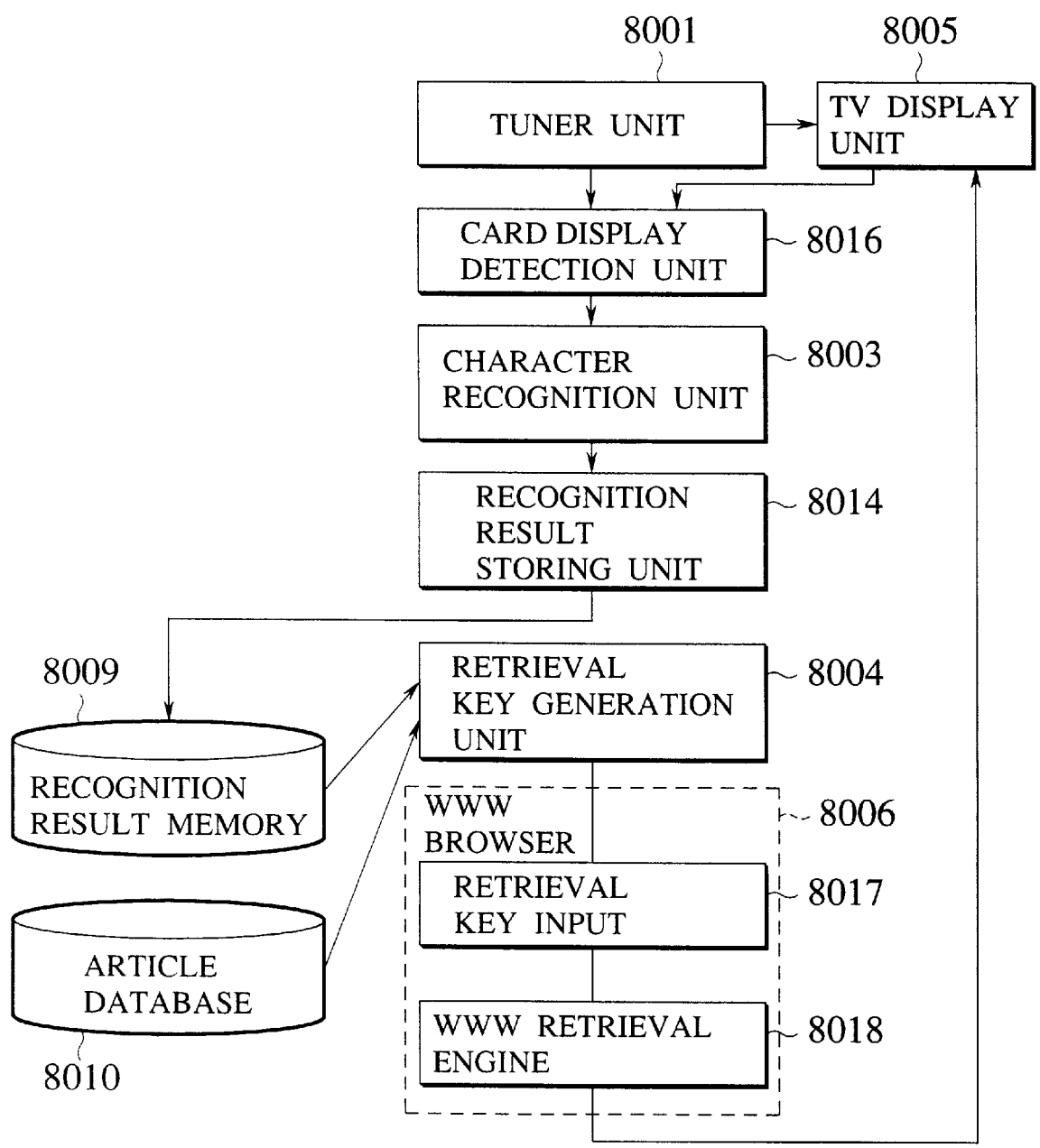
FIG. 90 is a block diagram showing another exemplary configuration of a video related information retrieval device according to the tenth embodiment of the present invention.

FIG. 90 shows another exemplary configuration of the video related information retrieval device of this tenth embodiment, which differs from that of FIG. 88 in that the telop display detection unit 8012 is replaced by a card display detection unit 8016 for detecting the character information in the card displayed by the TV broadcast (such as a card carrying messages which is presented to the viewers through the TV screen).

Figure 91:
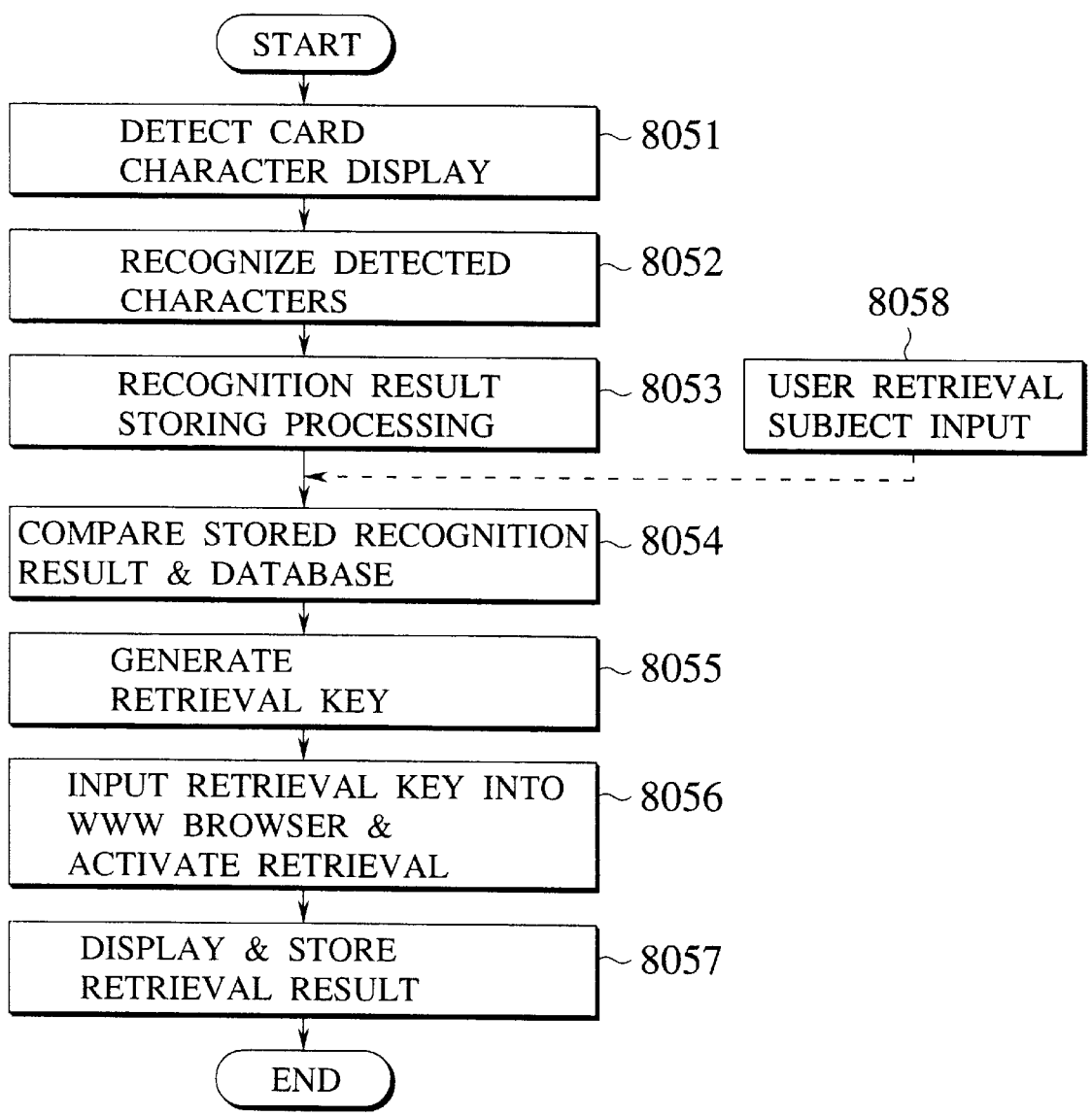
FIG. 91 is a flow chart for the processing procedure in the device of FIG. 90.

FIG. 91 shows the processing procedure of this video related information retrieval device of FIG. 90 for collecting the retrieval words by utilizing the card displayed by the TV broadcast, which proceeds as follows.

First, the display of the card characters is detected (step 8051), the detected characters are recognized (step 8052) and the recognition result is stored (step 8053). In addition, the user retrieval subject may be entered if necessary (step 8058).

Then, the stored recognition result is compared with the database (step 8054), and an appropriate retrieval key is generated (step 8055). Then, the retrieval key is entered into the WWW browser and the WWW retrieval engine is activated (step 8056), and the retrieval result is displayed and stored (step 8057). In the configuration of FIG. 90, the retrieval result can be displayed at the TV display unit 8005.

Note that, as indicated by the step 8048 of FIG. 89 and the step 8058 of FIG. 91, the user retrieval subject may not necessarily be entered in advance, and in the case where the content of the character information is automatically displayed along explanations of various themes, it is possible for the user to select and enter the subject while watching that information.

As described, according to this tenth embodiment, the retrieval key is generated by utilizing the character information such as that of the telop or the card that is attached in various video data, the WWW browser is displayed on the TV screen, and the WWW retrieval engine is activated by using the generated retrieval key, so that the WWW accesses can be made easily.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for recognizing character patterns, comprising the steps of:
   (a) dividing character patterns that are binarized into black pixels and white pixels into divided regions each containing one character;
   (b) normalizing position and size of a character in each divided region;
   (c) dividing a character pattern of each normalized character into mesh regions;
   (d) counting a run-length of white pixels which are adjacent in each direction starting from a white pixel existing in each divided mesh region, for a plurality of prescribed directions;
   (e) calculating a direction contributivity of each direction as a value obtained by averaging the run-length in each direction over an accumulated value of all the run-lengths for all the prescribed directions as counted by the step (d), for each divided mesh region;
   (f) calculating a feature value of each divided mesh region by accumulating the direction contributivity of each direction for all white pixels in each divided mesh region and averaging an accumulated value of the direction contributivity of each direction over a number of white pixels within each mesh region; and
   (g) carrying out a processing for recognizing the character pattern of each normalized character using the feature values obtained for all the mesh regions at the step (f).

2. A method for recognizing character patterns, comprising the steps of:
   (a) dividing character patterns that are binarized into black pixels and white pixels into divided regions each containing one character;
   (b) normalizing position and size of a character in each divided region;
   (c) dividing a character pattern of each normalized character into mesh regions;
   (d) counting a run-length of black pixels which are adjacent in each direction starting from a black pixel existing in each divided mesh region, for a plurality of prescribed directions;
   (e) calculating a black pixel direction contributivity of each direction as a value obtained by averaging the run-length of black pixels in each direction over an accumulated value of all the run-lengths of black pixels for all the prescribed directions as counted by the step (d) for each divided mesh region;
   (f) counting a run-length of white pixels which are adjacent in each direction starting from a white pixel existing in each divided mesh region, for a plurality of prescribed directions;

(g) calculating a white pixel direction contributivity of each direction as a value obtained by averaging the run-length of white pixels in each direction over an accumulated value of all the run-lengths of white pixels for all the prescribed directions as counted by the step (f), for each divided mesh region;

(h) calculating a black pixel feature value of each divided mesh region by accumulating the black pixel direction contributivity of each direction for all black pixels in each divided mesh region and averaging an accumulated value of the black pixel direction contributivity of each direction over a number of black pixels within each mesh region;

(i) calculating a white pixel feature value of each divided mesh region by accumulating the white pixel direction contributivity of each direction for all white pixels in each divided mesh region and averaging an accumulated value of the white pixel direction contributivity of each direction over a number of white pixels within each mesh region; and (j) carrying out a processing for recognizing the character pattern of each normalized character using the black feature values obtained for all the mesh regions at the step (h) and the white feature values obtained for all the mesh regions at the step (i).

3. An apparatus for recognizing character patterns, comprising:

a unit (a) for dividing character patterns that are binarized into black pixels and white pixels into divided regions each containing one character;

a unit (b) for normalizing position and size of a character in each divided region;

a unit (c) for dividing a character pattern of each normalized character into mesh regions;

a unit (d) for counting a run-length of white pixels which are adjacent in each direction starting from a white pixel existing in each divided mesh region, for a plurality of prescribed directions;

a unit (e) for calculating a direction contributivity of each direction as a value obtained by averaging the run-length in each direction by an accumulated value of all the run-lengths for all the prescribed directions as counted by the unit (d), for each divided mesh region;

a unit (f) for calculating a feature value of each divided mesh region by accumulating the direction contributivity of each direction for all white pixels in each divided mesh region and averaging an accumulated value of the direction contributivity of each direction over a number of white pixels within each mesh region; and a unit (g) for carrying out a processing for recognizing the character pattern of each normalized character using the features values obtained for all the mesh regions at the unit (f).

4. An apparatus for recognizing character patterns, comprising:

a unit (a) for dividing character patterns that are binarized into black pixels and white pixels into divided regions each containing one character;

a unit (b) for normalizing position and size of a character in each divided region;

a unit (c) for dividing a character pattern of each normalized character into mesh regions;

a unit (d) for counting a run-length of black pixels which are adjacent in each direction starting from a black pixel existing in each divided mesh region, for a plurality of prescribed directions;

a unit (e) for calculating a black pixel direction contributivity of each direction as a value obtained by averaging the run-length of black pixels in each direction by an accumulated value of all the run-lengths of black pixels for all the prescribed directions as counted by the unit (d), for each divided mesh region;

a unit (f) for counting a run-length of white pixels which are adjacent in each direction starting from a white pixel existing in each divided mesh region, for a plurality of prescribed directions;

a unit (g) for calculating a white pixel direction contributivity of each direction as a value obtained by averaging the run-length of white pixels in each direction over an accumulated value of all the run-lengths of white pixels for all the prescribed directions as counted by the unit (f), for each divided mesh region;

a unit (h) for calculating a black pixel feature value of each divided mesh region by accumulating the black pixel direction contributivity of each direction for all black pixels in each divided mesh region and averaging an accumulated value of the black pixel direction contributivity of each direction over a number of black pixels within each mesh region;

a unit (i) for calculating a white pixel feature value of each divided mesh region by accumulating the white pixel direction contributivity of each direction for all white pixels in each divided mesh region and averaging an accumulated value of the white pixel direction contributivity of each direction over a number of white pixels within each mesh region; and a unit (j) for carrying out a processing for recognizing the character pattern of each normalized character using the black feature values obtained for all the mesh regions at the unit (h) and the white feature values obtained for all the mesh regions at the unit (i).

5. A computer readable recording medium recording a program for causing a computer to execute processing including:

(a) the process step of dividing character patterns that are binarized into black pixels and white pixels into divided regions each containing one character;

(b) the process step of normalizing position and size of a character in each divided region;

(c) the process step of dividing a character pattern of each normalized character into mesh regions;

(d) the process step of counting a run-length of white pixels which are adjacent in each direction starting from a white pixel existing in each divided mesh region, for a plurality of prescribed directions;

(e) the process step of calculating a direction contributivity of each direction as a value obtained by averaging the run-length in each direction by an accumulated value of all the run-lengths for all the prescribed directions as counted by the process step of (d), for each divided mesh region;

(f) the process step of counting a run-length of white pixels which are adjacent in each direction starting from a white pixel existing in each divided mesh region, for a plurality of prescribed directions;

(g) the process step of calculating a white pixel direction contributivity of each direction as a value obtained by averaging the run-length of white pixels in each direction over an accumulated value of all the run-lengths of white pixels for all the prescribed directions as counted by the process step of (f), for each divided mesh region;

(h) the process step of calculating a black pixel feature value of each divided mesh region by accumulated the black pixel direction contributivity of each direction for all black pixels in each divided mesh region and averaging an accumulated value of the black pixels direction contributivity of each direction over a number of black pixels within each mesh region;

(i) the process step of calculating a white pixel feature value of each divided mesh region by accumulating the white pixel direction contributivity of each direction for all white pixels in each divided mesh region and averaging an accumulated value of the white pixel direction contributivity of each direction over a number of white pixels within each mesh region; and (j) the process step of carrying out a processing for recognizing the character pattern of each normalized character using the black feature values obtained for all the mesh regions at the process step of (h) and the white feature values obtained for all the mesh regions at the process step of (i).

6. A computer readable recording medium recording a program for causing a computer to execute processing including:

(a) the process step of dividing character patterns that are binarized into black pixels and white pixels into divided regions each containing one character;

(b) the process step of normalizing position and size of a character in each divided region;

(c) the process step of dividing a character pattern of each normalized character into mesh regions;

(d) the process step of counting a run-length of black pixels which are adjacent in each direction starting from a black pixel existing in each divided mesh region, for a plurality of prescribed directions;

(e) the process step of calculating a black pixel direction contributivity of each direction as a value obtained by averaging the run-length of black pixels in each direction over an accumulated value of all the run-lengths of black pixels for all the prescribed directions as counted by the process step of (d), for each divided mesh region;

(f) the process step of counting a run-length of white pixels which are adjacent in each direction starting from a white pixel existing in each divided mesh region, for a plurality of prescribed directions;

(g) the process step of calculating a white pixel direction contributivity of each direction as a value obtained by averaging the run-length of white pixels in each direction over an accumulated value of all the run-lengths of white pixels for all the prescribed directions as counted by the process step of (f), for each divided mesh region;

(h) the process step of calculating a black pixel feature value of each divided mesh region by accumulating the black pixel direction contributivity of each direction for all black pixels in each divided mesh region and averaging an accumulated value of the black pixel direction contributivity of each direction over a number of black pixels within each mesh region;

(i) the process step of calculating a white pixel feature value of each divided mesh region by accumulating the white pixel direction contributivity of each direction for all white pixels in each divided mesh region and averaging an accumulated value of the white pixel direction contributivity of each direction over a number of white pixels within each mesh region; and (j) the process step of carrying out a processing for recognizing the character pattern of each normalized character using the black feature values obtained for all the mesh regions at the process step of (h) and the white feature values obtained for all the mesh regions at the process step of (i).

* * * * *

UNITED STATES PATENT AND TRADEMARK OFFICE
CERTIFICATE OF CORRECTION

PATENT NO.     : 6,501,856 B2
DATED          : December 31, 2002
INVENTOR(S)    : Hidetaka Kuwano et al.

It is certified that error appears in the above-identified patent and that said Letters Patent is hereby corrected as shown below:

Column 1,
Line 42, delete "." before "conventional --.

Column 8,
Line 55, delete "11A" and insert -- 10A --.

Column 9,
Line 38, delete "." after "image".

Column 12,
Line 60, delete "," after "one".

Column 13,
Line 18, delete "17A" and insert -- 7A --.

Column 14,
Line 58, delete "." after "is".

Column 15,
Line 10, delete "T" and insert -- T' --.

Column 16,
Line 32, delete "two-frames" and insert -- two frames --.

Column 19,
Line 29, delete "&" before "edge".

Column 21,
Line 4, delete "," before "processing".

Column 22,
Line 60, delete "2602" and insert -- 2002 --.

Column 23,
Line 55, delete "maximums" and insert -- maximum --.
Line 58, delete "," after "unit" .

Column 27,
Line 11, delete "Of" and insert -- of --.

UNITED STATES PATENT AND TRADEMARK OFFICE
CERTIFICATE OF CORRECTION

PATENT NO. : 6,501,856 B2
DATED : December 31, 2002
INVENTOR(S) : Hidetaka Kuwano et al.

It is certified that error appears in the above-identified patent and that said Letters Patent is hereby corrected as shown below:

Column 28,
Line 44, delete "." before "or".
Line 56, delete "." before "character".

Column 30,
Line 10, delete "." before "judging".
Line 35, delete "1350º" and insert -- 135º --.

Column 31,
Line 49, delete "." before "white".
Line 56, delete "." after "white".

Column 32,
Line 5, delete "F(fl,f2 …,fk,…,fK)" and insert -- F= (f1,f2,…,fk,…,fK) --.

Column 33,
Line 20, delete "31903" and insert -- 3103 --.

Column 36,
Line 57, delete "(k=1,2…,k,…,K) and insert -- (k=1,2,…,k,…,K) --.

Column 37,
Line 44, delete "F= (f1,f2,…,fk…,fK) and insert -- F= (f1,42,…,fk,…,fK) --.

Column 38,
Line 11, delete "8-directions" and insert -- 8 directions --.

Column 45,
Line 42, delete "(step 6030 YES) +the" and insert -- (step 6030 YES), the --.

Column 48,
Line 11, delete "." before "telop".

Column 50,
Line 15, delete "." before "7059".

Column 51,
Line 33, delete "." after "HTML".

UNITED STATES PATENT AND TRADEMARK OFFICE
CERTIFICATE OF CORRECTION

PATENT NO. : 6,501,856 B2
DATED : December 31, 2002
INVENTOR(S) : Hidetaka Kuwano et al.

It is certified that error appears in the above-identified patent and that said Letters Patent is hereby corrected as shown below:

Column 53,
Line 24, delete "hows" and insert -- shows --.

Signed and Sealed this

Seventh Day of October, 2003

JAMES E. ROGAN
*Director of the United States Patent and Trademark Office*